(12) United States Patent
Asako et al.

(10) Patent No.: US 8,830,439 B2
(45) Date of Patent: Sep. 9, 2014

(54) DISPLAY PANEL

(75) Inventors: Isao Asako, Osaka (JP); Yukinori Nakagawa, Osaka (JP); Hiromi Nishino, Osaka (JP); Shinji Shimada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 130 days.

(21) Appl. No.: 13/702,749

(22) PCT Filed: Apr. 21, 2011

(86) PCT No.: PCT/JP2011/059825
§ 371 (c)(1),
(2), (4) Date: Dec. 7, 2012

(87) PCT Pub. No.: WO2011/155269
PCT Pub. Date: Dec. 15, 2011

(65) Prior Publication Data
US 2013/0077009 A1  Mar. 28, 2013

(30) Foreign Application Priority Data
Jun. 10, 2010  (JP) ................. 2010-132716

(51) Int. Cl.
G02F 1/1339 (2006.01)
G02F 1/1335 (2006.01)
G02F 1/1334 (2006.01)

(52) U.S. Cl.
CPC ........ *G02F 1/1339* (2013.01); *G02F 1/133512* (2013.01); *G02F 1/1334* (2013.01)
USPC .............................. 349/155; 349/110; 349/88

(58) Field of Classification Search
CPC ............ G02F 1/1334; G02F 1/133512; G02F 1/133509; G02F 1/1333; G02F 1/1339; G02F 1/1362; G02F 2001/13775; G02F 2001/13396; G02F 2202/023
USPC .......... 349/86, 110, 138, 42, 155, 156, 43, 88
See application file for complete search history.

(56) References Cited

U.S. PATENT DOCUMENTS 6,038,006 A * 3/2000 Sasaki et al. ................. 349/106
(Continued)

FOREIGN PATENT DOCUMENTS

| JP | H07-209632 A | 8/1995 |
|----|--------------|--------|
| JP | 10-333131 A | 12/1998 |

(Continued)

OTHER PUBLICATIONS

U.S. Appl. No. 13/393,136, filed Feb. 28, 2012.

*Primary Examiner* — Thoi Duong
(74) *Attorney, Agent, or Firm* — Chen Yoshimura LLP

(57) ABSTRACT

Provided is a display panel using polymer network liquid crystal in which a monomer unreacted region is reduced and a thin-film transistor can be prevented from being irradiated with light energy. In the display panel, a black matrix (22*a*) is provided as an element having a light-shielding property in a first substrate (2*a*), a pixel electrode (37) and a thin-film transistor (32) serving as a switching element for driving the pixel electrode (37) are provided in a second substrate (3*a*), polymer network liquid crystal (11) is filled between the first substrate (2*a*) and the second substrate (3*a*), a cover portion (221) that is part of the black matrix (22*a*) provided in the first substrate (2*a*) faces the thin-film transistor (32) provided in the second substrate (3*a*), and the outer periphery of the cover portion (221) is located outside the outer periphery of a channel region by a specified dimension or more.

16 Claims, 28 Drawing Sheets

(56) References Cited

U.S. PATENT DOCUMENTS

| | | |
|---|---|---|
| 6,177,965 B1 * | 1/2001 | Takahara et al. .................. 349/5 |
| 6,219,113 B1 | 4/2001 | Takahara |
| 6,356,330 B1 * | 3/2002 | Ando et al. .................. 349/141 |
| 6,507,385 B1 | 1/2003 | Nishiyama et al. |
| 7,248,328 B1 | 7/2007 | Shibahara |
| 2012/0154733 A1 | 6/2012 | Nakagawa et al. |

FOREIGN PATENT DOCUMENTS

| | | |
|---|---|---|
| JP | 11-133437 A | 5/1999 |
| JP | 2001-13506 A | 1/2001 |
| JP | 2003-121857 A | 4/2003 |
| JP | 2006-330024 A | 12/2006 |
| JP | 2009-025354 A | 2/2009 |
| WO | 2011/027597 A1 | 3/2011 |

* cited by examiner (a)

(b)

(a)

(b)

(c)

(a)

(b)

(c)

(a)

(b)

DISPLAY PANEL

TECHNICAL FIELD

The present invention relates to a display panel, and more particularly, to a liquid crystal display panel that uses polymer network liquid crystal.

BACKGROUND ART

Polymer network liquid crystal (PNLC) is liquid crystal that has a polymer fiber structure (polymer microphase-separated structure; so-called polymer network) therein. When no voltage is applied, the liquid crystal molecules in the polymer network liquid crystal are randomly orientated along the polymer fibers, causing the refractive index of the liquid crystal to differ from the refractive index of the polymers, and therefore, light is scattered. This results in an opaque appearance of the polymer network liquid crystal. On the other hand, when a voltage is applied, the liquid crystal molecules are aligned. Because the refractive index of the liquid crystal and the refractive index of the polymers are matched at this time, the scattering of light can be suppressed and the liquid crystal becomes transparent.

Various liquid crystal display panels that employ the polymer network liquid crystal (may also be referred to as "PNLC display panels" below) have been proposed. In addition to an application to reflective display panels (such as electronic papers, for example), the PNLC display panels can also be used for transmissive liquid crystal display panels as described in Patent Document 1, for example.

A typical manufacturing method of a PNLC display panel includes a step of filling a gap between two display panel substrates with a liquid crystal material having monomers mixed therein, and a step of polymerizing the monomers to form polymer network. As the method of polymerizing the monomers, a method of radiating light energy such as ultraviolet light is employed, for example.

In the display panel substrates, prescribed elements such as wiring lines are formed. When the PNLC display panel is an active matrix type liquid crystal display panel, for example, a TFT array substrate and a color filter are used as the display panel substrates. In the TFT array substrate, elements such as thin film transistors (TFTs), gate wiring lines (may also be referred to as "scan lines"), source wiring lines (may also be referred to as "data lines"), and auxiliary capacitance wiring lines (may also be referred to as "Cs wiring lines," "holding capacitance wiring lines," or the like) are formed. In the color filter, elements such as a black matrix (BM) and colored patterns of prescribed colors are formed.

For this reason, in the step of polymerizing the monomers, light energy may be blocked by elements having a light-shielding property, and part of the liquid crystal material having monomers mixed therein may not be irradiated with the light energy. As a result, the part that was not irradiated with the light energy become a monomer unreacted region (region in which monomers are not polymerized). The light transmittance and the refractive index may differ between the monomer unreacted region and portions that have been polymerized. Therefore, presence of the monomer unreacted region may cause "seeping of light" inside the regions or at interfaces thereof, resulting in the display non-uniformity. Also, because the monomer unreacted region has a different physical property from that of the polymerized portions, if an external force is applied to the PNLC display panel that has the monomer unreacted region, the stress may not be absorbed in the monomer unreacted region, causing air bubbles (substantially vacuum spaces; may also be referred to as "vacuum bubbles" below) to be formed. The light transmittance and the refractive index of the vacuum bubbles are different from those of other portions, and therefore, "seeping of light" may occur in the vacuum bubbles, resulting in the display non-uniformity.

Therefore, it is preferable that the monomer unreacted region be prevented from being formed in the step of polymerizing the monomers, and in order to do so, it is necessary to radiate the light energy to the entire liquid crystal material having the monomers mixed therein (so as not to have a region where the light energy is not radiated).

Some of the elements that are formed in the display panel substrates need to be protected from the light energy radiation. For example, when the thin film transistors that are formed in the TFT array substrate are irradiated with the light energy, the electrical characteristics thereof change. Therefore, it is necessary to block the light energy by using a black matrix formed in the color filter so as to prevent the thin film transistors from being irradiated. This means that the monomers present in regions that are blocked by the black matrix of the color filter would not be irradiated with the light energy, and such regions become the monomer unreacted regions.

As described above, in some cases, it is difficult to have the entire liquid crystal material, which has monomers mixed therein, irradiated with the light energy in the step of polymerizing the monomers.

To solve this problem, in the PNLC display panel, a configuration in which thin film transistors are covered by light-shielding films, and a dielectric multi-layer film that allows ultraviolet light to pass through while blocking visible light is formed in positions that face the thin film transistors has been proposed (see Patent Document 2). With this configuration, it is possible to irradiate the monomers with ultraviolet light that has passed through the dielectric multi-layer film. However, because this configuration requires a process of forming the dielectric multi-layer film, the number of process steps in the process of manufacturing the display panel is increased. This leads to an increase in the equipment cost and an increase in the manufacturing cost.

RELATED ART DOCUMENTS

Patent Documents

Patent Document 1: Japanese Patent Application Laid-Open Publication No. 2009-025354
Patent Document 2: Japanese Patent Application Laid-Open Publication No. H07-209632

SUMMARY OF THE INVENTION

Problems to be Solved by the Invention

In consideration of the situation described above, the present invention is aiming at, in a display panel that uses polymer network liquid crystal, reducing the monomer unreacted regions, preventing or suppressing an occurrence of the display non-uniformity by reducing the monomer unreacted regions, and providing a display panel that can reduce the monomer unreacted regions without increasing number of process steps in the manufacturing process.

Means for Solving the Problems

In order to solve the above-mentioned problems, in one aspect, a display panel according to the present invention includes a first substrate and a second substrate, the first substrate being provided with a light-shielding element, the second substrate being provided with a pixel electrode and a thin film transistor that drives the pixel electrode, wherein the first substrate and the second substrate are disposed to face each other having a gap therebetween, and a polymer network liquid crystal is filled between the first substrate and the second substrate, and wherein the light-shielding element is disposed in a location that faces the thin film transistor, and an outer periphery of the light-shielding element is located outside an outer periphery of a channel region of the thin film transistor at a distance of at least 10 μm greater than a sum of "a length of the channel region," "a height of a surface of an uppermost layer of the second substrate from a surface of the channel region," and "a thickness of the polymer network liquid crystal," when viewed from a direction that is perpendicular to a plane direction of the first substrate and the second substrate.

It is preferable that the first substrate be provided with first spacers that define a gap between the first substrate and the second substrate, and that a total cross-sectional area of the first spacers and an area of the region filled with the polymer network liquid crystal be set so as to satisfy: (the total cross-sectional area of the first spacers)/(the area of the region filled with the polymer network liquid crystal)=0.001 to 0.017.

The first substrate may include second spacers that are shorter than the first spacers. It is preferable that a height difference between the first spacers and the second spacers be 0.1 to 1.0 μm.

In the first substrate, a spacer that defines a gap between the first substrate and the second substrate may be provided, and the spacer may be formed so as to overlap substantially the entire light-shielding element in a portion thereof that is located in a region filled with the polymer network liquid crystal.

The spacer may have higher portions and lower portions.

It is preferable that a total cross-sectional area of the higher portions of the spacer and an area of the region filled with the polymer network liquid crystal be set so as to satisfy: (the total cross-sectional area of the higher portions of the spacer)/(the area of the region filled with the polymer network liquid crystal)=0.001 to 0.017.

It is preferable that a height difference between the higher portions and the lower portions be 0.1 to 1.0 μm.

In another aspect, a display panel according to the present invention includes: a first substrate and a second substrate disposed to face each other having a gap therebetween; spacers formed in the first substrate, the spacers defining the gap between the first substrate and the second substrate; a pixel electrode and a thin film transistor formed in the second substrate, the thin film transistor driving the pixel electrode; and a polymer network liquid crystal filled between the first substrate and the second substrate, wherein the spacers have a light-shielding property, and each spacer is disposed in a location that faces the thin film transistor, and an outer periphery of each of the spacers is located outside an outer periphery of a channel region of the thin film transistor at a distance of at least 10 μm greater than a sum of "a length of the channel region," "a height of a surface of an uppermost layer of the second substrate from a surface of the channel region," and "a thickness of the polymer network liquid crystal," when viewed from a direction that is perpendicular to a plane direction of the first substrate and the second substrate.

The spacers may include first spacers and second spacers that are shorter than the first spacers.

In this case, it is preferable that a total cross-sectional area of the first spacers and an area of a region filled with the polymer network liquid crystal be set so as to satisfy: (the total cross-sectional area of the first spacers)/(the area of the region filled with the polymer network liquid crystal)=0.001 to 0.017.

It is further preferable that a height difference between the first spacers and the second spacers be 0.1 to 1.0 μm.

In yet another aspect, a display panel according to the present invention includes a first substrate and a second substrate disposed to face each other having a gap therebetween; a spacer that has a light-shielding property and that borders pixels in the first substrate, the spacer defining the gap between the first substrate and the second substrate; a pixel electrode and a thin film transistor formed in the second substrate, the thin film transistor driving the pixel electrode; and a polymer network liquid crystal filled between the first substrate and the second substrate, wherein the spacer has a portion that faces the thin film transistor, and an outer periphery of the portion of the spacer that faces the thin film transistor is located outside an outer periphery of a channel region of the thin film transistor at a distance of at least 10 μm greater than a sum of "a length of the channel region," "a height of a surface of an uppermost layer of the second substrate from a surface of the channel region," and "a thickness of the polymer network liquid crystal," when viewed from a direction that is perpendicular to a plane direction of the first substrate and the second substrate.

The spacer may have higher portions and lower portions.

In this case, it is preferable a total cross-sectional area of the higher portions of the spacer and an area of a region filled with the polymer network liquid crystal be set so as to satisfy: (the total cross-sectional area of the higher portions)/(the area of the region filled with the polymer network liquid crystal)= 0.001 to 0.017.

It is further preferable that a height difference between the higher portions and the lower portions is 0.1 to 1.0 μm.

In yet another aspect, a display panel according to the present invention includes: a first substrate and a second substrate, the first substrate being provided with a transparent electrode, the second substrate being provided with a pixel electrode, a switching element that drives the pixel electrode, and a light-shielding element that covers the switching element, wherein the first substrate and the second substrate are disposed to face each other having a gap therebetween, and a polymer network liquid crystal is filled between the first substrate and the second substrate.

In this case, it is preferable that the first substrate or the second substrate be provided with first spacers that define the gap between the first substrate and the second substrate, and that a total cross-sectional area of the first spacers and an area of the region filled with the polymer network liquid crystal be set so as to satisfy: (the total cross-sectional area of the first spacers)/(the area of the region filled with the polymer network liquid crystal)=0.001 to 0.017.

The first substrate may be provided with second spacers that are shorter than the first spacers. In this case, it is preferable that a height difference between the first spacers and the second spacers be 0.1 to 1.0 μm.

Effects of the Invention

According to the present invention, in a step of radiating light energy to a liquid crystal material having monomers mixed therein for polymerizing the monomers, it is possible to reduce the amount (volume) of monomers that are not irradiated with light energy, while preventing the light energy from reaching the thin film transistors. Because the amount of portions that are not irradiated with the light energy in the liquid crystal material having monomers mixed therein can be reduced, the amount of the monomer unreacted regions (the volume thereof) can be reduced, and therefore, the problems caused by the monomer unreacted regions can be prevented or suppressed. Thus, high-quality display that is free from the display non-uniformity can be performed.

In the step of polymerizing the monomers, it is possible to prevent the light energy from reaching the switching elements (thin film transistors) formed in the second substrate. When the switching elements are irradiated with light energy such as ultraviolet light, electrical characteristics thereof may change. This makes it difficult to apply prescribed voltages to the respective pixel electrodes, and consequently, the quality of displayed images may be lowered. However, according to the present invention, the light energy can be prevented from reaching the switching elements, which prevents the change in characteristics of the switching elements. As a result, the high-quality image display can be achieved (or degradation of the quality of displayed images can be prevented).

According to the present invention, even when the volume of the polymer network liquid crystal is changed (especially even when the volume is reduced), because the first spacers or the higher portions of the spacer are deformed, the first substrate and the second substrate are allowed to deform so as to follow the volume change of the polymer network liquid crystal (the cell gap can be made smaller). Therefore, the separation of the polymer network liquid crystal from the surface(s) of the first substrate and/or the second substrate can be prevented or suppressed. It is also possible to maintain the cell gap at a prescribed value by the first spacers.

As described above, according to the present invention, because the separation of the polymer network liquid crystal from the first substrate or the second substrate can be prevented or suppressed, the occurrence of an air bubble at the interface(s) between the polymer network liquid crystal and the first substrate and/or the second substrate can be prevented or suppressed. Further, the cell gap can also be maintained at a prescribed value. Therefore, not only the occurrence of display non-uniformity caused by the presence of air bubbles, but also the occurrence of display non-uniformity caused by a change in the cell gap (uneven cell gap, for example) can be prevented or suppressed. This allows a high-quality display to be performed (or degradation of display quality can be prevented).

If the display panel is configured to have the second spacers or the lower portions of the spacer that are shorter than the first spacers or the higher portions of the spacer, the cell gap can be maintained at a prescribed value even when a strong pressure load (particularly, a pressure load that makes the first substrate and the second substrate of the display panel get closer to each other; a compressive force) is applied to the display panel.

That is, with no or only a small pressure load from the outside applied to the display panel, the cell gap is defined by the first spacers or the higher portions of the spacer. Thus, in this condition, because the first spacers or the higher portions of the spacer are deformed, the first substrate and the second substrate are allowed to deform so as to follow the volume change of the polymer network liquid crystal. This can prevent or suppress the separation of the polymer network liquid crystal.

When a strong pressure load is applied from the outside to the display panel, the first spacers or the higher portions of the spacer are compressively deformed, and are reduced in height. As a result, ends of the second spacers or the lower portions of the spacer come in contact with the surface of the second substrate. Therefore, the second spacers or the lower portions of the spacer, in addition to the first spacers or the higher portions of the spacer, fulfill a function of maintaining the cell gap at a prescribed value. When the second spacers or the lower portions of the spacer, in addition to the first spacers or the higher portions of the spacer, fulfill a function of defining the cell gap, the display panel becomes stronger against the pressure load (becomes less likely to deform). Thus, even when a strong pressure load from the outside is applied to the display panel, the cell gap is maintained at a prescribed value. That is, in this condition, the cell gap is maintained at a prescribed value by the first spacers or the higher portions of the spacer and the second spacers or the lower portions of the spacer.

When the spacer is formed so as to overlap substantially the entire black matrix, in the step of radiating light energy to the liquid crystal material that contains monomers, almost no liquid crystal material having monomers mixed therein is present in regions that are covered by the black matrix (projection regions of the black matrix). This allows substantially the entire liquid crystal material having monomers mixed therein to be irradiated with the light energy, thereby polymerizing the monomers. As a result, the monomer unreacted regions can be prevented from being formed almost completely. Because the monomer unreacted regions can be eliminated almost completely, the above-mentioned problems caused by the monomer unreacted regions can be prevented or suppressed, and as a result, high-quality display that is free from the display non-uniformity can be performed.

In a configuration in which the black matrix is not formed in the first substrate, and the spacer is provided with a light-shielding property, the step of forming a black matrix in the first substrate can be eliminated. This allows for a reduction in manufacturing cost of the display panel and a reduction in the product price.

In a configuration in which the black matrix is not formed in the first substrate, and a light-shielding element is formed in the second substrate, the step of forming a black matrix in the first substrate can be eliminated. This allows for a reduction in manufacturing cost of the display panel and a reduction in the product price.

BRIEF DESCRIPTION OF THE DRAWINGS

FIG. 4(*b*) is a cross-sectional view along the line A-A in FIG. 4(*a*), schematically showing a cross-sectional structure of the pixels.

FIG. 16($b$) is a cross-sectional view along the line A-A in FIG. 16($a$), schematically showing a cross-sectional structure of the pixels.

FIG. 18($a$) is a plan view showing a structure of pixels, FIG. 18($b$) is a cross-sectional view along the line A-A in FIG. 18($a$), and FIG. 18($c$) is a cross-sectional view along the line B-B in FIG. 18($a$).

FIG. 23($a$) is a plan view showing a structure of pixels, FIG. 23($b$) is a cross-sectional view along the line A-A in FIG. 23($a$), and FIG. 23($c$) is a cross-sectional view along the line B-B in FIG. 23($a$).

FIG. 25($a$) is a plan view showing a structure of pixels, and FIG. 25($b$) is a cross-sectional view along the line A-A in FIG. 25($a$).

DETAILED DESCRIPTION OF EMBODIMENTS

Embodiments of the present invention will be explained in detail below with reference to figures. Display panels $1a$, $1b$, $1c$, $1d$, and $1e$ of respective embodiments of the present invention are active matrix type liquid crystal display panels that employ PNLCs (Polymer Network Liquid Crystal).

Figure 1:
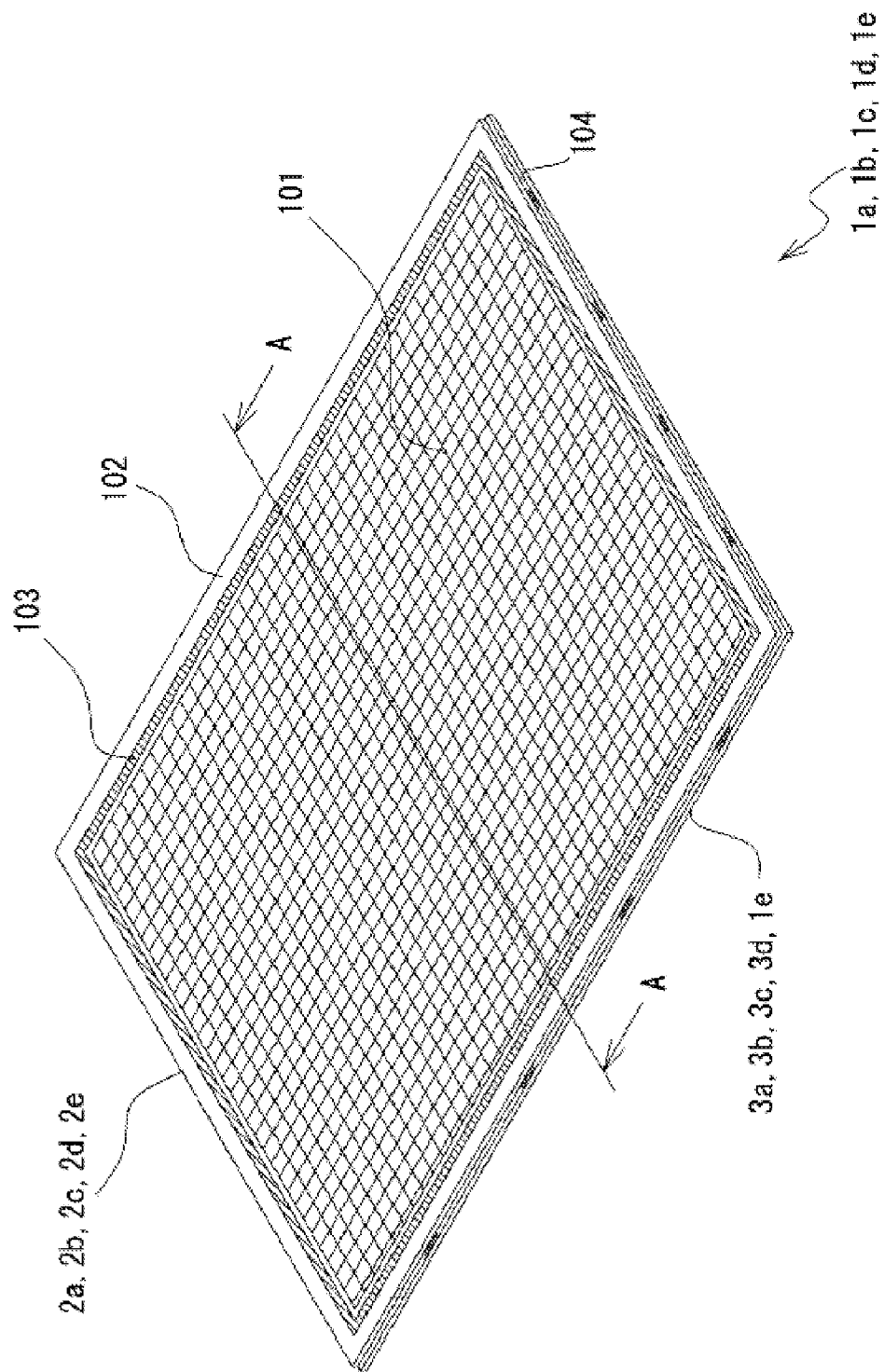
FIG. 1 is an exterior perspective view schematically showing an overall configuration of a display panel according to respective embodiments of the present invention.
Figure 2:
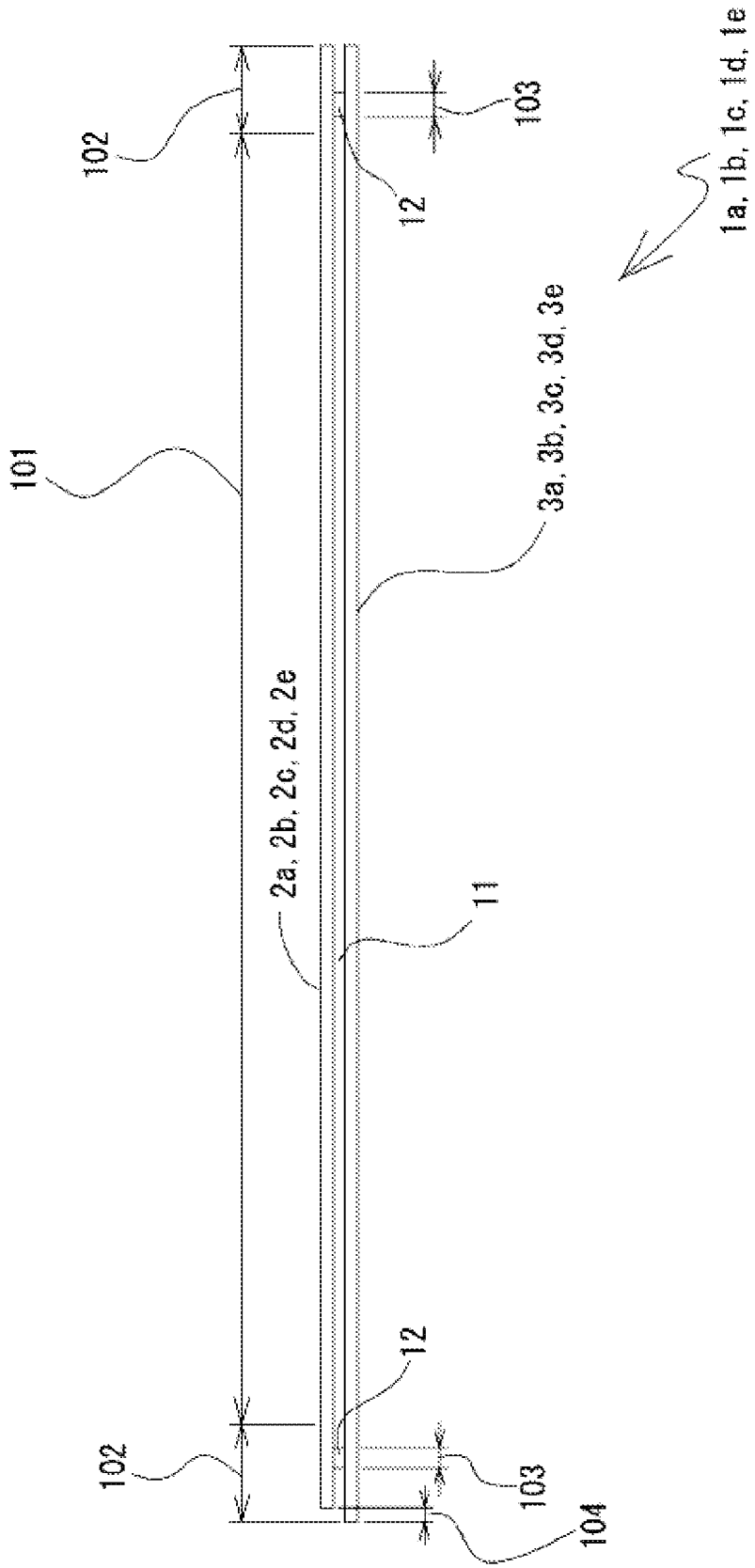
FIG. 2 is a cross-sectional view along the line A-A in FIG. 1 that schematically shows a cross-sectional structure of a display panel of respective embodiments of the present invention.

First, an overall configuration that is common to display panels of respective embodiments of the present invention (the display panel $1a$ of Embodiment 1 of the present invention, the display panel $1b$ of Embodiment 2 of the present invention, the display panel $1c$ of Embodiment 3 of the present invention, the display panel $1d$ of Embodiment 4 of the present invention, and the display panel $1e$ of Embodiment 5 of the present invention) will be explained. FIG. 1 is an exterior perspective view that schematically shows the overall configuration of the display panels $1a$, $1b$, $1c$, $1d$, and $1e$ of respective embodiments of the present invention. FIG. 2 is a cross-sectional view along the line A-A in FIG. 1, schematically showing the cross-sectional structure of the display panels $1a$, $1b$, $1c$, $1d$, and $1e$ of respective embodiments of the present invention.

As shown in FIGS. 1 and 2, respectively, the display panels $1a$, $1b$, $1c$, $1d$, and $1e$ of respective embodiments of the present invention respectively have two display panel substrates that are first substrates $2a$, $2b$, $2c$, $2d$, and $2e$ and second substrates $3a$, $3b$, $3c$, $3d$, and $3e$. The first substrates $2a$, $2b$, $2c$, $2d$, and $2e$ of the display panels $1a$, $1b$, $1c$, $1d$, and $1e$ of respective embodiments of the present invention are color filters. The second substrates $3a$, $3b$, $3c$, $3d$, and $3e$ are TFT array substrates. In the display panels $1a$, $1b$, $1c$, $1d$, and $1e$ of respective embodiments of the present invention, the first substrates $2a$, $2b$, $2c$, $2d$, and $2e$ and the second substrates $3a$, $3b$, $3c$, $3d$, and $3e$ are respectively bonded so as to face each other through a prescribed small gap and so as to be substantially parallel with each other. A gap between the two substrates is filled with polymer network liquid crystal 11, and the polymer network liquid crystal 11 filling the gap are sealed by a sealing member 12.

On respective surfaces of the first substrates 2a, 2b, 2c, 2d, and 2e and the second substrates 3a, 3b, 3c, 3d, and 3e, prescribed elements are formed, but they are not shown in FIG. 2. The prescribed elements will be described later. The prescribed elements formed on the respective surfaces of the first substrates 2a, 2b, 2c, 2d, and 2e and the second substrates 3a, 3b, 3c, 3d, and 3e may differ among respective embodiments, which will be described later in detail.

In each of the display panels 1a, 1b, 1c, 1d, and 1e of respective embodiments of the present invention (in each pair of the first substrates 2a, 2b, 2c, 2d, and 2e and the second substrates 3a, 3b, 3c, 3d, and 3e), a display region 101 (may also be referred to as a "pixel region" and the like) and a panel frame region 102 are formed. The display region 101 is a region where images are displayed. In the display region 101, a plurality of pixels are arranged in a prescribed pattern. The panel frame region 102 is a region that is formed outside the display region 101 so as to enclose the display region 101. In the panel frame region 102, a seal pattern region 103, prescribed wiring lines (not shown), wiring electrode terminals (not shown), and the like are formed.

In the seal pattern region 103, the sealing member 12 is formed. The seal pattern region 103 is a band-shaped region that encloses the display region 101 with no opening. As shown in FIG. 2 in particular, in the seal pattern region 103, the sealing member 12 is formed so as to bridge the first substrate 2a, 2b, 2c, 2d, or 2e and the second substrate 3a, 3b, 3c, 3d, or 3e. By the sealing member 12, the first substrate 2a, 2b, 2c, 2d, or 2e and the second substrate 3a, 3b, 3c, 3d, or 3e are bonded and fixed to each other so as to face across a prescribed small gap and so as to be substantially parallel with each other. The sealing member 12 is also used to seal the polymer network liquid crystal 11 in a gap formed between the first substrate 2a, 2b, 2c, 2d, or 2e and the second substrate 3a, 3b, 3c, 3d, or 3e.

The polymer network liquid crystal 11 is liquid crystal having a polymer microphase-separated structure (polymer network). The polymer network liquid crystal 11 can be obtained by radiating ultraviolet light to a liquid crystal material having monomers (acrylic monomers, for example) mixed therein so that the monomers are polymerized and a microphase-separated structure of polymers is formed therein, for example. Various known polymer network liquid crystal can be used as the polymer network liquid crystal 11 of the display panels 1a, 1b, 1c, 1d, and 1e of respective embodiments of the present invention, and therefore, the explanation thereof is omitted.

Next, the display panel 1a of Embodiment 1 of the present invention will be explained.

Figure 3:
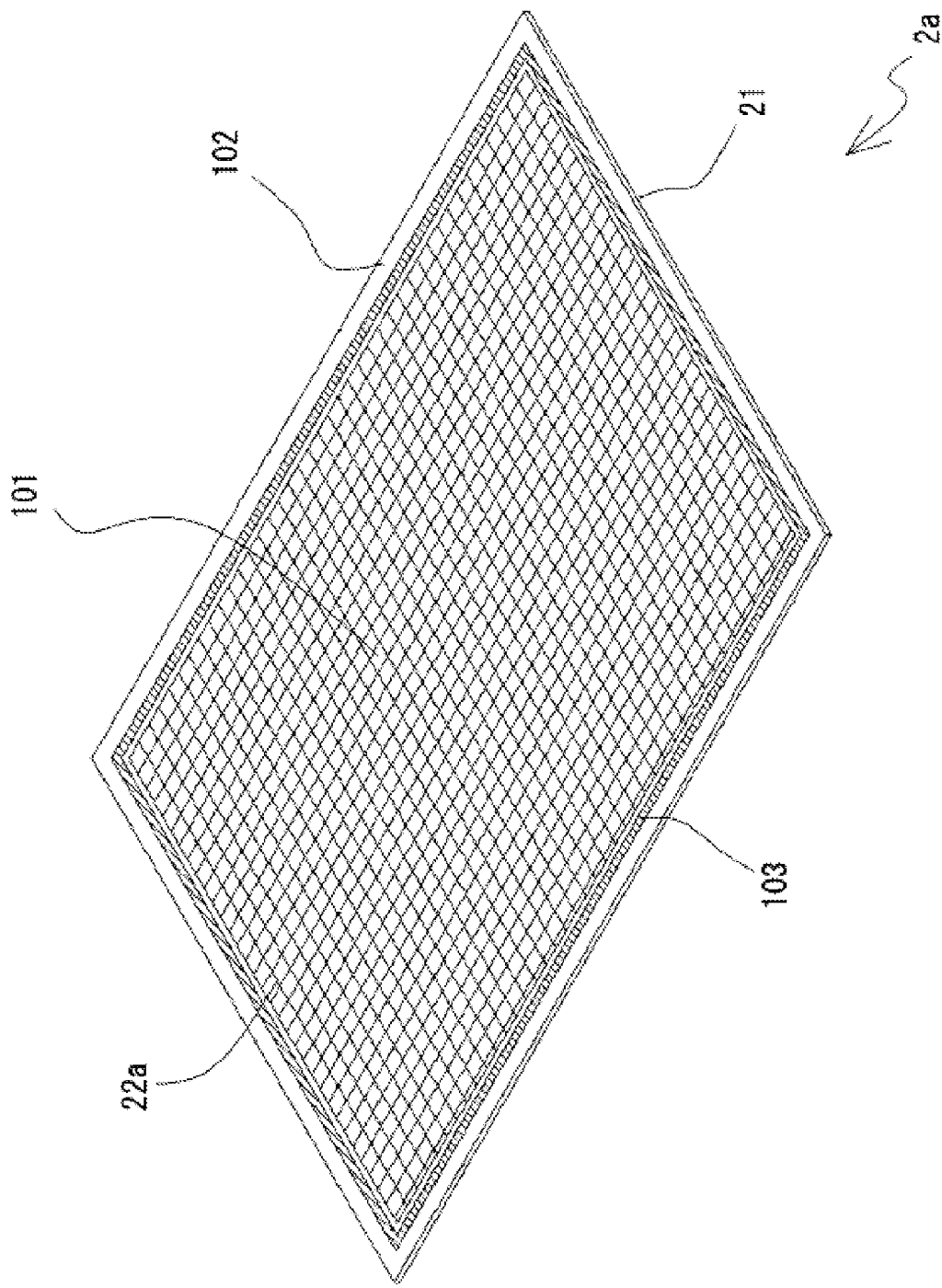
FIG. 3 is an exterior perspective view showing a configuration of a first substrate in a display panel of Embodiment 1 of the present invention.

FIG. 3 is an exterior perspective view showing a configuration of the first substrate 2a of the display panel 1a of Embodiment 1 of the present invention. FIG. 4(a) is a plan view of some of the pixels formed in the first substrate 2a of the display panel 1a of Embodiment 1 of the present invention, schematically showing a planar structure of the pixels. FIG. 4(b) is a cross-sectional view along the line A-A in FIG. 4(a), schematically showing a cross-sectional structure of the pixels.

As shown in FIGS. 3, 4(a), and 4(b), the first substrate 2a has a transparent substrate 21 made of glass or the like, and on the surface the substrate 21, a black matrix 22a, colored patterns 23r, 23g, and 23b of prescribed colors, a protective film 24, a transparent electrode 25 (may also be referred to as a "common electrode"), and spacers (two types of spacers: first spacers 261; and second spacers 262) are formed. In the first substrate 2a, the display region 101 and the panel frame region 102 are formed.

In the display region 101, pixels are arranged in a prescribed manner. FIGS. 3, 4(a), and 4(b) show a configuration in which the pixels are arranged in a matrix (so-called "stripe pattern," "diagonal pattern," "rectangle pattern," or the like), but there is no special limitation on the arrangement pattern of the pixels. The pixels may be arranged in a delta pattern, for example.

The panel frame region 102 is formed so as to enclose the display region 101. In the panel frame region 102, a seal pattern region 103 is formed. The seal pattern region 103 is a region where the sealing member 12 is formed, and has a prescribed width dimension (dimension in the direction perpendicular to the longitudinal direction of each side). The seal pattern region 103 is formed so as to enclose the display region 101 with no opening.

As shown in FIGS. 3, 4(a), and 4(b), on one surface of the first substrate 2a, a black matrix 22a is formed. The black matrix 22a is an element that has a light-shielding property. The black matrix 22a borders (defines) the pixels in the display region, and is provided to block unwanted light from passing through the panel frame region. The black matrix 22a is formed of a photosensitive resin composite (such as a photosensitive acrylic resin composite) containing a black colorant (a colorant having a light-shielding property), or a metal (such as chrome (Cr)), for example.

The black matrix 22a defines pixels in the display region 101. As shown in FIGS. 3, 4(a), and 4(b), in a portion of the black matrix 22a that is formed in the display region 101, openings of a prescribed shape are formed and arranged in a prescribed manner. In other words, the black matrix 22a forms a grid pattern in the display region. The respective openings (regions enclosed by the grids) formed in the black matrix 22a become transmissive regions (portions that transmit light) in the respective pixels. As shown in FIGS. 3, 4(a), and 4(b), the openings are generally formed in a substantially rectangular shape.

The black matrix 22a also has "cover portions 221" that respectively cover thin film transistors 32 that are formed in the second substrate 3a. These cover portions 221 face (overlap) the respective thin film transistors 32 that are formed in the second substrate 3a when the first substrate 2a and the second substrate 3a are bonded to each other. As shown in FIG. 4(a), for example, the cover portions 221 are formed near the respective intersections of the grids so as to extend toward the inside of the openings.

The specific dimensions and shape of the black matrix 22a are determined in accordance with the locations, dimensions, and shapes of elements formed in the second substrate (thin film transistors 32 as switching elements, in particular) as described later in detail.

In the openings formed in the black matrix 22a (that is, regions bordered by the grids of the black matrix 22a), colored patterns in three colors, which are red colored pattern 23r, green colored pattern 23g, and blue colored pattern 23b, are formed. These colored patterns 23r, 23g, and 23b of the respective colors are provided for a color display. There is no limitation on types or the number of colors of the colored patterns. The colored patterns may also have five colors in total that include cyan colored pattern and yellow colored pattern, for example, in addition to the colored patterns of the three colors: the red colored pattern 23r; green colored pattern 23g; and blue colored pattern 23b.

As shown in FIG. 4(b) in particular, on the surfaces of the black matrix 22a and the colored patterns of the respective colors 23r, 23g, and 23b, a protective film 24 is formed. The protective film 24 is an element that has a function of protecting the colored patterns 23r, 23g, and 23b. The protective film 24 is formed of an acrylic resin composite, an epoxy resin composite, or the like. On the surface of the protective film 24, a transparent electrode 25 is formed. The transparent electrode 25 is an element that has a function of applying a voltage to the polymer network liquid crystal 11 together with a transparent electrode of the second substrate (which will be described later). The transparent electrode 25 is a film made of a transparent conductive material, and is formed of indium tin oxide (ITO), for example.

The first spacers 261 and the second spacers 262 are formed on the surface of the protective film 24 in locations that overlap the black matrix 22a. The first spacers 261 and the second spacers 262 have a function of defining spacing (cell gap) between the first substrate 2a and the second substrate 3a (maintaining the cell gap at a prescribed value). The first spacers 261 and the second spacers 262 are columnar or protruding elements, and are made of a photosensitive resin composite, for example. As shown in FIG. 4(b), the height (protruding length from the surface of the protective film) of the first spacers 261 and the height of the second spacers 262 differ from each other. The second spacers 262 are formed to be shorter than the first spacers 261.

The colored patterns 23r, 23g, and 23b of the respective colors, the protective film 24, and the transparent electrode 25 can be configured in a known manner, and therefore, the detailed descriptions are omitted.

Next, the second substrate 3a in the display panel 1a of Embodiment 1 of the present invention will be explained. Various known TFT array substrates can be used as the second substrate 3a in the display panel 1a of Embodiment 1 of the present invention, and therefore, it will be explained briefly.

Figure 5:
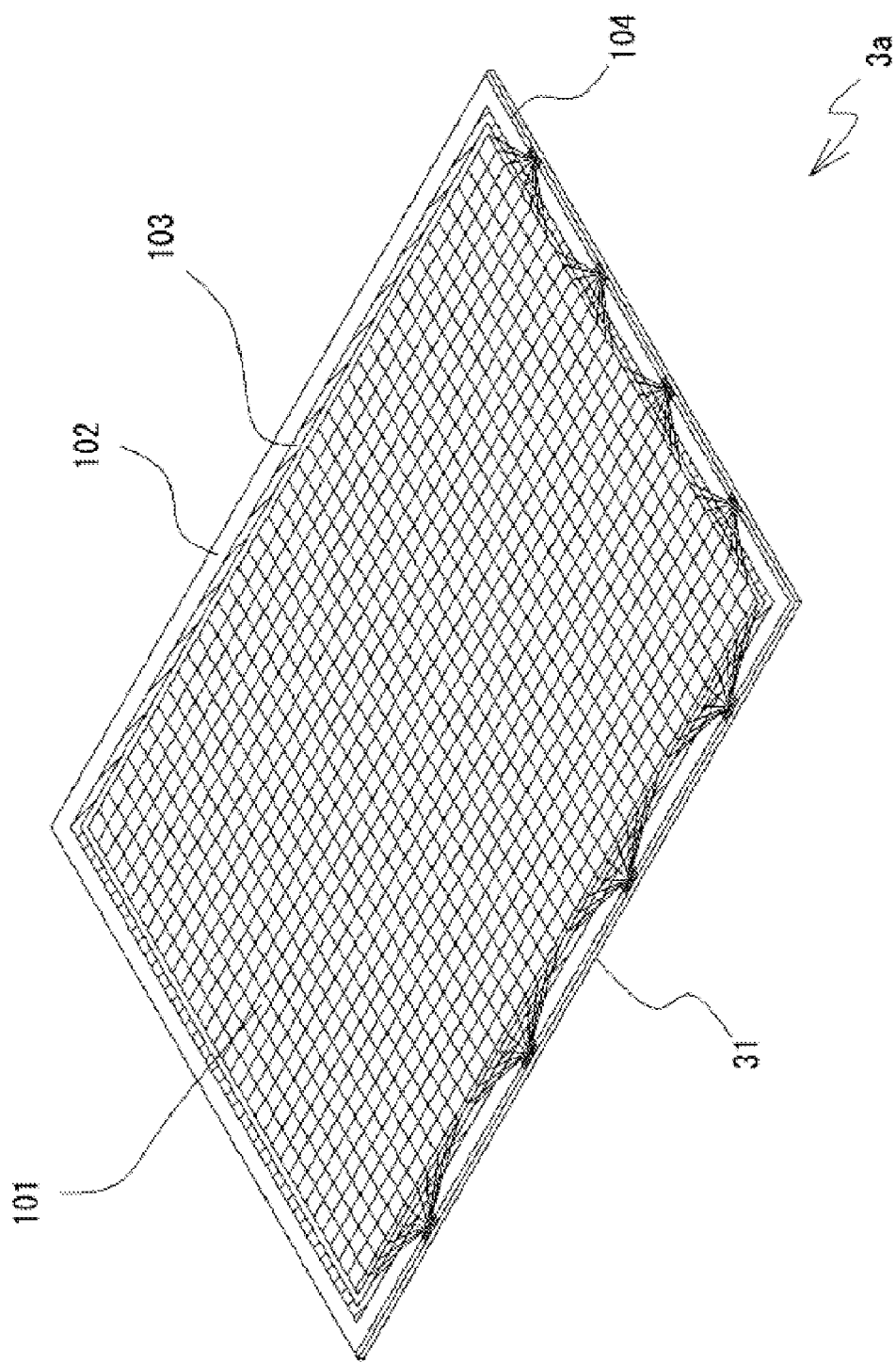
FIG. 5 is an exterior perspective view that schematically shows a configuration of a second substrate in the display panel of Embodiment 1 of the present invention.
Figure 6:
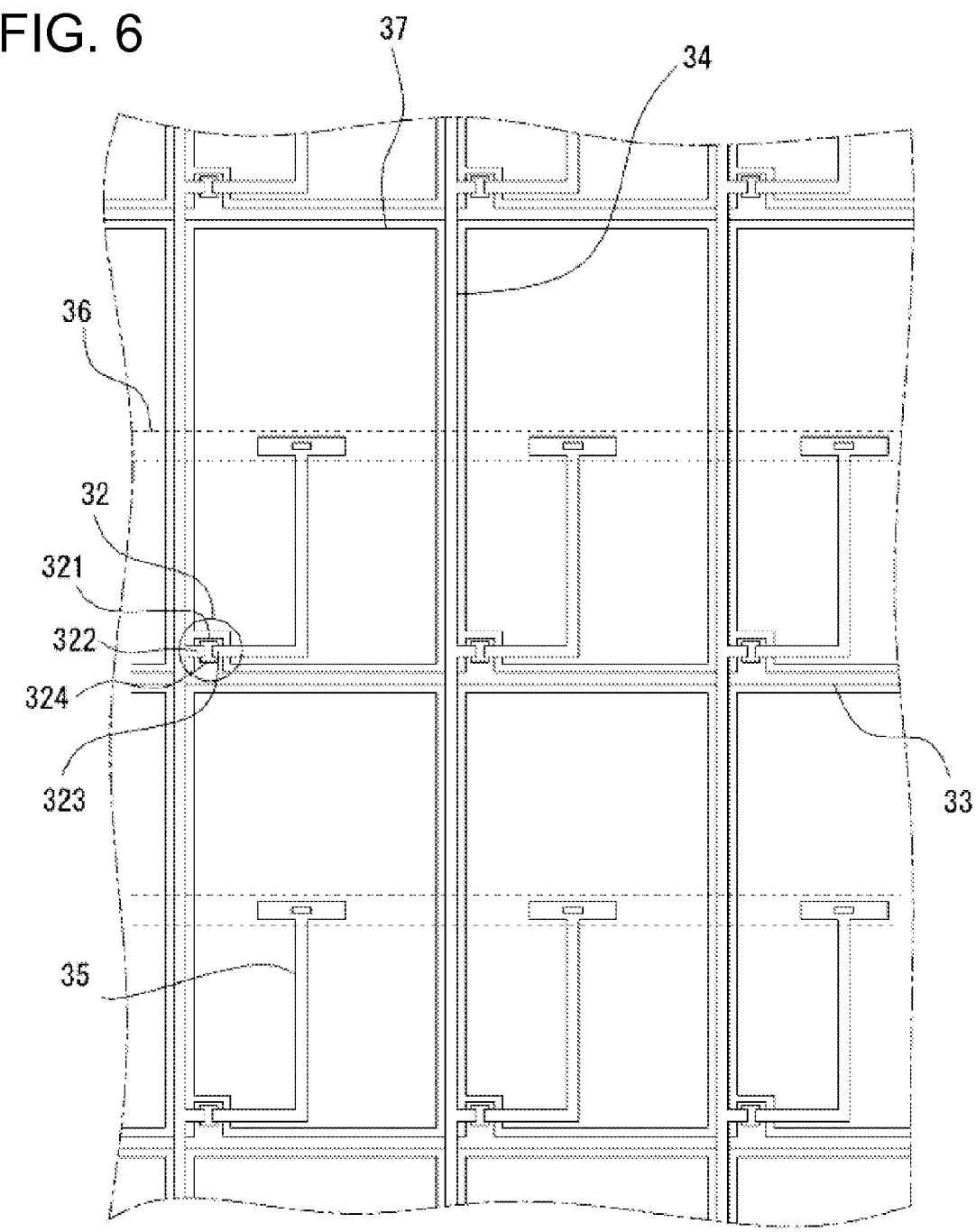
FIG. 6 is a plan view that schematically shows a configuration of pixels formed in the second substrate of the display panel of Embodiment 1 of the present invention.
Figure 7:
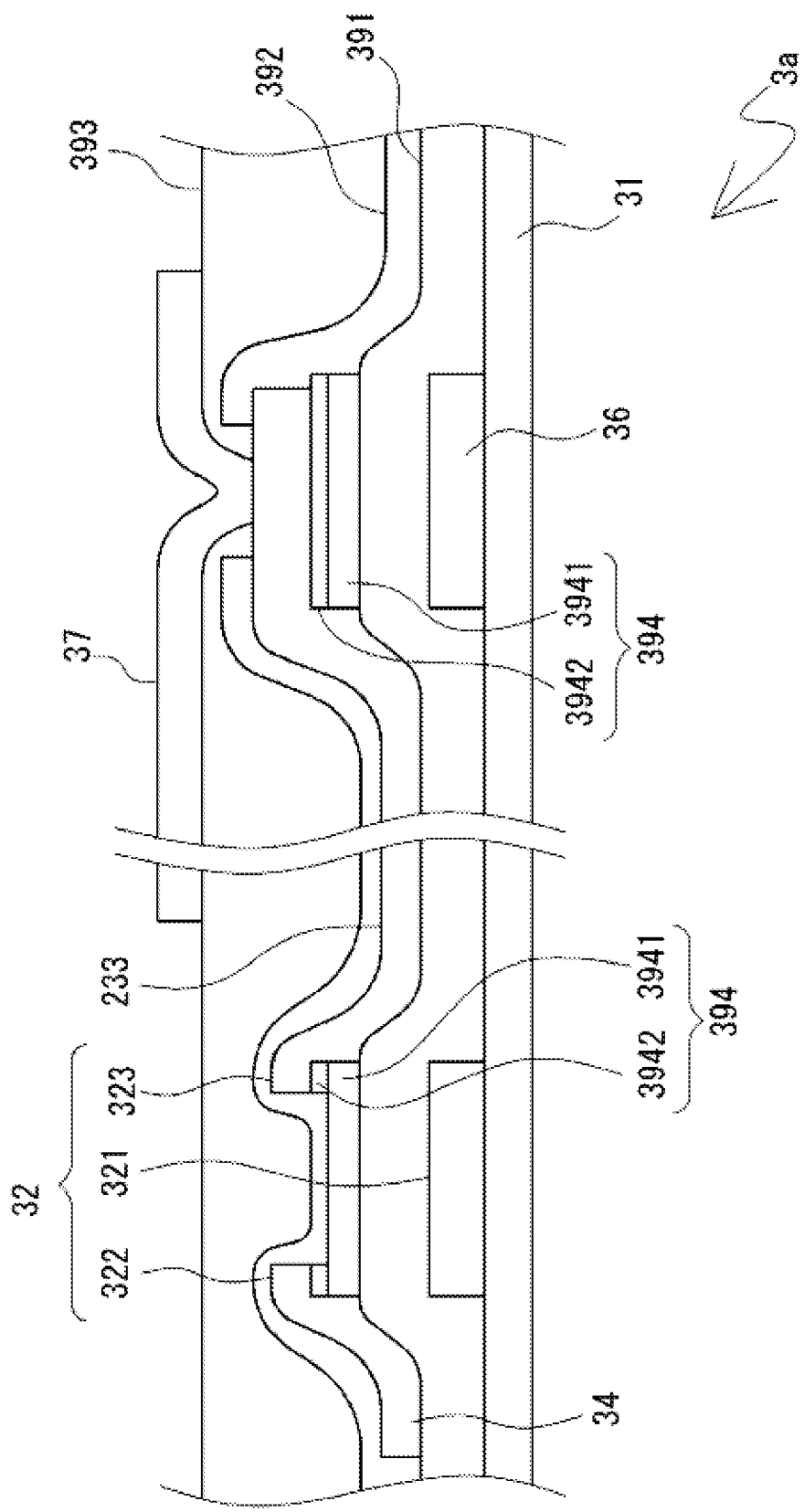
FIG. 7 is a cross-sectional view that schematically shows a cross-sectional structure of the pixels formed in the second substrate in the display panel of Embodiment 1 of the present invention.

FIG. 5 is an exterior perspective view that schematically shows a configuration of the second substrate 3a in the display panel 1a of Embodiment 1 of the present invention. FIG. 6 is a plan view that schematically shows a configuration of the pixels formed in the second substrate 3a in the display panel 1a of Embodiment 1 of the present invention. FIG. 7 is a cross-sectional view that schematically shows a cross-sectional structure of the pixels formed in the second substrate 3a in the display panel 1a of Embodiment 1 of the present invention. FIG. 7 is a schematic diagram for illustrating the cross-sectional structure of the pixels, and is not a cross-sectional view taken along an actual particular cut line.

As shown in FIG. 5, the second substrate 3a has a configuration in which the display region 101 and the panel frame region 102 are formed on the surface of a transparent substrate 31 made of glass or the like.

The display region 101 is a region where images are displayed. In the display region 101, pixel electrodes 37, thin film transistors (TFTs) 32 as switching elements, gate wiring lines 33 (may also be referred to as "scan lines," "gate bus lines," and the like), source wiring lines 34 (may also be referred to as "data lines," "source bus lines," and the like), drain wiring lines 35, and auxiliary capacitance wiring lines 36 (may also be referred to as "holding capacitance wiring lines," "storage capacitance wiring lines," "Cs bus lines" and the like) are formed.

The thin film transistors 32 as switching elements drive the pixel electrodes 37. Each of the thin film transistors 32 includes the gate electrode 321, the source electrode 322, and the drain electrode 323. The thin film transistors 32 can be configured in a known manner, which will be described later in detail.

The source wiring lines 34 are electrically connected to the source electrodes 322 of the plurality of prescribed thin film transistors 32. As shown in FIG. 6 in particular, prescribed number of source wiring lines 34 are formed so as to be substantially in parallel with each other. The respective source wiring lines 34 can transmit source signals (signals that define luminance gradation of the respective pixels; may also be referred to as "data signals," "luminance signals," "gradation signals," or the like) to the source electrodes 322 of the plurality of prescribed thin film transistors 32, respectively.

The gate wiring lines 33 are electrically connected to the gate electrodes 321 of the plurality of prescribed thin film transistors 32. As shown in FIG. 6 in particular, prescribed number of gate wiring lines 33 are formed so as to be substantially in parallel with each other in a direction that is substantially perpendicular to the source wiring lines 34. The respective gate wiring lines 33 can transmit gate pulses (voltage applied to the gate electrode 321 to make a current flow between the source electrode 322 and the drain electrode 323 of the thin film transistor 32; may also be referred to as "select pulse" and the like) to the gate electrodes 321 of the plurality of prescribed thin film transistors 32, respectively.

The auxiliary capacitance wiring lines 36 and the prescribed pixel electrodes 37 form auxiliary capacitances (electrically, a type of electrostatic capacitance; may also be referred to as "holding capacitance," "storage capacitance," and the like). The auxiliary capacitances are used to maintain the potential of the respective pixel electrodes 37 at a prescribed value for a prescribed period of time so that luminance of the respective pixels is maintained at a prescribed level for a prescribed period of time.

The panel frame region 102 is a region disposed so as to enclose the display region 101. In the panel frame region 102, a seal pattern region 103 (a region indicated with the hatching) and a terminal region 104 are formed. The seal pattern region 103 of the second substrate 3a has substantially the same configuration as that of the seal pattern region 103 of the first substrate 2a.

The terminal region 104 is a band-shaped region that is formed at the outer edges or near the outer edges of prescribed sides of the panel frame region 102. As shown in FIG. 5, the second substrate 3a has a configuration in which the terminal region 104 is formed at two sides that are adjacent to each other (one of the longer sides and one of the shorter sides) of the outer sides of the second substrate 3a, for example. In the terminal region 104, wiring electrode terminals (not shown) are formed, and a circuit board having a source driver (an IC or an LSI, for example) that generates source signals based on signals from the outside mounted thereon and a circuit board having a gate driver (an IC or an LSI, for example) that generates gate pulses based on signals from the outside mounted thereon are disposed. These circuit boards are connected to the wiring electrode terminals.

In the panel frame region 102, wiring lines that electrically connect prescribed source wiring lines 34 and prescribed wiring electrode terminals, wiring lines that electrically connect prescribed gate wiring lines 33 and prescribed wiring electrode terminals, wiring lines that electrically connect prescribed auxiliary capacitance wiring lines 36 and prescribed wiring electrode terminals, and other prescribed wiring lines are formed. According to such a configuration, source signals generated by the source driver and gate pulses generated by the gate driver are sent to the source wiring lines 34 and the gate wiring lines 33 formed in the display region 101 through the prescribed wiring lines formed in the panel frame region 102. This makes it possible to apply prescribed voltages to the respective pixel electrodes 37 at prescribed timings (thereby allowing the thin film transistors 32 to drive the pixel electrodes 37).

Figure 8:
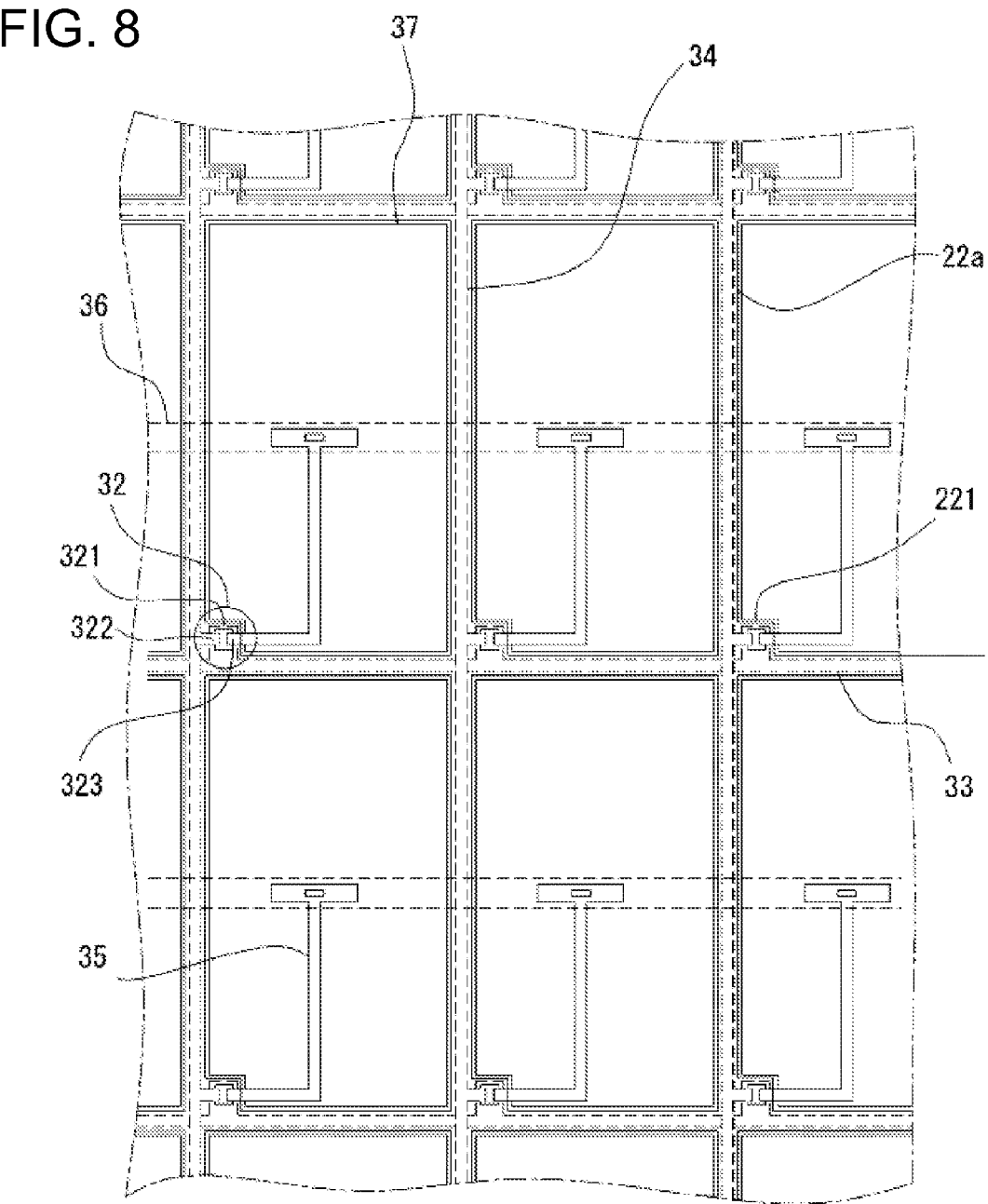
FIG. 8 is a schematic plan view of the first substrate and the second substrate that are bonded to each other in the display panel of Embodiment 1 of the present invention, showing a part of a display region thereof.

FIG. 8 is a schematic plan view of the first substrate 2a and the second substrate 3a bonded to each other in the display panel 1a of Embodiment 1 of the present invention, showing a part of the display region 101. FIG. 8 shows a position of the black matrix 22a in the first substrate 2a relative to the thin film transistors 32, the gate wiring lines 33, the source wiring lines 34, and the like in the second substrate 3a.

As shown in FIG. 8, in the display region 101, the grid portions of the black matrix 22a formed in the first substrate 2a face (overlap) the gate wiring lines 33 and the source wiring lines 34 formed in the second substrate 3a. The cover portions 221 of the black matrix face (overlap) the thin film transistors 32. Therefore, when the display panel 1a of Embodiment 1 of the present invention is viewed from the side of the first substrate 2a, the thin film transistors 32 are covered by the cover portions 221 of the black matrix 22a, and cannot be seen.

On the other hand, because the black matrix 22a is not formed in locations that face (locations that overlap) the drain wiring lines 35 and the auxiliary capacitance wiring lines 36, when the display panel 1a of Embodiment 1 of the present invention is viewed from the side of the first substrate 2a, the drain wiring lines 35 and the auxiliary capacitance wiring lines 36 are not covered by the black matrix 22a, and can be seen.

The width dimension of the grid portions of the black matrix 22a is set to be as small as possible. That is, the width dimension of the grid portions of the black matrix 22a is set to the smallest dimension that can prevent light from leaking from between the respective adjacent pixels. In FIG. 8, the width dimension of the grid portions of the black matrix 22a is larger than the width dimension of the gate wiring lines 33 and the source wiring lines 34, but the present invention is not limited to this configuration. For example, the width dimension of the grid portions of the black matrix may be substantially the same as or smaller than the width dimensions of the gate wiring lines 33 and the source wiring lines 34. The width dimension of the grid portions of the black matrix 22a is set to the smallest dimension that can prevent light from leaking from between the respective adjacent pixels, in accordance with the light-shielding property and the like of the material of the black matrix 22a.

The dimension and shape of the cover portions 221 are set to the smallest dimension and shape that can prevent light energy from reaching the thin film transistors 32 in the second substrate 3a when radiating the light energy from the side of the first substrate 2a. The specific example will be explained below.

Figure 9:
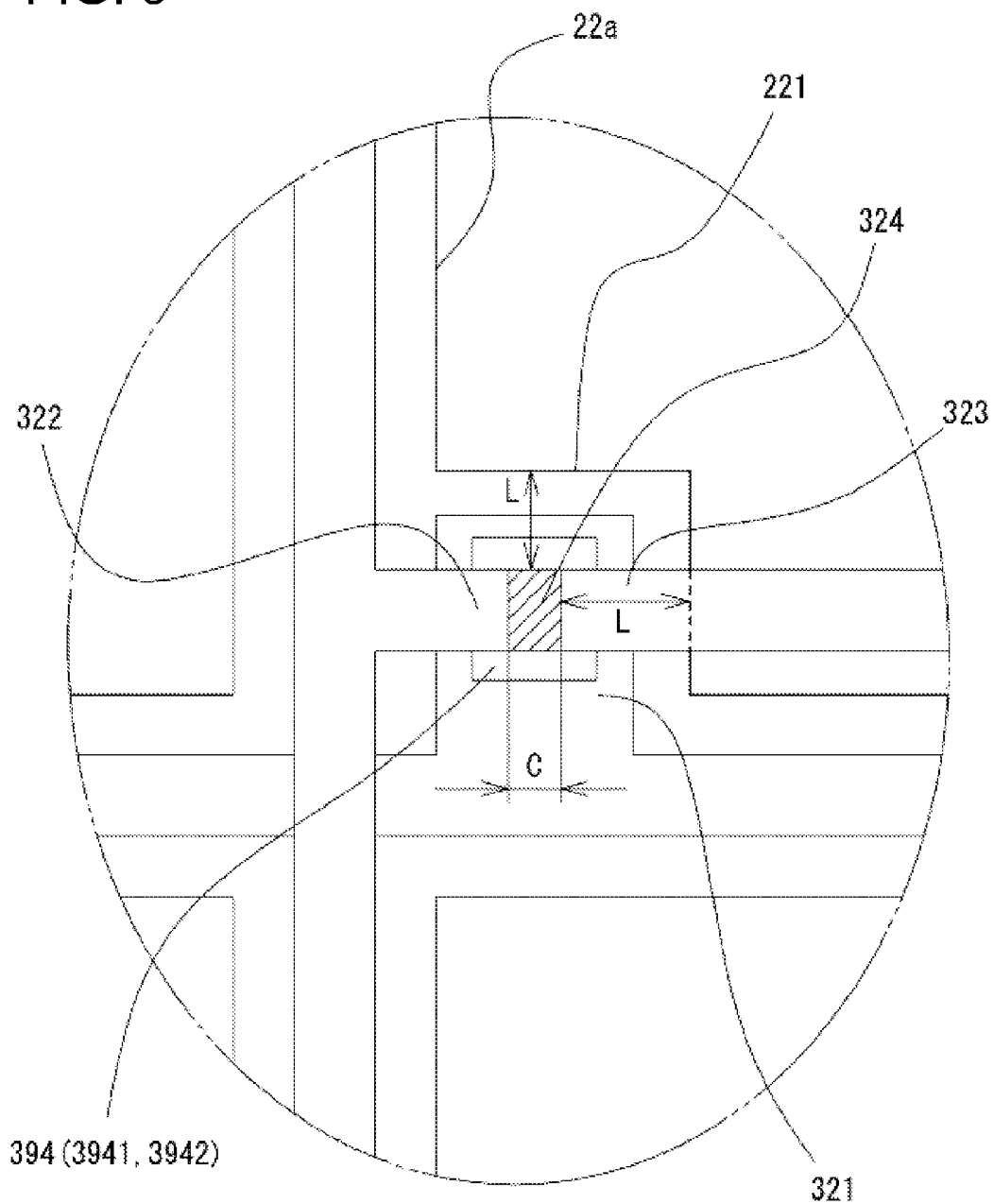
FIG. 9 is a schematic plan view of the first substrate and the second substrate that are bonded to each other in the display panel of Embodiment 1 of the present invention, showing a thin film transistor and a cover portion of a black matrix.

FIG. 9 is a schematic plan view of the first substrate 2a and the second substrate 3a bonded to each other in the display panel 1a of Embodiment 1 of the present invention, showing one of the thin film transistor 32 and one of the cover portions 221 of the black matrix 22a. Other elements that are not necessary for explanation are not shown in FIG. 9.

As shown in FIG. 9, the thin film transistors 32 formed in the second substrate 3a each has the gate electrode 321, the source electrode 322, and the drain electrode 323. Between the gate electrode 321 and the source electrode 322 and between the gate electrode 321 and the drain electrode 323, a gate insulating film (not shown) and a semiconductor film 394 are formed. That is, the gate insulating film is formed on the surface of the gate electrode 321, and the semiconductor film 394 is formed on the surface of the gate insulating film so as to overlap the gate electrode 321. On the surface of the semiconductor film 394, the source electrode 322 and the drain electrode 323 are formed so as to face each other through a prescribed gap. A region (region indicated with hatching in FIG. 9) between the source electrode 322 and the drain electrode 323 is a channel region 324.

The black matrix 22a and the cover portion 221 of the black matrix 22a provided in the first substrate 2a are disposed so as to face the thin film transistor 32. That is, when the first substrate 2a and the second substrate 3a are viewed from a direction perpendicular to the plane direction thereof, the black matrix 22a and the cover portion 221 of the black matrix 22a in the first substrate 2a overlap the thin film transistor 32.

The outer peripheries of the black matrix 22a and the cover portion 221 of the black matrix 22a are located outside the outer periphery of the channel region 324 at a distance of at least 10 μm greater than a sum of "the length C of the channel region 324," "the height of the surface of the element that is formed in the uppermost layer of the second substrate 3a from the surface of the channel region 324," and "the thickness of the polymer network liquid crystal 11." That is, (the distance L from the outer periphery of the channel region 324 to the outer peripheries of the black matrix and the cover portion of the black matrix) shown in FIG. 9 fulfills the following:

$$L \geq \text{(the length } C \text{ of the channel region 324)} + \text{(the height of the surface of the element that is formed in the uppermost layer of the second substrate 3a from the surface of the the channel region 324)} + \text{(the thickness of the polymer network liquid crystal 11)} + \text{(10 μm)}.$$

"The length C of the channel region 324" is a distance between the source electrode 322 and the drain electrode 323 of the thin film transistor 32 as shown in FIG. 9. "The element that is formed in the uppermost layer of the second substrate 3a" varies depending on the type and configuration of the second substrate 3a, but examples thereof include a third insulating film (organic insulating film) 393 (not shown; the third insulating film 393 will be later described) and the like.

The following effects can be achieved by the display panel 1a of Embodiment 1 of the present invention configured in the manner described above.

In the step of radiating light energy to the liquid crystal material having monomers mixed therein for polymerizing the monomers, it is possible to reduce the amount (volume) of monomers that are not irradiated with light energy, while preventing the light energy from reaching the thin film transistors 32. The black matrix 22a formed in the first substrate 2a in the display panel 1a of Embodiment 1 of the present invention is not formed in locations that face the auxiliary capacitance wiring lines 36 and the drain wiring lines 35. The dimension of the grid portions of the black matrix 22a is set to the smallest dimension that can prevent light from leaking from between the respective adjacent pixels. Therefore, even though light energy is not radiated to regions that are covered by the black matrix 22a (regions where the black matrix 22a is projected to), when light energy is radiated from the side of the first substrate 2a to the display panel 1a of Embodiment 1 of the present invention, such regions are made small. This makes it possible to reduce the portions that are not irradiated with the light energy in the liquid crystal material having monomers mixed therein.

In the liquid crystal material having monomers mixed therein, the portions that are not irradiated with the light energy are not polymerized, and therefore become "monomer unreacted regions." The optical transmittance and the refractive index may differ between the monomer unreacted regions and the polymerized portions. Therefore, presence of the monomer unreacted regions may cause "seeping of light" inside of such regions or at interfaces thereof, resulting in the display non-uniformity. Also, the monomer unreacted regions have a different physical property from that of the polymerized portions. Therefore, if the monomer unreacted regions are present, when an external force or the like is applied to the display panel of Embodiment 1 of the present invention, the stress may not be absorbed in the monomer unreacted regions, causing "vacuum bubbles" to be formed. The optical transmittance and the refractive index of the vacuum bubbles are different from those of other portions, and therefore, "seeping of light" may occur in the vacuum bubbles, resulting in the display non-uniformity.

In the display panel 1a of Embodiment 1 of the present invention, because the amount of the monomer unreacted regions can be reduced (the volume thereof can be reduced), the above-mentioned problems caused by the monomer unreacted regions can be prevented or suppressed. Thus, the display panel 1a of Embodiment 1 of the present invention can perform high-quality display that is free from the display non-uniformity.

According to the display panel 1a of Embodiment 1 of the present invention, in the step of polymerizing the monomers, it is possible to prevent light energy from reaching the thin film transistors 32 formed in the second substrate 3a. When the thin film transistors 32 are irradiated with light energy such as ultraviolet light, electrical characteristics thereof may change. When the channel region 324 is irradiated with ultraviolet light in particular, characteristics of the semiconductor film 394 may change, causing the characteristics of the thin film transistor 32 to change. This makes it difficult to apply prescribed voltages to the respective pixel electrodes 37, and consequently, the quality of displayed images may be lowered. However, according to the display panel 1a of Embodiment 1 of the present invention, the light energy can be prevented from reaching the thin film transistors 32, which prevents the change in characteristics of the thin film transistors 32. As a result, the high-quality image display can be achieved (or degradation of the quality of displayed images can be prevented).

It becomes possible to reliably prevent the ultraviolet light from reaching the channel region 324 when the following condition is fulfilled in particular:

(the distance L from the outer periphery of the channel region 324 to the outer peripheries of the black matrix 22a and the cover portion 221 of the black matrix 22a)≧(the length C of the channel region 324)+(the height of the surface of the element that is formed in the uppermost layer of the second substrate 3a from the surface of the channel region 324)+(the thickness of the polymer network liquid crystal 11)+(10 μm).

That is, when ultraviolet light is radiated in an oblique manner, the ultraviolet light reaches a portion where the black matrix 22a and the cover portion 221 of the black matrix 22a overlap the thin film transistor 32. By setting "the distance L from the outer periphery of the channel region 324 to the outer peripheries of the black matrix 22a and the cover portion 221 of the black matrix 22a" so as to be equal to or greater than the sum of "the length C of the channel region 324," "the height of the surface of the element that is formed in the uppermost layer of the second substrate 3a from the surface of the channel region 324," and "the thickness of the polymer network liquid crystal 11," even when ultraviolet light is radiated in an oblique manner, it is possible to prevent the ultraviolet light from reaching the channel region 324 of the thin film transistor. Especially, if the angle of incidence of the ultraviolet light is 45° or less, the ultraviolet light can be reliably prevented from reaching the channel region 324.

Further, by providing the above-mentioned dimension with a margin of 10 μm, even if the first substrate and the second substrate are misaligned, ultraviolet light can be prevented from reaching the channel region 324 of the thin film transistor.

Figure 10:
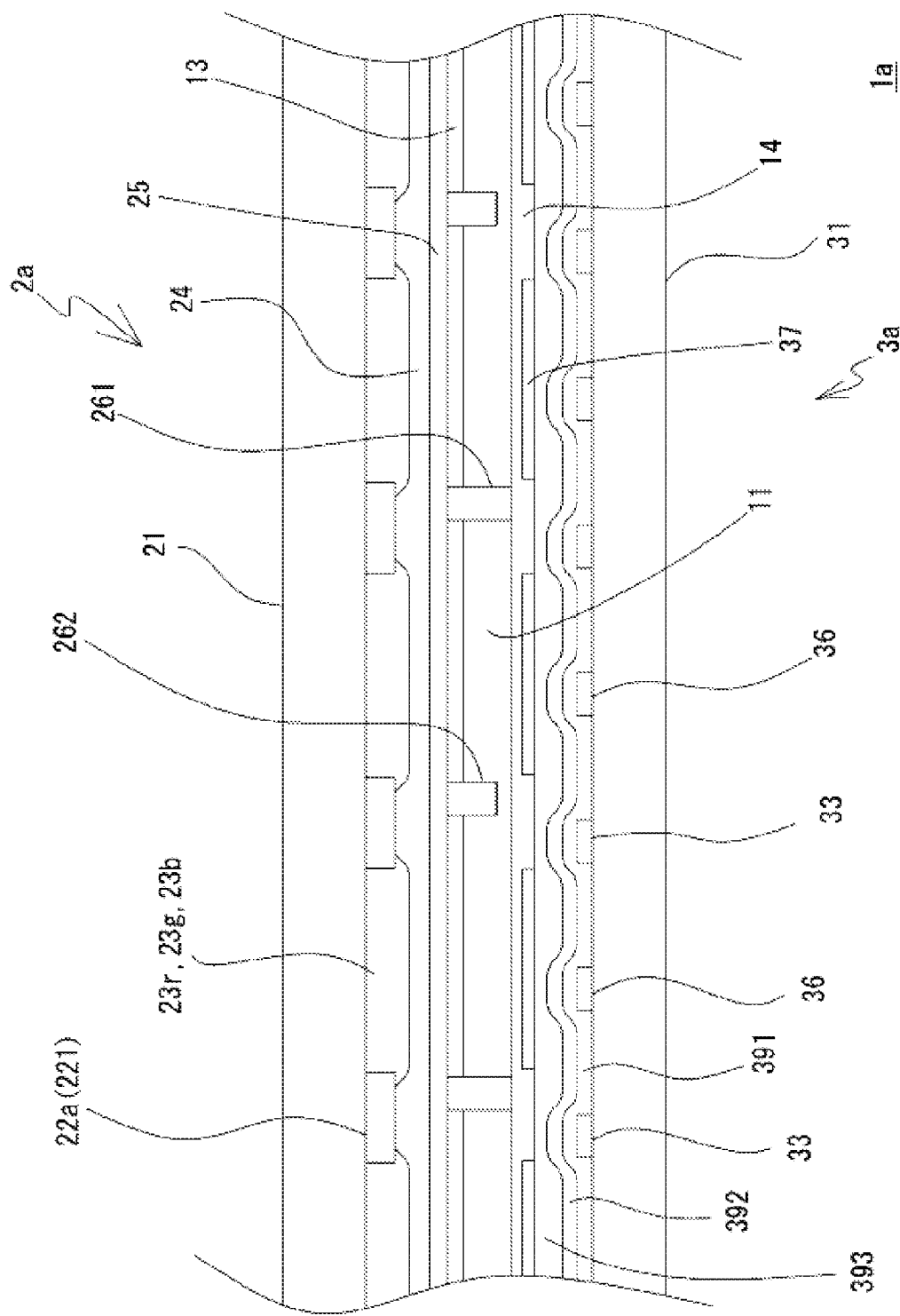
FIG. 10 is a schematic diagram that shows a cross-sectional structure of the display panel of Embodiment 1 of the present invention, showing a part of the display region thereof.

Next, specific configurations and effects of the first spacers 261 and the second spacers 262 will be explained. FIG. 10 is a schematic diagram that shows a cross-sectional structure of the display panel 1a of Embodiment 1 of the present invention, showing a part of the display region 101.

When a force that makes the first substrate 2a and the second substrate 3a closer to each other is not applied, the ends of the first spacers 261 formed in the first substrate 2a are in contact with the surface of the second substrate 3a (more accurately, with the surface of the element that is formed in the uppermost layer out of the elements formed in the second substrate 3a) as shown in FIG. 10. On the other hand, because the second spacers 262 are formed to be shorter than the first spacers 261, in this state, the ends of the second spacers 262 are not in contact with the surface of the second substrate 3a. Therefore, when a force that makes the first substrate 2a and the second substrate 3a closer to each other is not applied, the cell gap is defined by the first spacers 261 only, and the second spacers 262 do not define the cell gap.

On the other hand, when the first substrate 2a and the second substrate 3a get closer to each other, the first spacers 261 are compressively deformed. As a result, the ends of the second spacers 262 make contact with the surface of the second substrate 3a. Therefore, in this state, the cell gap of the display panel 1a of Embodiment 1 of the present invention is defined by both the first spacers 261 and the second spacers 262. When the ends of the second spacers 262 are in contact with the surface of the second substrate 3a, it is difficult to further reduce the cell gap because a force required to make the first substrate 2a and the second substrate 3a closer to each other becomes greater than that of the case where only the first spacers 261 are in contact with the surface of the second substrate 3a.

Table 1 shows a relationship of a difference in height between the first spacers 261 and the second spacers 262 with the occurrence of display non-uniformity, and a relationship of a difference in height between the first spacers 261 and the second spacers 262 with the function of maintaining the cell gap. As shown in Table 1, when the difference in height between the first spacers 261 and the second spacers 262 becomes smaller than 0.1 μm, the separation of the liquid crystal occurs on the surface of the first substrate 2a or the second substrate 3a. On the other hand, if the height difference exceeds 1.0 μm, the cell gap cannot be maintained at a prescribed value when a strong pressure load from the outside is applied to the display panel 1a of an embodiment of the present invention. Therefore, it is preferable that the difference in height between the first spacers 261 and the second spacers 262 be set to be in a range of 0.1 μm to 1.0 μm.

TABLE 1

Relationships of Height Difference between First Spacer and Second Spacer with Occurrence of Display Non-Uniformity and with Function of Maintaining Cell Gap

| Height difference (μm) between first spacer and second spacer | Evaluation on display non-uniformity | Cell gap upon application of pressure load | Evaluation |
| --- | --- | --- | --- |
| 0.05 | NG | OK | NG |
| 0.1 | OK | OK | OK |
| 0.5 | OK | OK | OK |
| 1 | OK | OK | OK |
| 1.5 | OK | NG | NG |
| 2 | OK | NG | NG |

Therefore, when no or little external force or the like is applied to the display panel 1a of Embodiment 1 of the present invention, as shown in FIG. 10 in particular, the ends of the first spacers 261 are in contact with the surface of the second substrate 3a (more accurately, a structure that is formed in the uppermost layer of prescribed structures formed in the second substrate 3a; an alignment film 14 in the display panel 1a of Embodiment 1 of the present invention). However, the ends of the second spacers 262 are not in contact with the surface of the second substrate 3a, and between the ends of the second spacers 262 and the second substrate 3a, a gap of a prescribed dimension is formed in accordance with a difference in height between the first spacers 261 and the second spacers 262.

There is no special limitation on the number of the first spacers 261, but a cross-sectional area (here, referred to an area of a cross-section that appears when the spacer is cut in a direction parallel to the surface of the first substrate 2a) of each first spacer 261, the number of the first spacers 261, and an area of a region that is filled with the polymer network liquid crystal 11 (in other words, an area of the region enclosed by the sealing member 12) are set so as to satisfy the following equation (1):

(the total cross-sectional area of the first spacers 261)/(the area of the region filled with the polymer network liquid crystal 11)=0.001 to 0.017     Equation (1)

In a state before the first substrate 2a and the second substrate 3a are bonded to each other by the sealing member 12 (state where the first substrate 2a is present as a single component), the following Equation (2) is to be satisfied:

(the total cross-sectional area of the first spacers 261)/(the area of the region enclosed by the seal pattern region 103)=0.001 to 0.017     Equation (2)

There is no special limitation on the number of the second spacers 262 or a cross-sectional area of each second spacer 262, or there is no need to satisfy conditions similar to those for the first spacers 261.

According to this configuration, even when the volume of the polymer network liquid crystal 11 is changed (especially even when the volume is reduced), because the first spacers 261 are deformed, the first substrate 2a and the second substrate 3a are allowed to deform so as to follow the volume change of the polymer network liquid crystal 11 (the cell gap can be made smaller). Therefore, the separation of the polymer network liquid crystal 11 from the surface(s) of the first substrate 2a and/or the second substrate 3a can be prevented or suppressed. Also, by the first spacers 261, the cell gap can be maintained at a prescribed value.

Table 2 shows a relationship of a value derived from (the total cross-sectional area of the first spacers 261)/(the area of the region enclosed by the sealing member 12) (this value is described as "density of first spacers" in Table 2) with the occurrence of display non-uniformity, and a relationship of a value derived from (the total cross-sectional area of the first spacers 261)/(the area of the region enclosed by the sealing member 12) with the function of maintaining the cell gap.

TABLE 2

Relationships of Density of First Spacers with Occurrence of Display Non-Uniformity and with Function of Maintaining Cell Gap

| Density of first spacers | Evaluation on display non-uniformity | Cell gap upon application of pressure load | Evaluation |
| --- | --- | --- | --- |
| 0.032 | NG | OK | NG |
| 0.025 | NG | OK | NG |
| 0.020 | NG | OK | NG |
| 0.017 | OK | OK | OK |
| 0.012 | OK | OK | OK |
| 0.0050 | OK | OK | OK |
| 0.0010 | OK | OK | OK |
| 0.0005 | OK | NG | NG |

As shown in Table 2, when the value derived from (the total cross-sectional area of the first spacers 261)/(the area of the region enclosed by the sealing member 12) exceeds 0.017, the separation of the liquid crystal occurs. On the other hand, when the value is smaller than 0.001, the cell gap cannot be maintained at a prescribed value by the first spacers 261. Therefore, it is preferable that the value derived from (the total cross-sectional area of the first spacers 261)/(the area of the region enclosed by the sealing member 12) be in a range of 0.001 to 0.017.

As described above, in the display panel 1a of Embodiment 1 of the present invention, because the separation of the polymer network liquid crystal 11 from the first substrate 2a or the second substrate 3a can be prevented or suppressed, the occurrence of air bubbles at the interface(s) between the polymer network liquid crystal 11 and the first substrate 2a and/or the second substrate 3a can be prevented or suppressed. Further, the cell gap can also be maintained at a prescribed value. Therefore, not only the occurrence of display non-uniformity caused by the presence of air bubbles, but also the occurrence of display non-uniformity caused by a change in the cell gap (uneven cell gap, for example) can be prevented or suppressed. This allows the display panel 1a of Embodiment 1 of the present invention to perform a high-quality display (or degradation of display quality can be prevented).

If the second spacers 262 that are shorter than the first spacers 261 are provided, the cell gap can be maintained at a prescribed value even when a strong pressure load (particularly, a pressure load that makes the first substrate 2a and the second substrate 3a of the display panel 1a of Embodiment 1 of the present invention get closer to each other; a compressive force) is applied to the display panel 1a of Embodiment 1 of the present invention.

That is, with no or only a small pressure load from the outside applied to the display panel 1a of Embodiment 1 of the present invention, the ends of the second spacers 262 are not in contact with the surface of the second substrate 3a, and therefore, the cell gap is defined by the first spacers 261 only. Thus, in this condition, because the first spacers 261 are deformed, the first substrate 2a and the second substrate 3a are allowed to deform so as to follow the volume change of the polymer network liquid crystal 11. This can prevent or suppress the separation of the polymer network liquid crystal 11.

When a strong pressure load is applied from the outside to the display panel 1a of Embodiment 1 of the present invention, the first spacers 261 are compressively deformed, and are reduced in height. As a result, the ends of the second spacers 262 make contact with the surface of the second substrate 3a. Therefore, the second spacers 262, in addition to the first spacers 261, fulfill the function of maintaining the cell gap at a prescribed value. When the second spacers 262, in addition to the first spacers 261, fulfill the function of defining the cell gap, the display panel 1a of Embodiment 1 of the present invention becomes stronger against the pressure load (becomes less likely to deform). Thus, even when a strong pressure load from the outside is applied to the display panel 1a of Embodiment 1 of the present invention, the cell gap of the display panel 1a of Embodiment 1 of the present invention is maintained at a prescribed value. That is, in this condition, the cell gap of the display panel 1a of Embodiment 1 of the present invention is maintained at a prescribed value by the first spacers 261 and the second spacers 262.

In particular, when the difference in height between the first spacers 261 and the second spacers 262 is set in a range of 0.1 to 1.0 µm, both the prevention or suppression of the separation of the polymer network liquid crystal 11 and the retention of the cell gap can be achieved more effectively.

As described above, in the display panel 1a of Embodiment 1 of the present invention, when the volume of the polymer network liquid crystal 11 is changed, the first substrate 2a and the second substrate 3a are allowed to deform so as to follow the volume change of the polymer network liquid crystal 11, thereby preventing or suppressing the separation of the polymer network liquid crystal 11. On the other hand, when a strong pressure load is applied, the deformation of the first substrate 2a and the second substrate 3a is prevented or suppressed, and as a result, the cell gap can be maintained at a prescribed value.

The first spacers 261 and the second spacers 262 are formed in locations that overlap the black matrix 22a, and therefore, the first spacers 261 or the second spacers 262 do not interfere with the image display of the display panel 1a of Embodiment 1 of the present invention.

Figure 4:
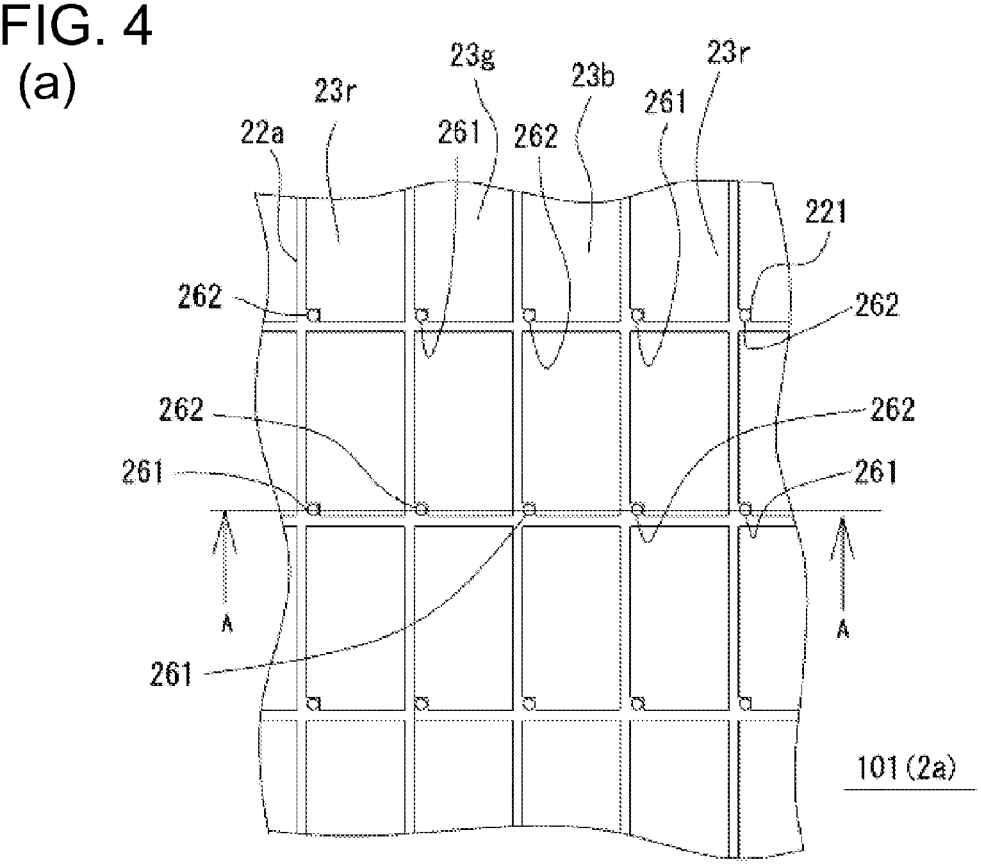
FIG. 4(*a*) is a plan view of some of the pixels formed in the first substrate in the display panel of Embodiment 1 of the present invention, schematically showing a planar structure of the pixels.
Figure 4:
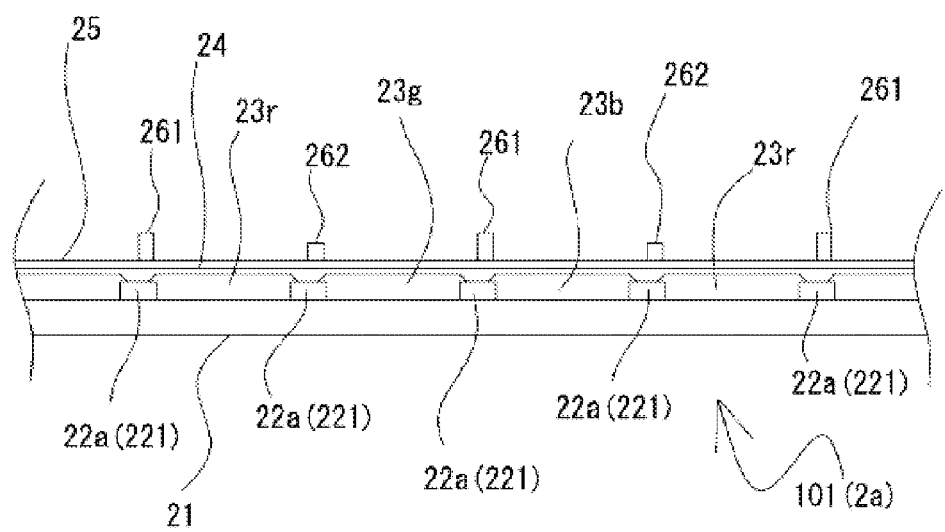

In FIG. 4, the diagrams show a configuration in which the first spacers 261 and the second spacers are alternately formed in all of the cover portions 221 of the black matrix 22a. However, the first spacers and the second spacers may also be alternately formed in some of the cover portions only.

Next, a method of manufacturing the display panel 1a of Embodiment 1 of the present invention will be explained. The method of manufacturing the display panel 1a of an embodiment of the present invention includes a color filter manufacturing process (that is, a manufacturing process of the first substrate 2a), a TFT array substrate manufacturing process (that is, a manufacturing process of the second substrate 3a), and a panel manufacturing process (may also be referred to as a "cell manufacturing process").

Figure 11:
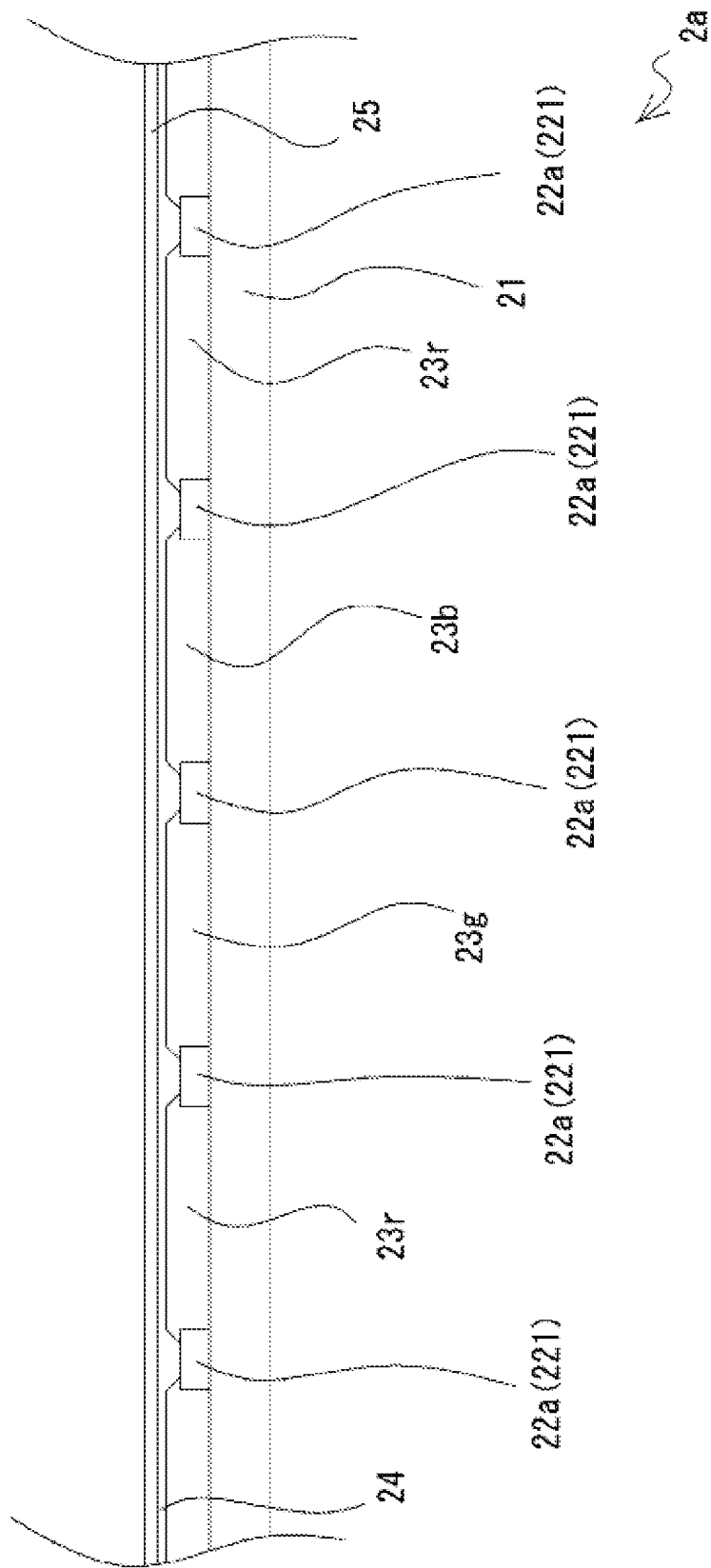
FIG. 11 is a cross-sectional view that schematically shows prescribed steps in a color filter manufacturing process. The figure is a cross-sectional view that schematically shows a process (1) of forming a black matrix to a process (4) of forming a transparent electrode.
Figure 12:
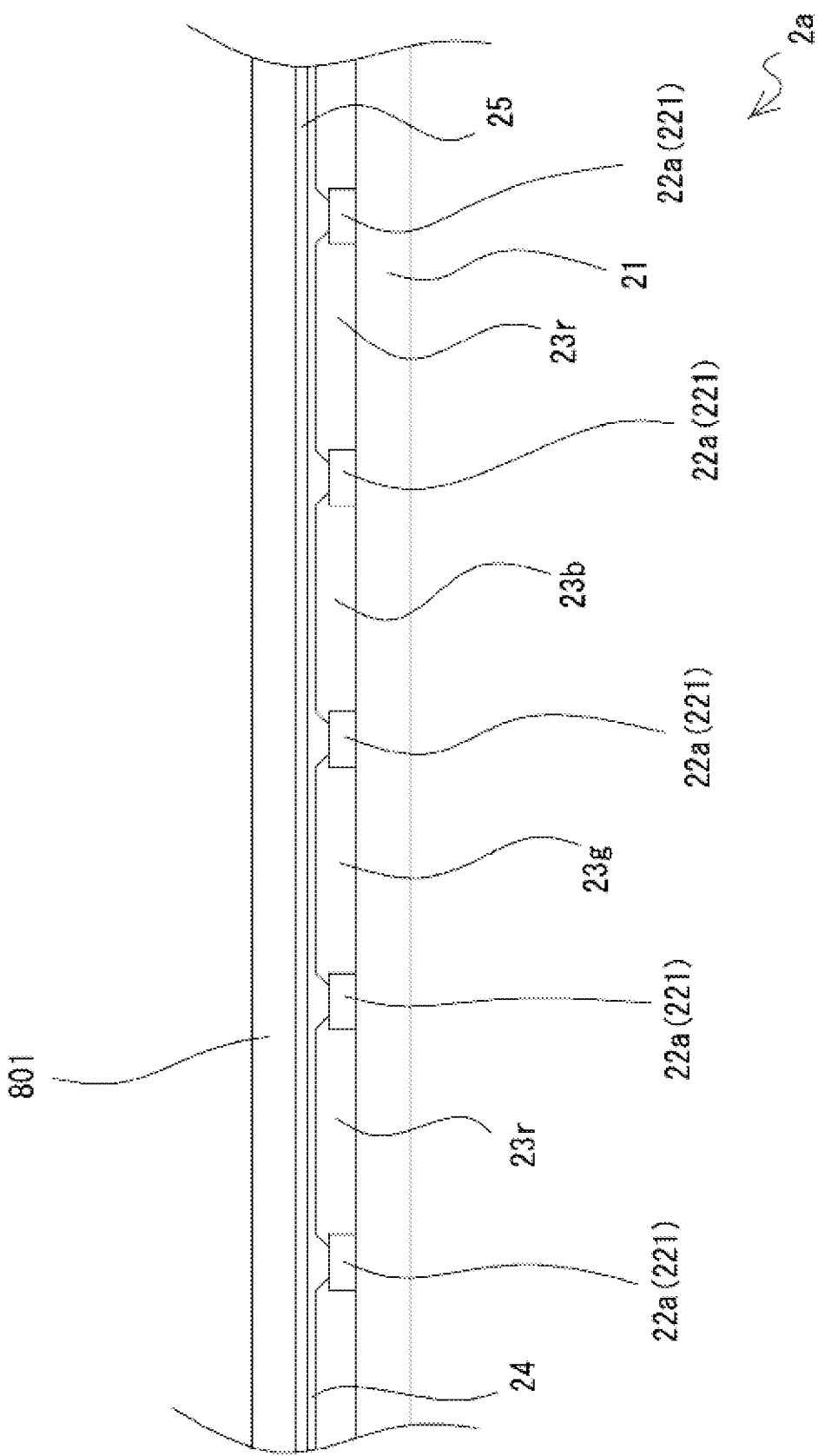
FIG. 12 is a cross-sectional view that schematically shows a prescribed step in a color filter manufacturing process. The figure is a cross-sectional view that schematically shows a step of forming a film of a photosensitive resin composite in a process (5) of forming a spacer.
Figure 13:
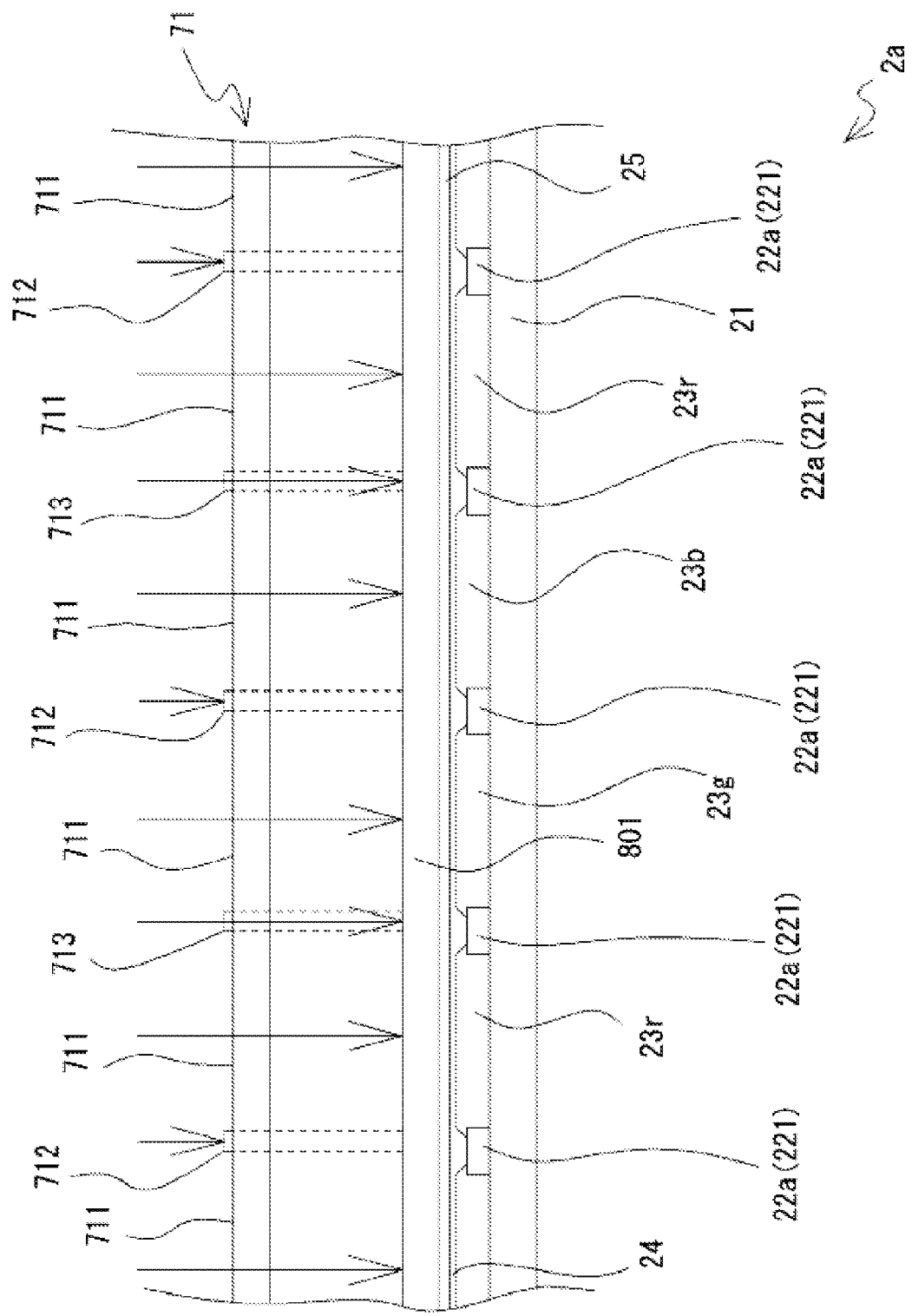
FIG. 13 is a cross-sectional view that schematically shows a prescribed step of a color filter manufacturing process. The figure is a cross-sectional view that schematically shows an exposure process in the process (5) of forming a spacer.
Figure 14:
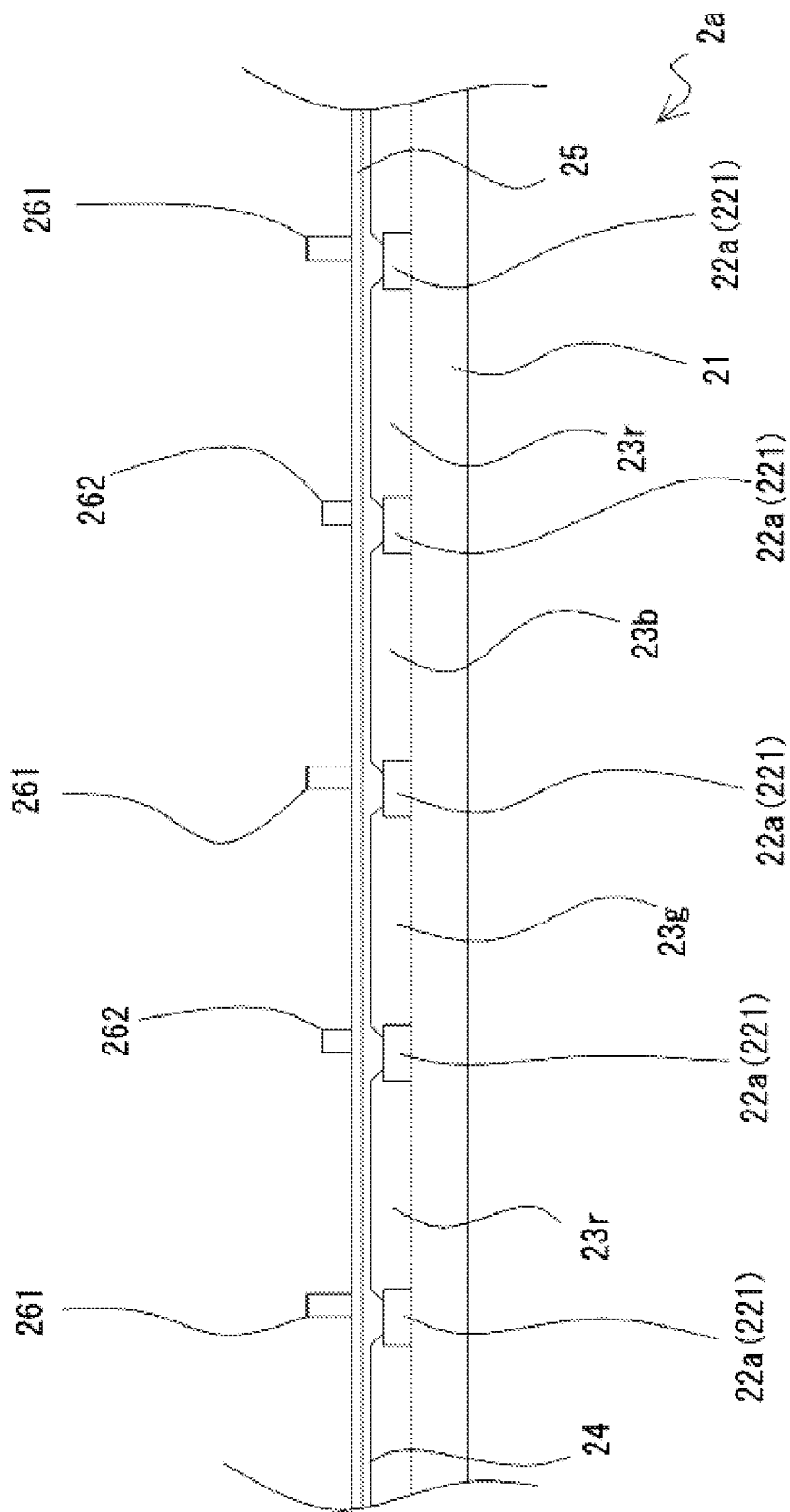
FIG. 14 is a cross-sectional view that schematically shows a prescribed step of a color filter manufacturing process. The figure is a cross-sectional view that schematically shows a development process in the process (5) of forming a spacer.

The color filter manufacturing process (manufacturing process of the first substrate 2a) is as follows. The color filter manufacturing process includes processes of (1) forming a black matrix, (2) forming colored patterns, (3) forming a protective film, (4) forming a transparent electrode, and (5) forming spacers. FIGS. 11 to 14 are cross-sectional views that schematically show prescribed steps of the color filter manufacturing process. Specifically, FIG. 11 is a cross-sectional view that schematically shows the processes from (1) forming a black matrix to (4) forming a transparent electrode. FIG. 12 is a cross-sectional view that schematically shows a step of forming a photosensitive resin composite film in the process (5) of forming spacers. FIG. 13 is a cross-sectional view that schematically shows an exposure process in the process (5) of forming spacers. FIG. 14 is a cross-sectional view that schematically shows a development process in the process (5) of forming spacers.

In the process (1) of forming a black matrix, as shown in FIG. 11, the black matrix 22a is formed on one surface of the transparent substrate 21 made of glass or the like. The resin BM method, for example, can be employed as the method of forming the black matrix 22a as described below. First, on one surface of the transparent substrate 21, a film is formed of a photosensitive resin composite that has a light-shielding property (a photosensitive resin composite that contains a black colorant, for example) (hereinafter referred to as "BM resist"). Next, the BM resist film that has been formed is patterned into a prescribed pattern by photolithography. By this patterning, the BM resist film is configured to have openings of a prescribe shape that are arranged in a prescribed manner (substantially grid-shaped pattern) in the display region 101. In a portion of the panel frame region 102 (portion where light is to be blocked), the BM resist film remains, and the remaining BM resist film becomes a light-shielding film in the panel frame region. The specific configuration of the black matrix 22a has been described above.

In the process (2) of forming colored patterns, the red colored pattern 23r, the green colored pattern 23g, and the blue colored pattern 23b are formed. The colored patterns 23r, 23g, and 23b of the respective colors can be formed by photolithography, a method using an inkjet printer, or the like. Specifically, in photolithography, first, on the surface of the transparent substrate 21 where the black matrix 22a has been formed, a film is formed of a photosensitive resin composite that contains a colorant of a prescribed color. Thereafter, by photolithography, unnecessary portions are removed from the photosensitive resin material film that has been formed. In this way, colored pattern of a prescribed color is formed in prescribed openings in the black matrix 22a (light-transmissive regions of the pixels). The above-mentioned process is conducted for the colored patterns of the respective colors: the red colored pattern 23r; the green colored pattern 23g; and the blue colored pattern 23b. In the method using an inkjet printer, a resin composite that contains a colorant of a prescribed color is injected in prescribed openings formed in the black matrix 22a by the inkjet printer. Thereafter, the injected resin composite is solidified. In this way, the colored patterns of the respective colors 23r, 23g, and 23b are formed.

In the process (3) of forming a protective film, the protective film 24 is formed on one surface (that is, the surface of the black matrix 22a and the surfaces of the colored patterns of the respective colors 23r, 23g, and 23b) of the transparent substrate 21 that has undergone the above-mentioned processes. The protective film 24 is formed by using a slit coater, a spin coater, or the like. That is, one surface of the transparent substrate 21 that has undergone the above-mentioned processes is coated with a solution of a resin composite, which is the material of the protective film 24 (that is, a film made of a solution of a resin composite, which is the material of the protective film 24, is formed.) Thereafter, the resin composite solution is solidified. Through this process, the protective film 24 is formed.

In the process (4) of forming a transparent electrode, the transparent electrode 25 is formed on a surface of the protective film 24. The transparent electrode 25 can be formed by a masking method or photolithography. Specifically, when the masking method is employed, a mask that has openings of prescribed dimension and shape is placed on the surface of the transparent substrate 21 that has undergone the above-mentioned processes, and then, a transparent conductive material, which is the material of the transparent electrode 25, is deposited by sputtering or the like. Through this process, the transparent electrode 25 having a prescribed pattern is formed in prescribed regions on the surface of the transparent substrate 21 (regions corresponding to the openings of the mask). When photolithography is employed, a film of a transparent conductive material, which is the material of the transparent electrode 25, is formed on the surface of the transparent substrate 21 that has undergone the above-mentioned processes, and the conductive material film that has been formed is patterned into a prescribed pattern (a pattern of the transparent electrode 25) by etching. As a result, the transparent electrode 25 having a prescribed pattern is formed. The conductive material film can be etched by wet etching using ferric chloride, for example. As the transparent conductive material, indium tin oxide is used.

In the process (5) of forming spacers, the first spacers 261 and the second spacers 262 are formed on the surface of the transparent electrode 25 in the locations that overlap the black matrix 22a. The first spacers 261 and the second spacers 262 are made of a photosensitive resin composite, and are simultaneously formed in the same process by photolithography. The details of the process are as follows.

First, as shown in FIG. 12, a photosensitive resin composite film 801 is formed on one surface of the transparent substrate 21 having the transparent electrode 25 formed thereon. The photosensitive resin composite film 801 is formed by a method of applying a solution of a photosensitive resin composite using a slit coater (forming a film of the solution), and thereafter solidifying the photosensitive resin composite coating, for example. The photosensitive resin composite may be of positive-type or negative-type. Here, a configuration using a positive-type photosensitive resin composite will be explained first.

After the photosensitive resin composite film 801 is formed, as shown in FIG. 13, an exposure process is conducted by using an exposure apparatus (not shown) and a prescribed photomask 71. The arrows in FIG. 13 schematically illustrate light energy delivered by the exposure apparatus. In the prescribed photomask 71, light-transmissive pattern 711, light-shielding pattern 712, and semi-light-transmissive pattern 713 are formed in prescribed shapes. The light-transmissive pattern 711 can transmit the light energy delivered by the exposure apparatus directly or almost directly. The light-shielding pattern 712 blocks the light energy delivered by the exposure apparatus. The semi-light-transmissive pattern 713 can transmit a reduced amount of the light energy delivered by the exposure apparatus. That is, the intensity of the light energy that has passed through the semi-light-transmissive pattern 713 is lower than the intensity of the light energy that has passed through the light-transmissive pattern 711.

The light-shielding pattern 712 is used to form the first spacers 261. The light-shielding pattern 712 has a shape corresponding to a cross-sectional shape of the first spacers 261 (a shape that is substantially the same as the cross-sectional shape of the first spacers 261, for example), and is formed in locations that correspond to the locations where the first spacers 261 are to be formed. The semi-light-transmissive pattern 713 is used to form the second spacers 262. The semi-light-transmissive pattern 713 has a shape corresponding to a cross-sectional shape of the second spacers 262 (a shape that is substantially the same as the cross-sectional shape of the second spacers 262, for example), and is formed in locations that correspond to the locations where the second spacers 262 are to be formed. Regions that are not included in the light-shielding pattern 712 or the semi-light-transmissive pattern 713 become the light-transmissive pattern 711.

As shown in FIG. 13, in the exposure process, prescribed portions of the photosensitive resin composite film 801 (portions that become the first spacers 261) are blocked by the light-shielding pattern 712 of the photomask 71, and are not irradiated with the light energy. Other prescribed portions (portions that become the second spacers 262) are irradiated with the light energy that has been reduced by the semi-light-transmissive pattern 713 (having a lower intensity than that of the light radiated through the light-transmissive pattern 711). The rest of the film is irradiated with the light energy through the light-transmissive pattern 711.

The irradiation with the light energy renders the positive-type photosensitive resin composite soluble to a developer. The extent of solubility to the developer changes in accordance with the intensity of the radiated light energy. That is, as the intensity of the radiated light energy is increased, the extent of the solubility to the developer becomes higher (more likely to dissolve), and as the intensity of the radiated light energy is decreased, the extent of the solubility to the developer becomes lower (less likely to dissolve). Thus, in the photosensitive resin composite film 801, the portions irradiated with the light energy through the semi-light-transmissive pattern 713 of the photomask 71 becomes less soluble to the developer as compared with the portions irradiated with the light energy through the light-transmissive pattern 711.

Thereafter, the photosensitive resin composite film 801 that has undergone the exposure process is developed. When the development process is conducted, as shown in FIG. 14, the portions irradiated with the light energy through the light-transmissive pattern 711 of the photomask 71 are removed. The portions where the light was blocked by the light-shielding pattern 712 of the photomask 71 remain on the surface of the transparent electrode 25. These remaining portions become the first spacers 261. The portions irradiated with the light energy through the semi-light-transmissive pattern 713 are less soluble to the developer as compared with the portions irradiated with the light energy through the light-transmissive pattern 711, and therefore, they are not completely dissolved to the developer, and remain on the surface of the transparent electrode 25. These remaining portions become the second spacers 262. However, because the portions irradiated with the light energy through the semi-light-transmissive pattern 713 has solubility to some extent, the thickness thereof is reduced as compared with the portions where the light was blocked by the light-shielding pattern 712. As a result, the second spacers 262 that are shorter than the first spacers 261 can be formed.

A height difference between the first spacers 261 and the second spacers 262 can be set to the above-mentioned range by appropriately setting the intensity of the light energy radiated to the photosensitive resin composite film 801.

Even with a negative-type photosensitive resin composite, the first spacers 261 and the second spacers 262 can be simultaneously formed in the same process. When using a negative-type photosensitive resin composite, a photomask used in the exposure process has a configuration in which the light-transmissive pattern 711 and the light-shielding pattern 712 are replaced with each other as compared with the photomask that is used for the positive-type photosensitive resin composite, while the semi-light-transmissive pattern 713 for the second spacers 262 has the same pattern in both cases.

That is, to explain with reference to FIG. 13, the light-shielding pattern 712 of the photomask 71 shown in FIG. 13 becomes the light-transmissive pattern in the photomask used for the negative-type photosensitive resin composite. The light-transmissive pattern 711 of the photomask 71 shown in FIG. 13 becomes the light-shielding pattern in the photomask used for the negative-type photosensitive resin composite. The semi-light-transmissive pattern for the second spacers 262 has the same pattern whether the photosensitive resin composite is of positive-type or negative-type, but the light energy transmittance level of the semi-light-transmissive pattern (reduction rate of the light energy intensity) is suitably set in accordance with the type of the photosensitive resin composite and the like.

In the exposure process, prescribed portions of the film made of the negative-type photosensitive resin composite (portions that become the first spacers 261) are irradiated with light energy through the light-transmissive pattern. Other prescribed portions (portions that become the second spacers 262) are irradiated with light energy having the intensity that has been reduced by the semi-light-transmissive pattern (having a lower intensity than that of the light energy radiated through the light-transmissive pattern). Portions that are not included in the prescribed portions (portions that become the first spacers 261) or the other prescribed portions (portions that become the second spacers 262) are blocked by the light-shielding pattern of the photomask, and are not irradiated with the light energy.

Thereafter, the development process is conducted for the negative-type photosensitive resin composite film that has undergone exposure. When the development process is conducted, as shown in FIG. 14, the prescribed portions of the negative-type photosensitive resin composite (portions that have been irradiated with the light energy through the light-transmissive pattern of the photomask) remain on the surface of the transparent electrode 25 because the solubility thereof to a developer has been lost. These remaining portions become the first spacers 261. The other prescribed portions (portions that have been irradiated with the light energy through the semi-light-transmissive pattern) of the negative-type photosensitive resin composite are less soluble to the developer, and therefore remain on the surface of the transparent electrode 25. These remaining portions become the second spacers 262. Because the portions irradiated with the light energy through the semi-light-transmissive pattern has solubility to some extent, the film thickness thereof is reduced. As a result, the second spacers 262 that are shorter than the first spacers 261 are formed. The portions that are not included in the prescribed portions or the other prescribed portions, i.e., the portions where the light was blocked by the light-shielding pattern of the photomask, are soluble to the developer, and are therefore removed.

As described above, even when a negative-type photosensitive resin composite is used, the first spacers 261 and the second spacers 262 that are shorter than the first spacers 261 can be formed simultaneously in the same process.

The first substrate 2a in the display panel 1a of Embodiment 1 of the present invention is manufactured through the above-mentioned process.

Next, the TFT array substrate manufacturing process (manufacturing process of the second substrate 3a of the display panel 1a of an embodiment of the present invention) will be explained with reference to FIG. 7. As the second substrate 3a, a known TFT array substrate can be used, and therefore, as the TFT array substrate manufacturing method, a known method of manufacturing a TFT array substrate can be employed. Therefore, it will be explained only briefly.

First, on one surface of a transparent substrate 31 made of glass or the like, a single-layered or multi-layered conductive film (hereinafter referred to as a "first conductive film") made of chrome, tungsten, molybdenum, aluminum, and the like is formed. As a method of forming the first conductive film, various known sputtering methods or the like can be employed. There is no special limitation on the thickness of the first conductive film, but the film can be formed in a thickness of about 300 nm, for example.

The first conductive film that has been formed is thereafter patterned into a prescribed pattern, and becomes the gate wiring lines 33, the auxiliary capacitance wiring lines 36, the gate electrodes 321 of the thin film transistors 32, and the like in the display region 101. In the panel frame region 102, the film becomes the wiring electrode terminals and other prescribed wiring lines. In patterning the first conductive film, various known wet etching methods or the like can be employed. When the first conductive film is made of chrome, for example, wet etching with an $(NH_4)_2[Ce(NH_3)_6]+HNO_3+H_2O$ solution can be employed.

Next, on the surface of the transparent substrate 31 that has undergone the above-mentioned process, an insulating film 391 (hereinafter referred to as a "first insulating film") is formed. As the first insulating film 391, a film made of $SiN_x$ (silicon nitride) or the like in a thickness of about 300 nm can be used. The first insulating film 391 can be formed by the plasma CVD method or the like. When the first insulating film 391 is formed, the gate wiring lines 33, the auxiliary capacitance wiring lines 36, the gate electrodes 321 of the thin film transistors 32, the wiring electrode terminals, and the prescribed wiring lines are covered by the first insulating film. In the first insulating film, portions thereof that are disposed on the surfaces of the gate electrodes 321 of the thin film transistors 32 become gate insulating films of the respective thin film transistors 32.

Next, in prescribed positions on the surface of the first insulating film 391, semiconductor films having prescribed dimension and shape are formed. Specifically, each semiconductor film 394 is formed in the position that overlaps the gate electrode 321 of the thin film transistor 32 through the first insulating film 391, and in the position that overlaps the auxiliary capacitance wiring line 36 through the first insulating film 391 where the auxiliary capacitance is to be formed. The semiconductor film 394 has a two-layer structure made of a first sub-semiconductor film 3941 and a second sub-semiconductor film 3942. The first sub-semiconductor film 3941 can be formed of amorphous silicon or the like in a thickness of about 100 nm. The second sub-semiconductor film 3942 can be formed of $n^+$-type amorphous silicon or the like in a thickness of about 20 nm. The first sub-semiconductor film 3941 also functions as an etching stopper layer in the step of forming source wiring lines 34 and drain wiring lines 35 by etching or the like. The second sub-semiconductor film 3942 has a function of ensuring suitable ohmic contact to the source electrode 322 and the drain electrode 323 of the thin film transistor 32 that are to be formed in the steps described below.

The semiconductor film 394 (the first sub-semiconductor film 3941 and the second sub-semiconductor film 3942) is formed by the plasma CVD method and photolithography. That is, first, a material of the semiconductor film 394 (the first sub-semiconductor film 3941 and the second sub-semiconductor film 3942) is deposited by the plasma CVD method on one surface of the transparent substrate 31 that has undergone the above-mentioned process. Then, after the semiconductor film 394 (the first sub-semiconductor film 3941 and the second sub-semiconductor film 3942) is formed, the film is patterned into a prescribed shape by photolithography or the like.

Specifically, on a surface of the semiconductor film 394 that has been formed, a layer of a photoresist material is formed. The photoresist material layer can be formed by a method using a slit coater, a spin coater, or the like. Next, the photoresist material layer that has been formed undergoes an exposure process using a prescribed photomask, followed by a development process. As a result, the photoresist material layer in the prescribed pattern is left on the surface of the semiconductor film 394 in the display region. The semiconductor film 394 is then patterned using the patterned photoresist material layer as a mask. For this patterning, wet etching with an $HF+HNO_3$ solution or dry etching with a $Cl_2/SF_6$ gas can be employed, for example. In the manner described above, the semiconductor films 394 (the first sub-semiconductor film 3941 and the second sub-semiconductor film 3942) are formed so as to overlap the gate electrodes 321 and the auxiliary capacitance wiring lines 36 through the first insulating film 391, respectively.

Next, the source wiring lines 34, the drain wiring lines 35, and the source electrodes 322 and the drain electrodes 323 of the thin film transistors 32 will be formed.

First, on one surface of the transparent substrate 31 that has undergone the above-mentioned process, a conductive film (this conductive film is "referred to as a second conductive film") is formed. The second conductive film is a material of the source wiring lines 34, the drain wiring lines 35, and the source electrodes 322 and the drain electrodes 323 of the thin film transistors 32. Thereafter, the second conductive film that has been formed is patterned into a prescribed shape. The second conductive film has a laminated structure of two or more layers that are made of titanium, aluminum, chrome, molybdenum, and the like, for example. When the second conductive film has a two-layer structure of a first sub-conductive film and a second sub-conductive film, for example, the first sub-conductive film can be made of titanium or the like, and the second sub-conductive film can be made of aluminum or the like.

The second conductive film can be formed by sputtering or the like. The patterning of the second conductive film can be conducted by dry etching with a $Cl_2/BCl_3$ gas, or wet etching with phosphoric acid, acetic acid, and nitric acid. By this patterning, the source wiring lines 34, the drain wiring lines 35, and the source electrodes 322 and the drain electrodes 323 of the thin film transistors 32 are formed of the second conductive film. Also, in this patterning, the second sub-semiconductor film is etched by using the first sub-semiconductor film as the etching stopper layer.

Through the above-mentioned process, the thin film transistors 32 (that is, the gate electrodes 321, the source electrodes 322, the drain electrodes 323, and the gate insulating films (first insulating film 391)), the source wiring lines 34, the gate wiring lines 33, the drain wiring lines 35, and the auxiliary capacitance wiring lines 36 are formed on the transparent substrate 31.

Next, in the display region 101 of the transparent substrate 31 that has undergone the above-mentioned process, a second insulating film 392 (also referred to as a "passivation film") and a third insulating film 393 (also referred to as an "organic insulating film" or a "planarizing film") are formed. This second insulating film 392 can be formed of $SiN_x$ (silicon nitride) in a thickness of about 300 nm. As a method of forming the second insulating film 392, the plasma CVD method or the like can be employed. On the surface of the second insulating film 392 that has been formed, the third insulating film 393 is formed. The third insulating film 393 can be made of an acrylic resin material. The third insulating film 393 can be formed by a method of applying a solution of the material of the third insulating film 393 by using a slit coater, a spin coater, or the like, and by solidifying the solution thereafter.

The third insulating film 393 that has been formed is patterned into a prescribed pattern by photolithography or the like. By this patterning, openings for electrically connecting the pixel electrodes 37 to the drain wiring lines 35 (that is, contact holes) are formed in the third insulating film 393.

When the openings are formed in the third insulating film 393, prescribed portions of the second insulating film 392 are exposed from the openings, respectively. Thereafter, by using the patterned third insulating film 393 as a mask, the second insulating film 392 is patterned. In this patterning, the portions of the second insulating film 392 that were exposed through the openings in the third insulating film 393 are removed, resulting in openings formed in the second insulating film 392. Dry etching with a $CF_4+O_2$ gas or an $SF_6+O_2$ gas can be employed for patterning the second insulating film 392 and the third insulating film 393.

Next, the pixel electrodes 37 are formed in the display region 101. In the same step, conductors that electrically connect prescribed source wiring lines 34 to prescribed wiring lines (wiring lines that electrically connect prescribed source wiring lines 34 to prescribed wiring electrode terminals, respectively) are formed in the panel frame region 102. The pixel electrodes 37 and the conductors can be made of ITO (indium tin oxide) in a thickness of about 100 nm, for example. As a method of forming the pixel electrodes 37 and the conductors, various known sputtering methods can be used.

Through the above-mentioned processes, the second substrate 3a (TFT array substrate) in the display panel 1a of an embodiment of the present invention is manufactured.

Next, a panel manufacturing process (cell manufacturing process) will be explained. The details of the panel manufacturing process are as follows. First, on the respective surfaces of the first substrate 2a (color filter) and the second substrate 3a (TFT array substrate) that have been obtained through the above-described processes, alignment films are formed. Thereafter, the first substrate 2a and the second substrate 3a are bonded together, and a liquid crystal material having monomers mixed therein is filled between these substrates.

A method of forming the alignment films is as follows. First, the respective surfaces of the first substrate 2a and the second substrate 3a are coated with an alignment material. The "alignment material" is a solution including a substance that is a material of the alignment films. As the material of the alignment films, polyimide is used, for example. The coating of the alignment material is thereafter heated and baked by an alignment film baking apparatus or the like. The alignment films are formed through the above-mentioned process. The first substrate 2a and the second substrate 3a may also be configured without the alignment films because the orientation of the liquid crystal is defined by the polymer network in the display panel 1a of Embodiment 1 of the present invention. When the substrates are configured without the alignment films, the process of forming the alignment films can be omitted, and the alignment material becomes no longer necessary.

Next, the sealing member 12 is applied on the seal pattern region 103 of the first substrate 2a or the seal pattern region 103 of the second substrate 3a by using a seal patterning apparatus or the like. As the sealing member 12, various known photosetting resin composites or thermosetting resin composites can be used.

Next, by using a liquid crystal dropping apparatus or the like, the liquid crystal material having monomers (acrylic monomers, for example) mixed therein is dropped in a region enclosed by the sealing member 12 (a region inside of the seal pattern region 103).

Next, under an atmosphere of a reduced pressure, the first substrate 2a and the second substrate 3a are assembled. When the first substrate 2a and the second substrate 3a are assembled, the seal pattern region 103 of the panel frame region 102 formed in the first substrate 2a and the seal pattern region 103 of the panel frame region 102 formed in the second substrate 3a face each other through a prescribed very small gap, which is filled with the sealing member 12. The display region 101 formed in the first substrate 2a and the display region 101 formed in the second substrate 3a also face each other through a prescribed very small gap, which is filled with the liquid crystal material having monomers mixed therein.

Thereafter, the sealing member 12 is solidified. If the sealing member 12 is a photosetting resin composite, the sealing member 12 is irradiated with light energy (ultraviolet light, for example) having a prescribed wavelength band. If made of a thermosetting resin composite, the sealing member 12 is heated to a prescribed temperature. When the sealing member 12 is cured, the first substrate 2a and the second substrate 3a are bonded to each other by the sealing member, and the liquid crystal material having monomers mixed therein is sealed in the region enclosed by the sealing member 12.

Figure 15:
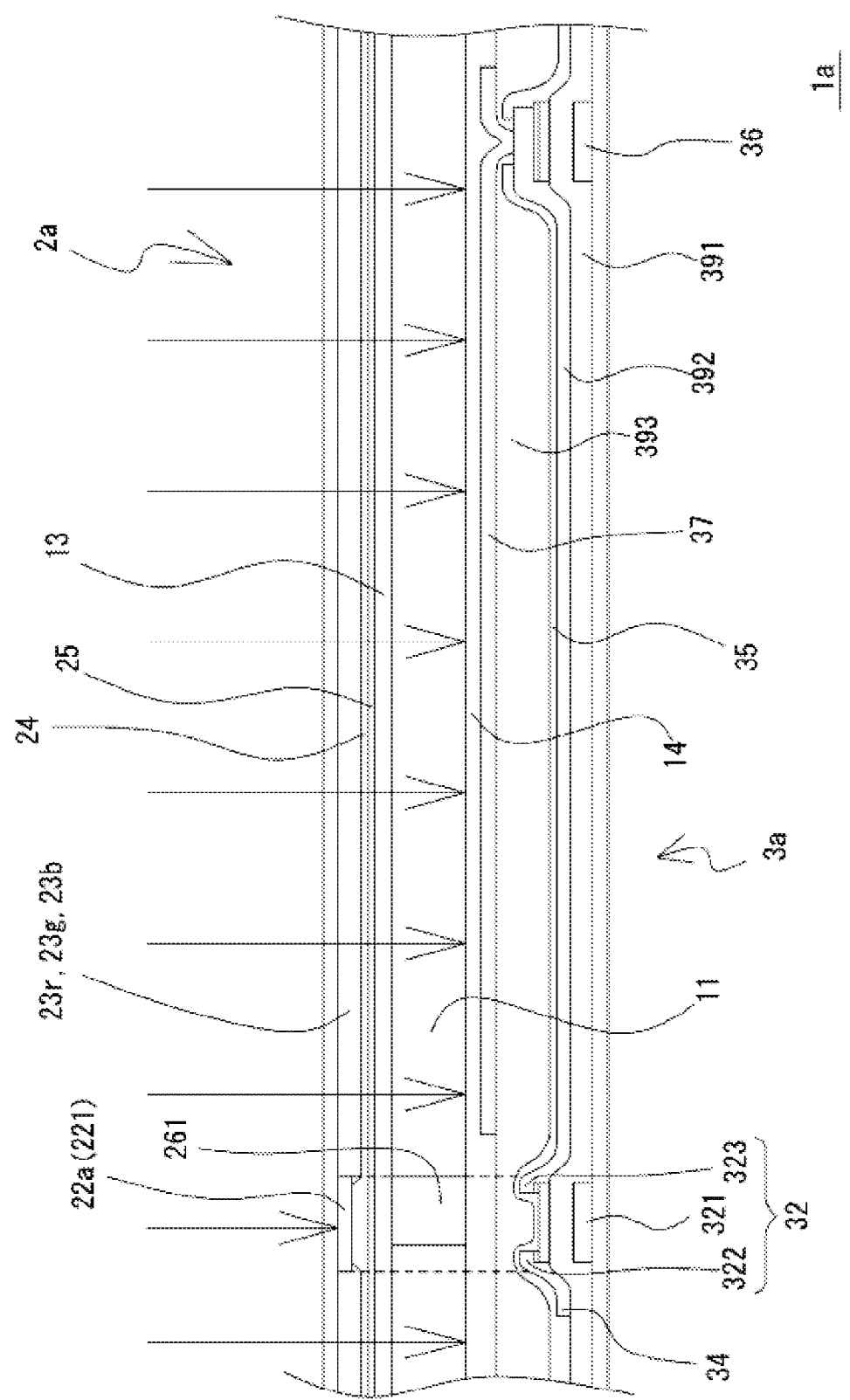
FIG. 15 is a cross-sectional view that schematically shows a step of radiating ultraviolet light to the display panel of Embodiment 1 of the present invention.

Further, light energy (ultraviolet light, for example) having a prescribed wavelength band is radiated to the liquid crystal material having monomers mixed therein, which is sealed between the first substrate 2a and the second substrate 3a. The light energy is radiated from the side of the first substrate. FIG. 15 is a cross-sectional view that schematically shows a step of radiating ultraviolet light to the display panel 1a of Embodiment 1 of the present invention. The arrows in FIG. 15 schematically illustrate the light energy that is radiated.

When irradiated with the light energy, the monomers are polymerized and become polymers, and therefore, a polymer microphase-separated structure (polymer network) is formed between the first substrate 2a and the second substrate 3a. That is, the polymer network liquid crystal 11 is formed between the first substrate 2a and the second substrate 3a.

The black matrix 22a, which is an element having a light-shielding property, is formed in the first substrate 2a, and light energy is not radiated to the regions to which the black matrix 22a is projected. The thin film transistors 32 formed in the second substrate 3a, in particular, are covered by the cover portions 221 of the black matrix 22a, and therefore, the light energy is not radiated thereto. This makes it possible to prevent the thin film transistors 32 from being irradiated with the light energy, and as a result, the characteristics of the thin film transistors 32 can be prevented from changing due to the light energy radiation.

As described above, because the black matrix 22a is set to a minimum dimension that is needed to define the openings of the pixels, in the liquid crystal material having monomers mixed therein, the volume of the portions thereof that are not irradiated with the light energy can be reduced. This makes it possible to eliminate or minimize the monomer unreacted region, and as a result, an occurrence of the display non-uniformity or the like, which is caused by the monomer unreacted region, can be prevented or suppressed. Thus, in the display panel of Embodiment 1 of the present invention, the display quality can be improved, or degradation of the display quality can be prevented or suppressed.

Thereafter, on the respective outer surfaces of the first substrate 2a and the second substrate 3a, polarizing films (not shown) are attached. Various known polarizing films can be used as these polarizing films, and therefore, the description thereof is omitted.

Through the above-mentioned processes, the display panel 1a of Embodiment 1 of the present invention is manufactured.

According to the display panel 1a of Embodiment 1 of the present invention, the monomer unreacted region can be reduced, and as a result, the occurrence of the display non-uniformity and the like, which is caused by the monomer unreacted region, can be prevented or suppressed. It is also possible to prevent or suppress the separation of the polymer network from the first substrate 2a or the second substrate 3a. Because this prevents air bubbles from being formed as a result of the separation, degradation of the display quality caused by the air bubbles can be prevented. Thus, with the display panel of Embodiment 1 of the present invention, high-quality image display can be achieved (or the degradation of the display quality can be prevented).

Next, the display panel 1b of Embodiment 2 of the present invention will be explained. Descriptions of configurations that are common with the display panel 1a of Embodiment 1 of the present invention will not be repeated. The display panel 1b of Embodiment 2 of the present invention has the first substrate 2b and the second substrate 3b. The second substrate 3b of the display panel 1b of Embodiment 2 of the present invention can be configured in the same manner as the second substrate 3a of the display panel 1a of Embodiment 1 of the present invention, and therefore, the description thereof is omitted.

FIG. 16(a) is a plan view of some of the pixels formed in the first substrate 2b of the display panel 1b of Embodiment 2 of the present invention, schematically showing a planar structure of the pixels. FIG. 16(b) is a cross-sectional view along the line A-A in FIG. 16(a), schematically showing a cross-sectional structure of the pixels.

As shown in FIGS. 16(a) and 16(b), the first substrate 2b has a transparent substrate 21 made of glass or the like, and on the surface the substrate 21, a black matrix 22b, colored patterns 23r, 23g, and 23b of prescribed colors, a protective film 24, a transparent electrode 25 (may also be referred to as a "transparent electrode"), and spacers (two types of spacers: first spacers 271 and second spacers 272) are formed.

Figure 16:
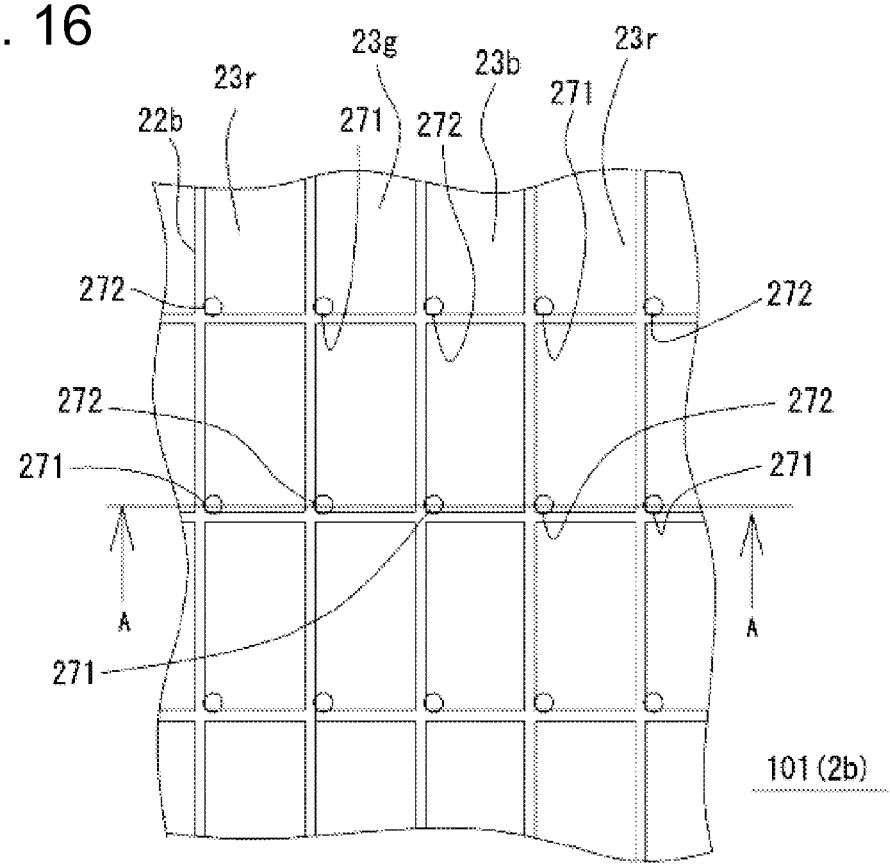
FIG. 16($a$) is a plan view of some of the pixels formed in a first substrate of a display panel of Embodiment 2 of the present invention, schematically showing a planar structure of the pixels.
Figure 16:
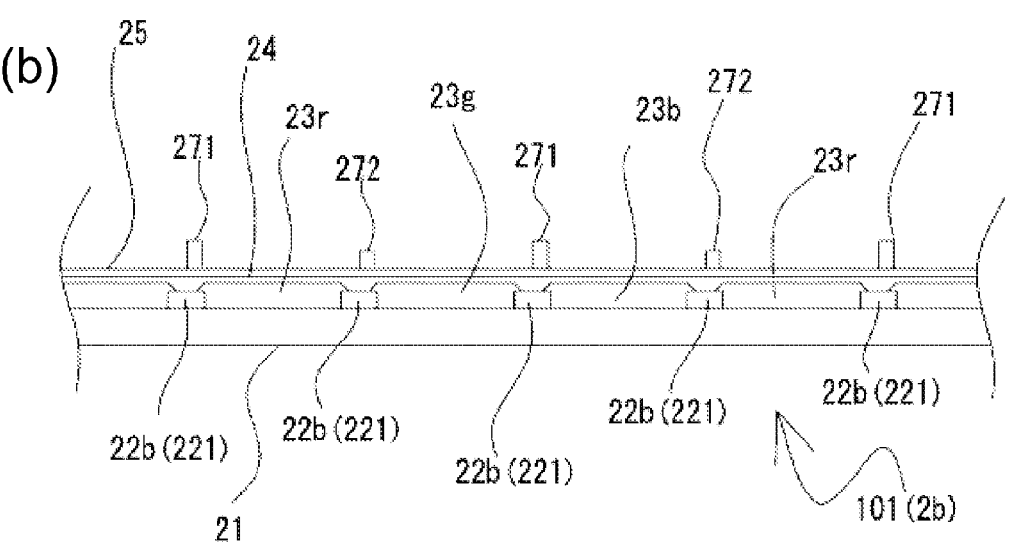

An overall configuration of the black matrix 22b is substantially the same as that of the black matrix 22a formed in the first substrate 2a of the display panel of Embodiment 1 of the present invention. However, the black matrix 22b may not be provided with portions that correspond to the cover portions 221 of the black matrix 22a formed in the first substrate 2a of the display panel 1a of Embodiment 1 of the present invention. (FIG. 16 shows a configuration without portions that correspond to the cover portions 221.)

The first spacers 271 and the second spacers 272 have a light-shielding property, and are made of the same material as that of the black matrix 22b, for example. The first spacers 271 and the second spacers 272 are formed on the surface of the protective film 24 in prescribed locations that face the thin film transistors 32, which are formed in the second substrate 3b, when the first substrate 2b and the second substrate 3b are disposed to face each other.

Figure 17:
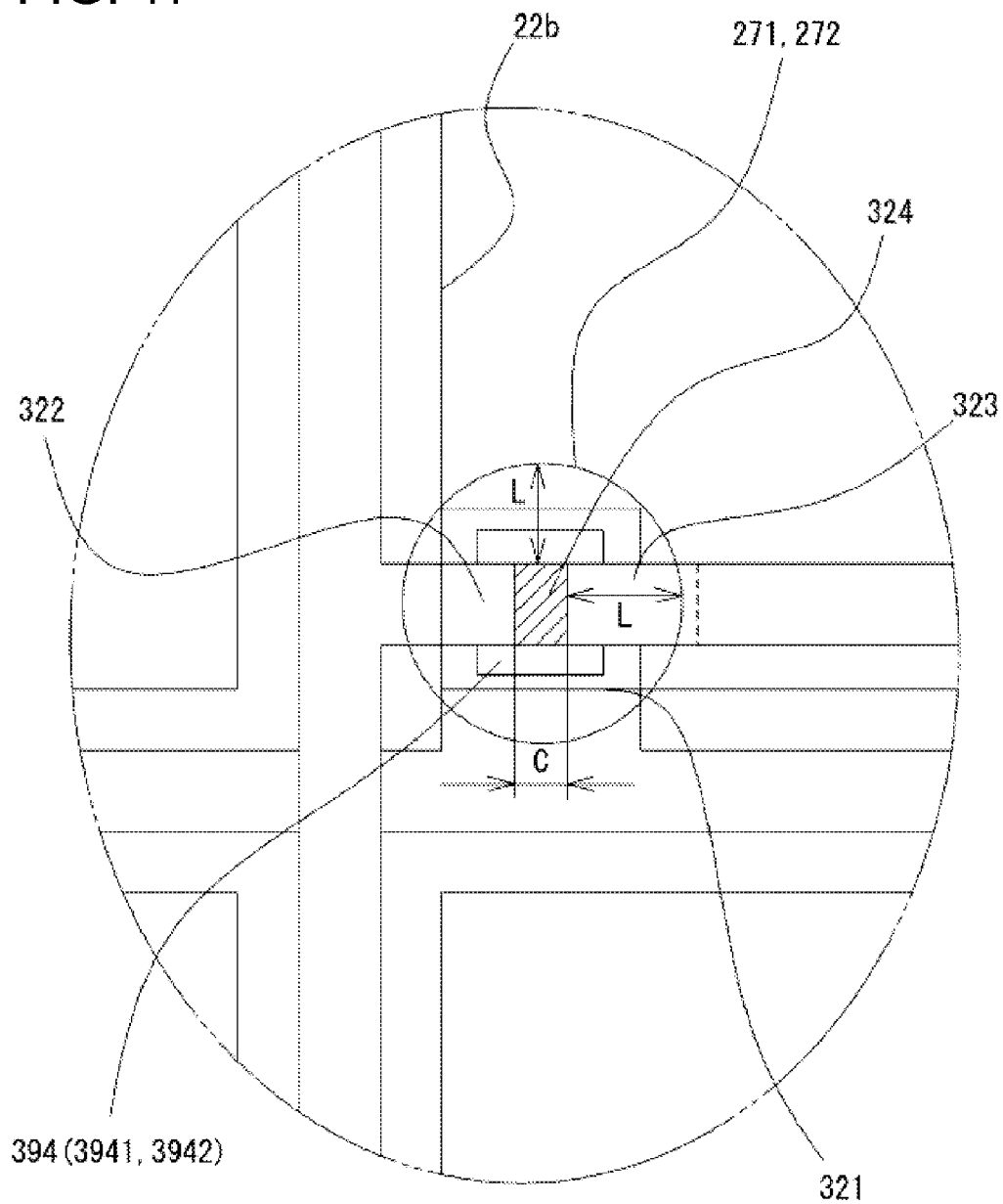
FIG. 17 is a plan view that schematically shows the first substrate and the second substrate that are bonded to each other in the display panel of Embodiment 2 of the present invention, showing a thin film transistor, a first spacer, and a second spacer.

FIG. 17 is a plan view that schematically shows the first substrate 2b and the second substrate 3b bonded to each other in the display panel 1b of Embodiment 2 of the present invention, showing one of the thin film transistors 32 and one of the first spacers 271 or the second spacers 272. Other elements that are not necessary for explanation are not shown in FIG. 17.

As shown in FIG. 17, when the display panel of Embodiment 2 of the present invention is viewed from a direction perpendicular to the plane direction of the first substrate and the second substrate, the first spacer or the second spacer in the first substrate faces each of the thin film transistors formed in the second substrate. The outer circumference of the first spacer or the second spacer is located outside the outer periphery of the channel region 324 at a distance of at least 10 μm greater than the sum of "the length C of the channel region 324," "the height of the surface of the element that is formed in the uppermost layer of the second substrate 3b from the surface of the channel region 324," and "the thickness of the polymer network liquid crystal 11." That is, (the distance L from the outer periphery of the channel region 324 to the outer circumference of the first spacer or the second spacer) shown in FIG. 17 satisfies:

$L \geq$ (the length $C$ of the channel region 324)+(the height of the surface of the element that is formed in the uppermost layer of the second substrate 3b from the surface of the channel region 324)+(the thickness of the polymer network liquid crystal 11)+(10 μm).

The same effects as those of the display panel 1a of Embodiment 1 of the present invention can be achieved by the display panel 1b of Embodiment 2 of the present invention. The display panel 1b of Embodiment 2 of the present invention can be manufactured in the same manner as the display panel 1a of Embodiment 1 of the present invention, except that the black matrix 22b formed therein has a different shape and that the first spacers 271 and the second spacers 272 are made of a material that has a light-shielding property. Therefore, the description thereof is omitted.

Next, the display panel 1c of Embodiment 3 of the present invention will be explained. Configurations that are common with the display panel 1a of Embodiment 1 of the present invention may be given the same reference characters, and the descriptions thereof may not be repeated.

Figure 18:
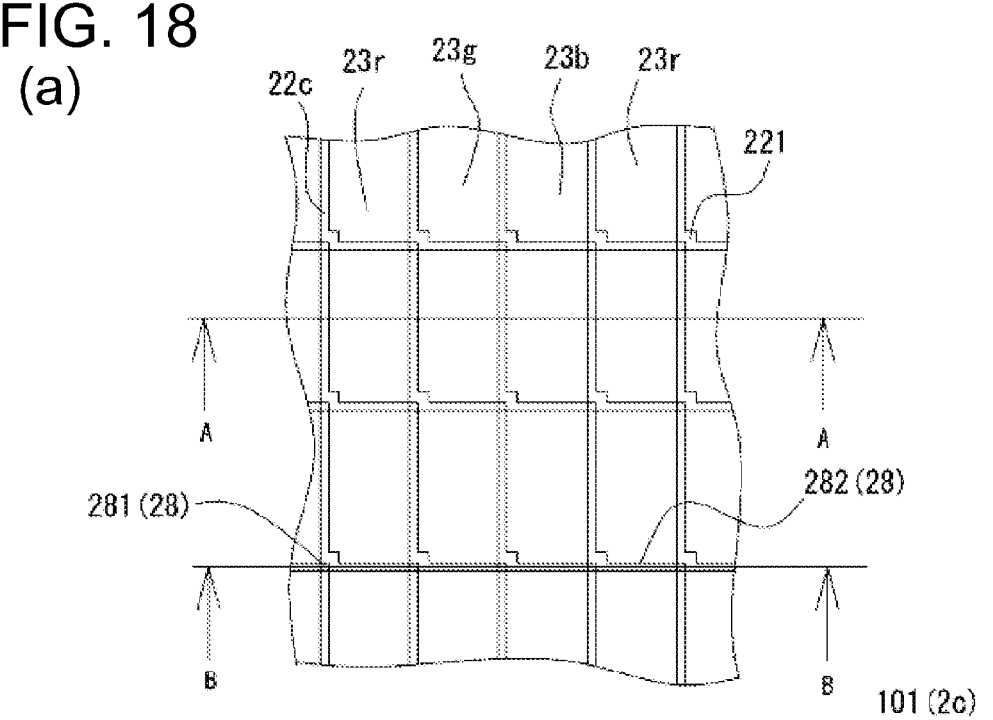
FIG. 18 is a schematic diagram showing a part of a first substrate in a display panel of Embodiment 3 of the present invention.
Figure 18:
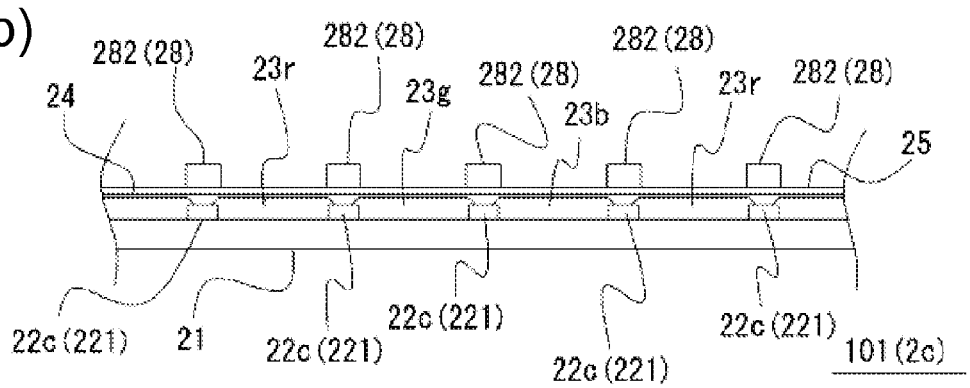
Figure 18:
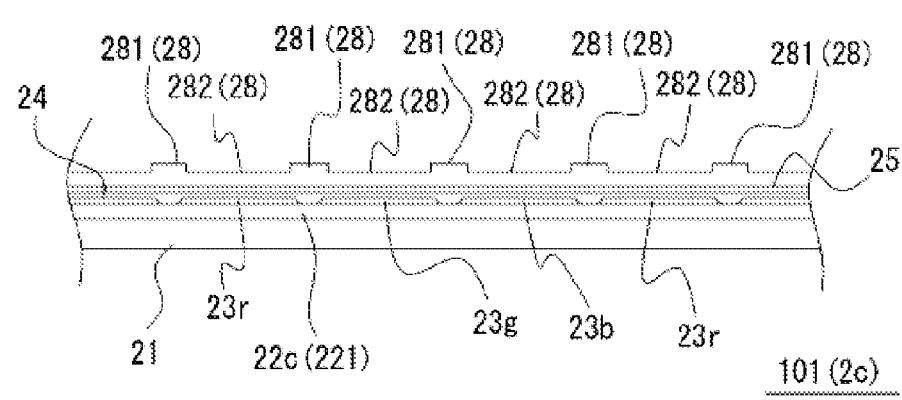

FIG. 18 is a schematic diagram showing a part of the first substrate 2c of the display panel 1c of Embodiment 3 of the present invention. FIG. 18(a) is a plan view showing a structure of pixels, FIG. 18(b) is a cross-sectional view along the line A-A in FIG. 18(a), and FIG. 18(c) is a cross-sectional view along the line B-B in FIG. 18(a).

As shown in FIGS. 18(a), 18(b), and 18(c), the first substrate 2c of the display panel 1c of Embodiment 3 of the present invention has a transparent substrate 21, and on the surface the substrate 21, a black matrix 22c, colored patterns of prescribed colors (here, colored patterns of three colors: red colored pattern 23r; green colored pattern 23g; and blue colored pattern 23b), a protective film 24, a transparent electrode 25, and a spacer 28 are formed.

The colored patterns 23r, 23g, and 23b of prescribed colors, the protective film 24, and the transparent electrode 25 can be configured in the same manner as those in the first substrate 2a of the display panel 1a of Embodiment 1 of the present invention. Therefore, the descriptions thereof are omitted. The black matrix 22c can also be configured in the same manner as the black matrix 22a in the first substrate 2a of the display panel 1a of Embodiment 1 of the present invention. That is, the black matrix 22c has grid portions and cover portions 221. However, unlike the first substrate 2a of the display panel 1a of Embodiment 1 of the present invention, there is no limitation on the width dimension of the grid portions.

The spacer 28 is an element that maintains the cell gap in the display region 101 at a prescribed value. As shown in FIG. 18, the spacer 28 is formed in a region filled with the polymer network liquid crystal (in other words, a region that includes the entire display region 101) so as to overlap substantially the entire black matrix 22c. As shown in FIGS. 18(b) and 18(c) in particular, the spacer 28 is formed to be higher in portions 281 than in portions 282. For ease of explanation, the portions 281 with the greater height are referred to as "higher portions 281," and the portions 282 with the smaller height are referred to as "lower portions 282." That is, the spacer 28 is an element that has two different heights in the higher portions 281 and the lower portions 282.

The higher portions 281 of the spacer 28 have the same function as that of the first spacers 261 formed in the first substrate 2a of the display panel 1a of Embodiment 1 of the present invention. The lower portions 282 of the spacer 28 have the same function as that of the second spacers 262 formed in the first substrate 2a of the display panel 1a of Embodiment 1 of the present invention. Further, the spacer 28 has a function of preventing the monomer unreacted regions from being formed by not allowing the liquid crystal material having monomers mixed therein to be present in portions that are not irradiated with light energy (regions to which the black matrix is projected) in the step of polymerizing the monomers.

Effects similar to those of the display panel 1a of Embodiment 1 of the present invention can be achieved by the display panel 1c of Embodiment 3 of the present invention. That is, in the step of radiating light energy to the liquid crystal material having monomers mixed therein so as to polymerize the monomers, it is possible to reduce the amount (volume) of monomers that are not irradiated with the light energy, while preventing the light energy from reaching the thin film transistors 32.

In the first substrate 2c of the display panel 1c of Embodiment 3 of the present invention, the spacer 28 is formed so as to overlap substantially the entire black matrix 22c. When light energy is radiated to the display panel 1c of Embodiment 3 of the present invention from the side of the first substrate 2c, regions covered by the black matrix 22c (regions to which the black matrix 22c is projected) are not irradiated with the light energy. However, because of presence of the spacer 28, almost no liquid crystal material having monomers mixed therein is present in those regions. This allows substantially the entire liquid crystal material having monomers mixed therein to be irradiated with the light energy so as to polymerize the monomers. As a result, the monomer unreacted regions can be prevented from being formed almost completely.

As described above, in the display panel 1c of Embodiment 3 of the present invention, because the monomer unreacted regions can be prevented from being formed almost completely, the above-mentioned problems caused by the monomer unreacted regions can be prevented or suppressed. Thus, the display panel 1c of Embodiment 3 of the present invention can perform high-quality display that is free from the display non-uniformity.

According to the display panel 1c of Embodiment 3 of the present invention, it is possible to prevent the light energy from reaching the thin film transistors 32 formed in the second substrate 3c in the step of polymerizing the monomers. This prevents a change in characteristics of the thin film transistors 32, which is caused by the light energy radiation. As a result, the display panel 1c of Embodiment 3 of the present invention can perform high-quality image display (or the degradation of the quality of displayed images can be prevented).

The height of the higher portions 281 of the spacer 28 is set to be the same as that of the first spacers 261 formed in the first substrate 2a of the display panel 1a of Embodiment 1 of the present invention. Similarly, the height of the lower portions 282 of the spacer 28 is set to be the same as that of the second spacers 262 formed in the first substrate 2a of the display panel 1a of Embodiment 1 of the present invention. There is no special limitation on the number of the higher portions 281 of the spacer 28 or a cross-sectional area (an area of a cross-section that appears when the spacer is cut in the plane direction of the first substrate 2c of each higher portion 281 of the spacer 28. However, the number and the cross-sectional area of the higher portions 281 of the spacer 28 are set to be the same as those of the first spacers 261 that are formed in the first substrate 2a of the display panel 1a of Embodiment 1 of the present invention.

That is, the total cross-sectional area of the higher portions 281 of the spacer 28 and an area of a region that is filled with the polymer network liquid crystal 11 (in other words, an area of the region enclosed by the sealing member 12) are set so as to satisfy the following equation (3):

(the total cross-sectional area of the higher portions 281 of the spacer 28) /(the area of the region filled with the polymer network liquid crystal 11)=0.001 to 0.017    Equation (3)

The height difference between the higher portions 281 and the lower portions 282 of the spacer 28 is set to 0.1 to 1.0 µm.

With this configuration, the display panel 1c of Embodiment 3 of the present invention can achieve effects similar to those of the display panel 1a of Embodiment 1 of the present invention. That is, the separation of the polymer network from the first substrate 2c or the second substrate 3c can be prevented or suppressed. Because this prevents air bubbles from being formed as a result of the separation, it is possible to prevent the degradation of the display quality caused by air bubbles. Specifically, "the higher portions 281 of the spacer 28" formed in the first substrate 2c of the display panel 1c of Embodiment 3 of the present invention have a function similar to that of "the first spacers 261" formed in the first substrate 2a of the display panel 1a of Embodiment 1 of the present invention, and "the lower portions 282 of the spacer 28" have a function similar to that of "the second spacers 262." As described above, according to the display panel 1c of Embodiment 3 of the present invention, high-quality image display can be performed (or degradation of the display quality can be prevented.)

That is, the description of the first substrate 2a of the display panel 1a of Embodiment 1 of the present invention and Tables 1 and 2 can be applied to this embodiment by replacing "the first spacers 261" and "the second spacers 262" with "the higher portions 281 of the spacer 28" and "the lower portions 282 of the spacer 28," respectively.

The second substrate 3c of the display panel 1c of Embodiment 3 of the present invention can be configured in the same manner as the second substrate 3a of the display panel 1a of Embodiment 1 of the present invention. Therefore, the description thereof is omitted.

Next, a method of manufacturing the display panel 1c of Embodiment 3 of the present invention will be explained. Descriptions of the same steps as those in the method of manufacturing the display panel 1a of Embodiment 1 of the present invention will not be repeated. The method of manufacturing the display panel of Embodiment 3 of the present invention includes a color filter manufacturing process (that is, a manufacturing process of the first substrate 2c), a TFT array substrate manufacturing process (that is, a manufacturing process of the second substrate 3c), and a panel manufacturing process.

The color filter manufacturing process is as follows. The color filter manufacturing process includes processes of (1) forming a black matrix, (2) forming colored patterns, (3) forming a protective film, (4) forming a transparent electrode, and (5) forming a spacer. Among them, the processes of (1) forming a black matrix, (2) forming colored patterns, (3) forming a protective film, and (4) forming a transparent electrode are the same as those in the method of manufacturing the display panel 1a of Embodiment 1 of the present invention. Therefore, the descriptions thereof are omitted, and only the process (5) of forming a spacer will be explained.

Figure 19:
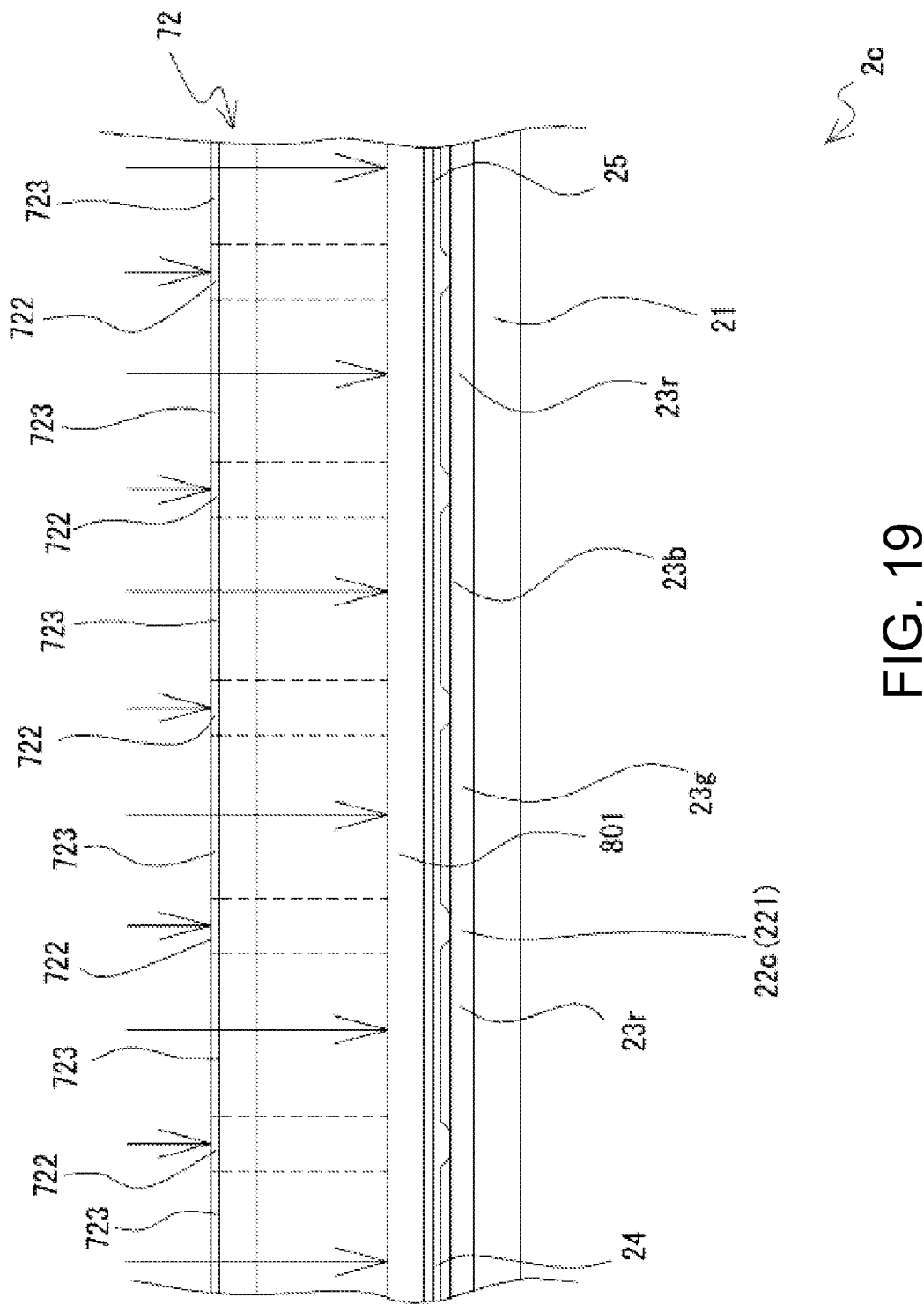
FIG. 19 is a cross-sectional view that schematically shows a prescribed step in a manufacturing process of a display device of Embodiment 3 of the present invention. The figure is a cross-sectional view that schematically shows an exposure process in a process (5) of forming a spacer.
Figure 20:
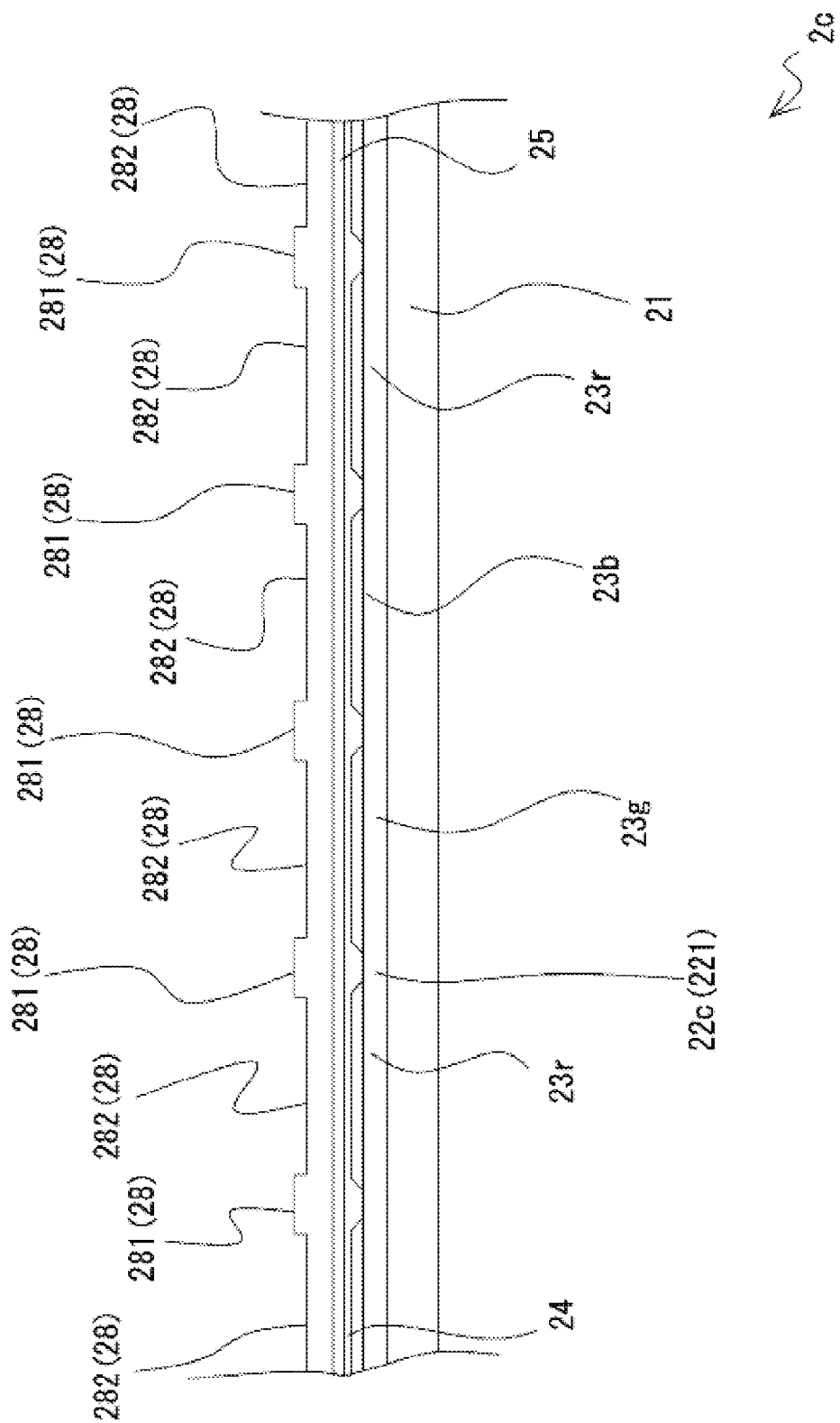
FIG. 20 is a cross-sectional view that schematically shows a prescribed step in a manufacturing process of a display device of Embodiment 3 of the present invention. The figure is a cross-sectional view that schematically shows a development process in a process (5) of forming a spacer.
Figure 21:
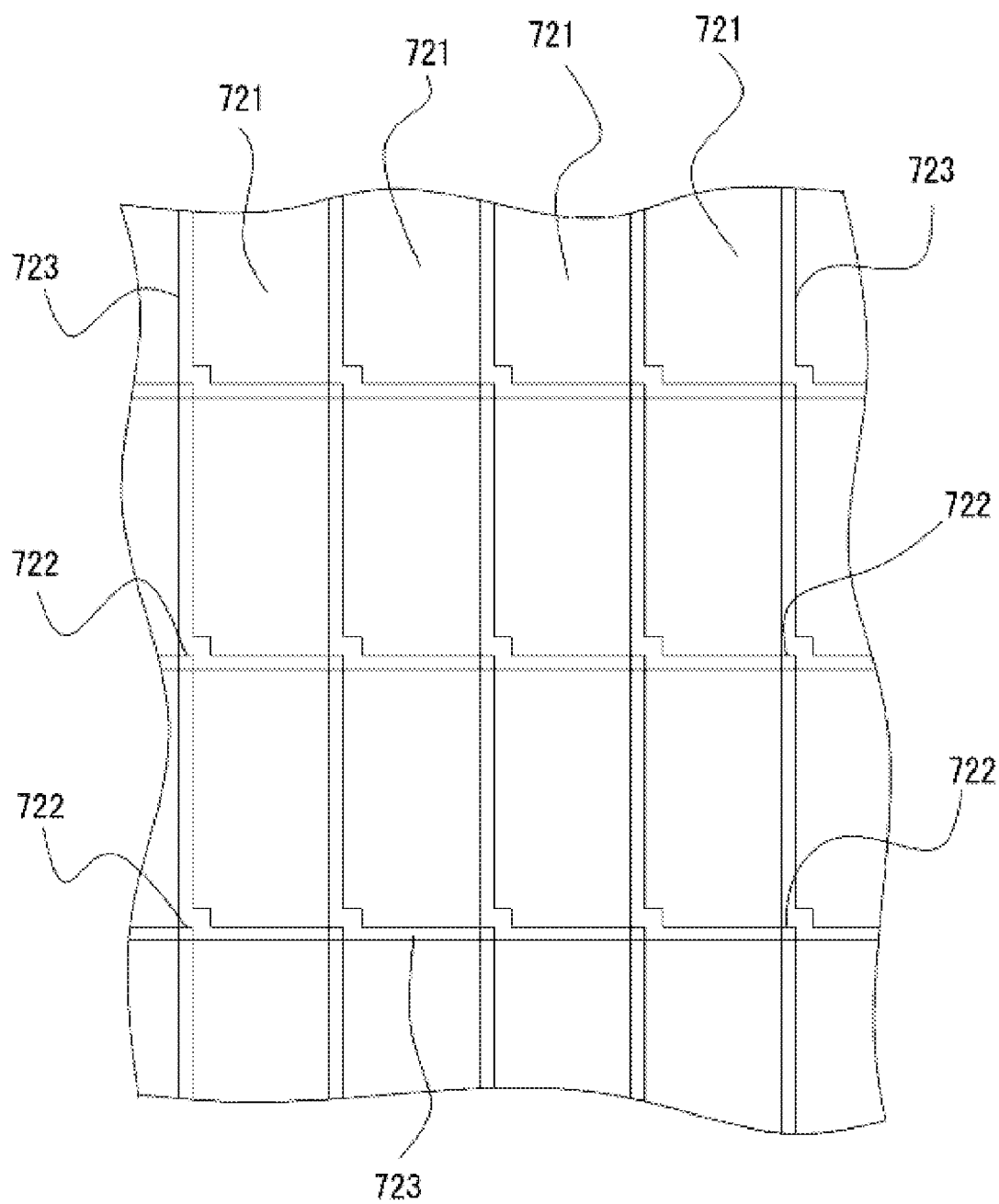
FIG. 21 is a schematic diagram of a planar structure of a photomask that is used in the exposure process in a process (5) of forming a spacer in a manufacturing process of the display device of Embodiment 3 of the present invention. The figure shows a part of the photomask.

FIG. 19 is a cross-sectional view that schematically shows an exposure process in the process (5) of forming a spacer. FIG. 20 is a cross-sectional view that schematically shows a development process in the process (5) of forming a spacer. FIG. 21 is a schematic diagram of a part of a photomask 72 that is used in the exposure process, illustrating a planar structure thereof. FIGS. 19 and 20 each corresponds to a cross-sectional view along the line B-B in FIG. 18(a).

In the process (5) of forming a spacer, the spacer 28 is formed on the surface of the transparent electrode 25 in the location that overlaps the black matrix 22c. The spacer 28 is formed by photolithography, using a photosensitive resin composite, as specifically described below.

First, on one surface of the transparent substrate 21 having the transparent electrode 25 formed thereon, a photosensitive resin composite film 801 is formed (see FIG. 12). The photosensitive resin composite film 801 is formed by a method of applying a photosensitive resin composite solution using a slit coater (forming a film of the solution), and thereafter solidifying the coating of the photosensitive resin composite, for example. The photosensitive resin composite may be of positive-type or negative-type. Here, a configuration using a positive-type photosensitive resin composite will be explained first.

After the photosensitive resin composite film 801 is formed, an exposure process is performed using an exposure apparatus (not shown) and a prescribed photomask 72. In this photomask 72, a light-transmissive pattern 721, a light-shielding pattern 722, and a semi-light-transmissive pattern 723 are formed in prescribed shapes. As shown in FIG. 21, a shape formed by combining the light-shielding pattern 722 and the semi-light-transmissive pattern 723 is substantially the same as the shape of the black matrix 22c. That is, in the exposure process, portions of the photosensitive resin composite film 801 that overlap the black matrix 22c are covered by one of the light-shielding pattern 722 and the semi-light-transmissive pattern 723, and the light-transmissive pattern 721 is not projected thereto.

The light-transmissive pattern 721 can transmit light energy delivered by the exposure apparatus directly or almost directly. The light-shielding pattern 722 blocks light energy delivered by the exposure apparatus. The semi-light-transmissive pattern 723 can transmit a reduced amount of light energy delivered by the exposure apparatus. That is, the intensity of the light energy that has passed through the semi-light-transmissive pattern 723 is lower than the intensity of the light energy that has passed through the light-transmissive pattern 721.

The light-shielding pattern 722 is used to form the higher portions 281 of the spacer 28. The light-shielding pattern 722 has a shape corresponding to a cross-sectional shape of the higher portions 281 of the spacer 28 (a shape that is substantially the same as the cross-sectional shape of the higher portions 281 of the spacer 28, for example), and are formed in locations that correspond to the locations where the higher portions 281 of the spacer 28 are to be formed. The semi-light-transmissive pattern 723 is used to form the lower portions 282 of the spacer 28. The semi-light-transmissive pattern 723 has a shape corresponding to a cross-sectional shape of the lower portions 282 of the spacer 28 (a shape that is substantially the same as the cross-sectional shape of the lower portions 282 of the spacer 28, for example), and are formed in locations that correspond to the locations where the lower portions 282 of the spacer 28 are to be formed. Regions that are not included in the light-shielding pattern 722 or the semi-light-transmissive pattern 723 become the light-transmissive pattern 721.

As shown in FIG. 20, in the exposure process, prescribed portions of the photosensitive resin composite film 801 (portions that become the higher portions 281 of the spacer 28) are blocked by the light-shielding pattern 722 of the photomask 72, and are not irradiated with the light energy. Other prescribed portions (portions that become the lower portions 282 of the spacer 28) are irradiated with the light energy that has been reduced by the semi-light-transmissive pattern 723 (having a lower intensity than that of the light radiated through the light-transmissive pattern 721). The rest of the film is irradiated with the light energy through the light-transmissive pattern 721.

When the positive-type photosensitive resin composite is used, the portions of the photosensitive resin composite film 801, which were irradiated with the light energy through the semi-light-transmissive pattern 723 of the photomask 72, becomes less soluble to the developer as compared with the portions irradiated with the light energy through the light-transmissive pattern 721.

Thereafter, the photosensitive resin composite film 801 that has undergone the exposure process is developed. When the development process is conducted, the portions irradiated with the light energy through the light-transmissive pattern 721 of the photomask 72 are removed. As shown in FIG. 20, the portions where the light was blocked by the light-shielding pattern 722 of the photomask 72 remain on the surface of the transparent electrode 25. These remaining portions become the higher portions 281 of the spacer 28.

The portions irradiated with the light energy through the semi-light-transmissive pattern 723 are not completely dissolved to the developer, and remain on the surface of the transparent electrode 25. These remaining portions become the lower portions 282 of the spacer 28. However, because the portions irradiated with the light energy through the semi-light-transmissive pattern 723 has solubility to some extent, the thickness thereof is reduced as compared with the portions where the light was blocked by the light-shielding pattern 722. As a result, the lower portions 282 of the spacer 28 that are shorter than the higher portions 281 of the spacer 28 can be formed.

A height difference between the higher portions 281 of the spacer 28 and the lower portions 282 of the spacer 28 can be set to the above-mentioned range by appropriately setting the intensity of the light energy radiated to the photosensitive resin composite film 801.

Even with a negative-type photosensitive resin composite, the higher portions 281 of the spacer 28 and the lower portions 282 of the spacer 28 can be simultaneously formed in the same process. The principle thereof is the same as that in the process of forming the first spacers 261 and the second spacers 262 of the first substrate of the display panel of Embodiment 1 of the present invention. That is, when a negative-type photosensitive resin composite is used, a photomask used in the exposure process has a configuration in which the light-transmissive pattern 721 and the light-shielding pattern 722 are replaced with each other as compared with the photomask that is used for the positive-type photosensitive resin composite, while the semi-light-transmissive pattern 723 for the lower portions 282 of the spacer 28 has the same pattern in both cases. Therefore, the description thereof is omitted.

As described above, even with a negative-type photosensitive resin composite, the higher portions 281 of the spacer 28 and the lower portions 282 of the spacer 28, which are shorter than the higher portions 281 of the spacer 28, can be simultaneously formed in the same process.

Through the above-mentioned processes, the first substrate 2c of the display panel 1c of Embodiment 3 of the present invention is manufactured. The method of manufacturing the second substrate 3c is the same as that of the display panel 1a of Embodiment 1 of the present invention. Therefore, the description thereof is omitted. Steps in the panel manufacturing process are also the same as those of the display panel 1a of Embodiment 1 of the present invention. However, a manner in which light energy is radiated to the liquid crystal material having monomers mixed therein differs, which will be described in detail below.

Figure 22:
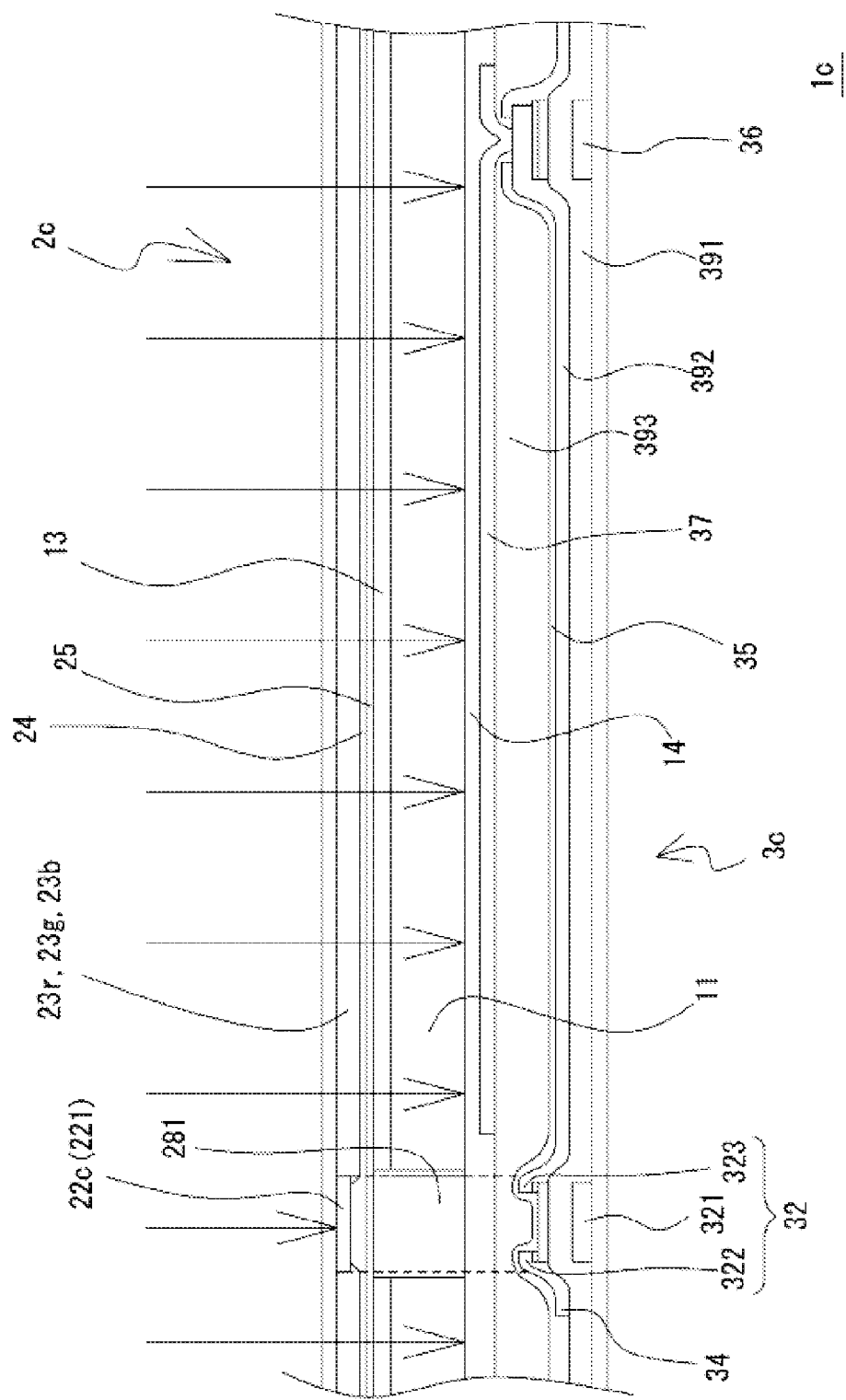
FIG. 22 is a cross-sectional view that schematically shows a manner in which light energy is radiated in a step of polymerizing monomers in a manufacturing process of the display panel of Embodiment 3 of the present invention.

FIG. 22 is a cross-sectional view that schematically shows how the light energy is radiated in the step of polymerizing monomers. The arrows in FIG. 22 schematically illustrate the radiated light energy. As shown in FIG. 22, in the step of polymerizing the monomers, light energy is radiated from the side of the first substrate 2c. The black matrix 22c has the cover portions 221 in a manner similar to the black matrix 22a in the first substrate 2a of the display panel 1a of Embodiment 1 of the present invention. Because the light energy is blocked by the cover portions of the black matrix 22c, the thin film transistors 32 formed in the second substrate 3c are not irradiated with the light energy. This makes it possible to prevent a change in characteristics of the thin film transistors 32, which is caused by the light energy radiation, in a manner similar to the display panel 1a of Embodiment 1 of the present invention.

In the first substrate 2c of the display panel 1c of Embodiment 3 of the present invention, the spacer 28 is formed so as to overlap substantially the entire black matrix 22c. Therefore, as shown in FIG. 22, in the regions where the light energy is blocked by the black matrix 22c (regions that are not irradiated with the light energy) in the step of radiating the light energy, the liquid crystal material having monomers mixed therein is not present almost at all as a result of the spacer 28 formed therein. Because almost no liquid crystal material having monomers mixed therein is present in the regions that are not irradiated with the light energy, it is possible to radiate the light energy to substantially the entire liquid crystal material having monomers mixed therein. This prevents the monomer unreacted regions from being formed, and as a result, it becomes possible to prevent the display non-uniformity that is caused by the monomer unreacted regions.

Through the above-mentioned processes, the display panel 1c of Embodiment 3 of the present invention is manufactured.

According to the display panel 1c of Embodiment 3 of the present invention, the monomer unreacted region can be eliminated almost completely, and as a result, the occurrence of the display non-uniformity or the like, which is caused by the monomer unreacted region, can be prevented or suppressed. It is also possible to prevent or suppress the separation of the polymer network from the first substrate 2c or the second substrate 3c. Because this prevents air bubbles from being formed as a result of the separation, degradation of the display quality caused by the air bubbles can be prevented. Thus, with the display panel of Embodiment 3 of the present invention, high-quality image display can be performed (or the degradation of the display quality can be prevented).

Next, the display panel 1d of Embodiment 4 of the present invention will be explained. Configurations that are common with the display panel 1a of Embodiment 1 of the present invention to the display panel 1c of Embodiment 3 of the present invention may be given the same reference characters, and the descriptions thereof may not be repeated. The second substrate 3d of the display panel 1d of Embodiment 4 of the present invention can be configured in the same manner as the second substrate 3a of the display panel 1a of Embodiment 1 of the present invention, and therefore, the description thereof is omitted.

Figure 23:
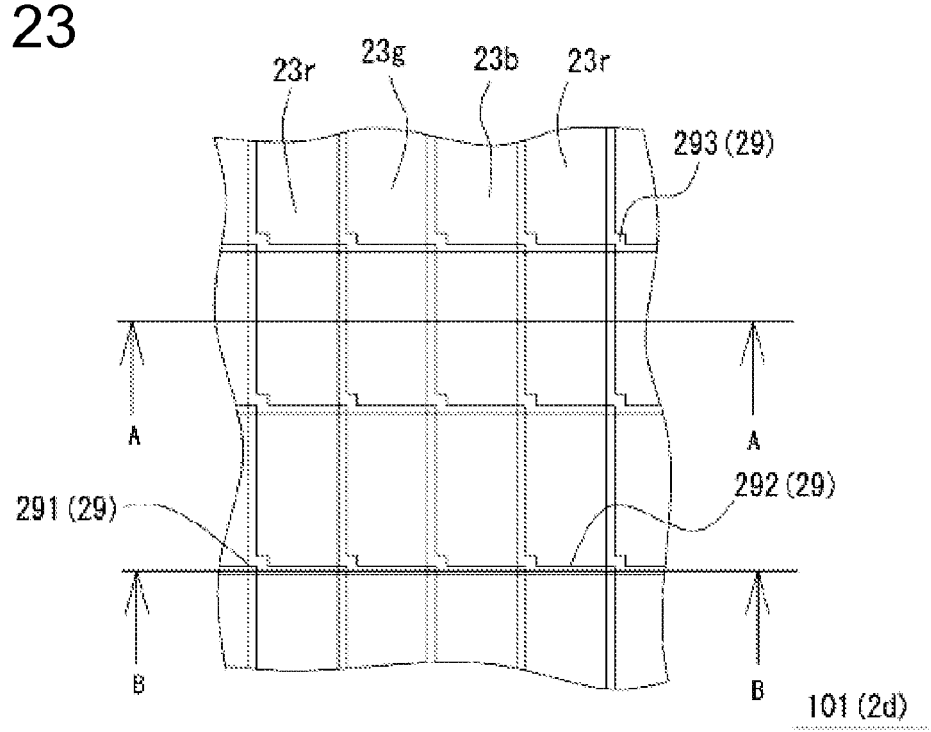
FIG. 23 is a schematic diagram showing a part of a display region in a first substrate in a display panel of Embodiment 4 of the present invention.
Figure 23:
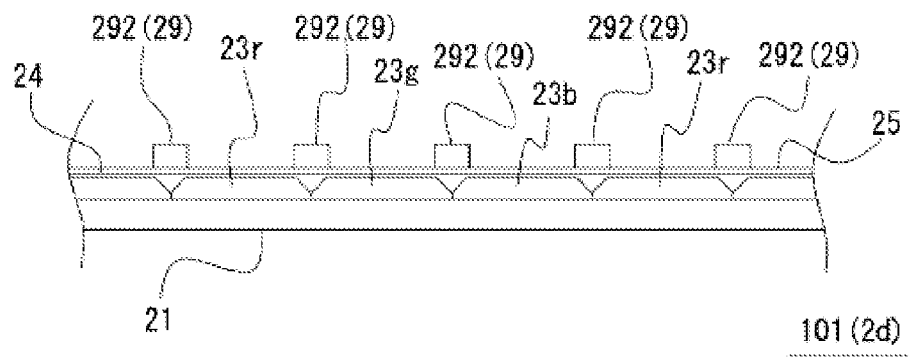
Figure 23:
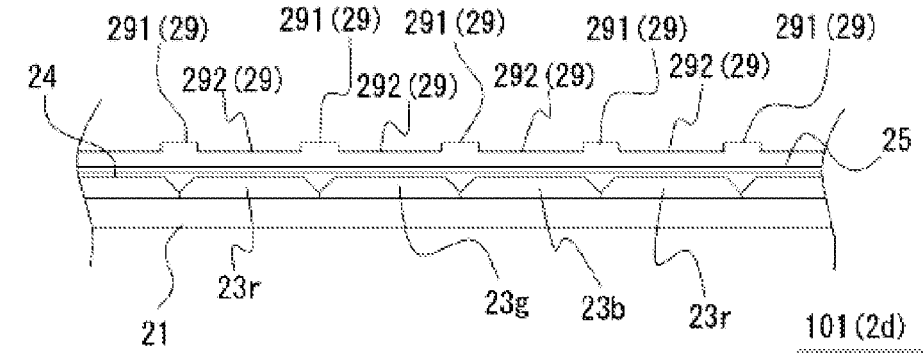

FIG. 23 is a schematic diagram showing a part of the display region 101 in the first substrate 2d of the display panel 1d of Embodiment 4 of the present invention. FIG. 23(a) is a plan view showing a structure of a pixel, FIG. 23(b) is a cross-sectional view along the line A-A in FIG. 23(a), and FIG. 23(c) is a cross-sectional view along the line B-B in FIG. 23(a).

In the first substrate 2d of the display panel 1d of Embodiment 4 of the present invention, a spacer 29 doubles as a black matrix. That is, in the first substrate 2d of the display panel 1d of Embodiment 4 of the present invention, the spacer 29 that has a light-shielding property is formed, and an element that corresponds to the black matrix 22a or 22c in the first substrate 2a or 2c of the display panel 1a of Embodiment 1 of the present invention or the display panel 1c of Embodiment 3 of the present invention is not provided. Specifically, as shown in FIG. 23, the first substrate 2d of the display panel 1d of Embodiment 4 of the present invention has a transparent substrate 21, and on the surface the substrate 21, colored patterns of prescribed colors (here, colored patterns of three colors: red colored pattern 23r; green colored pattern 23g; and blue colored pattern 23b), a protective film 24, a transparent electrode 25, and a spacer 29 are formed.

The colored patterns 23r, 23g, and 23b of prescribed colors, the protective film 24, and the transparent electrode 25 can be configured in the same manner as those in the first substrates 2a, 2b, and 2c of the display panel 1a of Embodiment 1 of the present invention to the display panel 1c of Embodiment 3 of the present invention. Therefore, the descriptions thereof are omitted.

The spacer 29 is an element that has a function of maintaining the cell gap in the display region 101 at a prescribed value and that has a function of a so-called "black matrix." The spacer 29 is an element that has a light-shielding property. The spacer 29 is formed of a photosensitive resin composite (a photosensitive acrylic resin composite, for example) containing a black colorant (colorant that has a light-shielding property), for example.

The spacer 29 defines pixels in the display region 101. As shown in FIG. 23, in a portion of the spacer 29 that is formed in the display region 101, openings of a prescribed shape are formed and arranged in a prescribed manner. In other words, the spacer 29 is formed in a substantially grid-shaped pattern in the display region. The respective openings (regions enclosed by the grids) formed in the spacer 29 become transmissive regions (portions that transmit light) in the respective pixels. As shown in FIG. 23, the openings are generally formed in a substantially rectangular shape. Also, cover portions 293 are formed in the spacer 29. The cover portions 293 have the same function as that of the cover portions 221 of the black matrix 22a in the first substrate 2a of the display panel 1a of Embodiment 1 of the present invention. As described above, the planar shape of the spacer 29 is substantially the same as the planar shape of the black matrices 22a and 22c respectively formed in the first substrates 2a and 2c in the display panel 1a of Embodiment 1 of the present invention and in the display panel 1c of Embodiment 3 of the present invention. Prescribed portions (cover portions 293) of the spacer 29 cover the thin film transistors 32 (overlap the thin film transistors 32) formed in the second substrate 3d.

Further, as shown in FIGS. 23(b) and 23(c), the spacer 29 is formed to be higher in portions 291 than in portions 292. For ease of explanation, the portions 291 with the greater height are referred to as "higher portions 291," and the portions 292 with the smaller height are referred to as "lower portions 292." That is, the spacer 29 is an element that has two different heights in the higher portions 291 and the lower portions 292.

The spacer 29 has the same function as that of the spacer 28 formed in the first substrate 2c in the display panel 1c of Embodiment 3 of the present invention. That is, the higher portions 291 of the spacer 29 have the same function as that of the first spacers 261 formed in the first substrate 2a of the display panel 1a of Embodiment 1 of the present invention (have the same function as that of the higher portions 281 of the spacer 28 formed in the first substrate 2c of the display panel 1c of Embodiment 3 of the present invention.) The lower portions 292 of the spacer 29 have the same function as that of the second spacers 262 formed in the first substrate 2a of the display panel 1a of Embodiment 1 of the present invention (have the same function as that of the lower portions 282 of the spacer 28 formed in the first substrate 2c of the display panel 1c of Embodiment 3 of the present invention.)

The heights of the higher portions 291 and the lower portions 292 of the spacer 29 are set to be the same as those of the higher portions 281 and the lower portions 282 of the spacer 28 formed in the first substrate 2c of the display panel 1c of Embodiment 3 of the present invention, respectively. There is no special limitation on the number of the higher portions 291 of the spacer 29 or a cross-sectional area (an area of a cross-section that appears when the spacer is cut in the plane direction of the first substrate 2d) of each higher portion 291 of the spacer 29. However, the number and the cross-sectional area of the higher portions 291 of the spacer 29 are set to be the same as those of the first spacers 261 that are formed in the first substrate 2a of the display panel 1a of Embodiment 1 of the present invention.

Specifically, the total cross-sectional area of the higher portions 291 of the spacer 29 and an area of a region that is filled with the polymer network liquid crystal 11 (region enclosed by the sealing member 12) are set so as to satisfy the following equation (4):

(the total cross-sectional area of the higher portions 291 of the spacer 29)/(the area of the region filled with the polymer network liquid crystal)=0.001 to 0.017     Equation (4)

The height difference between the higher portions 291 and the lower portions 292 of the spacer 29 is set to 0.1 to 1.0 μm.

That is, the description of the first substrate 2a of the display panel 1a of Embodiment 1 of the present invention can be applied to this embodiment by replacing "the first spacers 261" and "the second spacers 262" with "the higher portions 291 of the spacer 29" and "the lower portions 292 of the spacer 29," respectively.

In addition, the spacer 29 (the cover portions 293, in particular) has a function of preventing light energy from reaching the thin film transistors 32 formed in the second substrate 3d in the step of polymerizing monomers that are mixed in the liquid crystal material. There is no limitation on the height of the cover portions 293 as long as the height (thickness) thereof is large enough to shield the light energy.

As described above, the configuration of the first substrate 2d of the display panel 1d of Embodiment 4 of the present invention is the same as that of the first substrate 2c of the display panel 1c of Embodiment 3 of the present invention, except that the black matrix 22c is not formed and that the spacer 28 is provided with a light-shielding property. That is, in the first substrate 2c of the display panel 1c of Embodiment 3 of the present invention, the colored patterns 23r, 23g, and 23b for color display and the black matrix 22c are formed in the same layer (immediately above the transparent substrate 21). On the other hand, in the first substrate 2d of the display panel 1d of Embodiment 4 of the present invention, the black matrix is not formed in the same layer as the colored patterns 23r, 23g, and 23b, and the spacer 29 that serves as the black matrix is formed in a different layer from the colored patterns 23r, 23g, and 23b (on the surface of the colored patterns 23r, 23g, and 23b, for example).

Next, the method of manufacturing the display panel 1d of Embodiment 4 of the present invention will be explained. Descriptions of the same steps as those in the method of manufacturing the display panel 1a of Embodiment 1 of the present invention will not be repeated. The method of manufacturing the display panel 1d of Embodiment 4 of the present invention includes a color filter manufacturing process (that is, a manufacturing process of the first substrate 2d), a TFT array substrate manufacturing process (that is, a manufacturing process of the second substrate 3d), and a panel manufacturing process.

The color filter manufacturing process is as follows. The color filter manufacturing process includes processes of (1) forming colored patterns, (2) forming a protective film, (3) forming a transparent electrode, and (4) forming a spacer. Because the first substrate 2d does not have a so-called "black matrix," "a process of forming a black matrix" is not performed (not necessary).

The process (1) of forming colored patterns, the process (2) of forming a protective film, and the process (3) of forming a transparent electrode are the same as those in the method of manufacturing the display panel 1a of Embodiment 1 of the present invention.

In the process of forming colored patterns in the respective manufacturing methods of the display panel 1a of Embodiment 1 of the present invention to the display panel 1c of Embodiment 3 of the present invention, the colored patterns 23r, 23g, and 23b are formed on the transparent substrate 21 that has the black matrix 22a, 22b, or 22c formed thereon. On the other hand, in the process of forming colored patterns in the manufacturing method of the display panel 1d of Embodiment 4 of the present invention, the colored patterns of the respective colors 23r, 23g, and 23b are formed on the transparent substrate 21 that does not have a so-called "black matrix" formed thereon. Therefore, as the process (1) of forming colored patterns, a method for forming colored patterns by the rear surface exposure process (a method used for a case where a black matrix is formed after colored patterns are formed) can be employed, for example.

The process (4) of forming a spacer is the same as that in the manufacturing method of the display panel 1c of Embodiment 3 of the present invention, except that a material that has a light-shielding property is used as the material of the spacer 29. That is, the spacer 28 formed in the first substrate 2c of the display panel 1c of Embodiment 3 of the present invention may or may not have a light-shielding property. Therefore, the spacer 28 formed in the first substrate 2c of the display panel 1c of Embodiment 3 of the present invention may be formed of a photosensitive resin composite that has a light-shielding property, or may be formed of a photosensitive resin composite that does not have a light-shielding property. On the other hand, the spacer 29 in the first substrate 2d of the display panel 1d of Embodiment 4 of the present invention has a light-shielding property. Therefore, the spacer 29 is made of a material that has a light-shielding property. As a material that has a light-shielding property, a photosensitive resin composite that has a black colorant mixed therein can be used. The same material as that of the black matrices 22a, 22b, and 22c of the first substrates 2a, 2b, and 2c of the display panel 1a of Embodiment 1 of the present invention to the display panel 1c of Embodiment 3 of the present invention can be used, for example.

Through the above-mentioned processes, the first substrate 2d of the display panel 1d of Embodiment 4 of the present invention is manufactured. The method of manufacturing the second substrate 3d is the same as that of the display panel 1a of Embodiment 1 of the present invention. Therefore, the description thereof is omitted. Steps in the panel manufacturing process are also the same as those of the display panel 1a of Embodiment 1 of the present invention. However, a manner in which light energy is radiated to the liquid crystal material having monomers mixed therein differs, which will be described in detail below.

Figure 24:
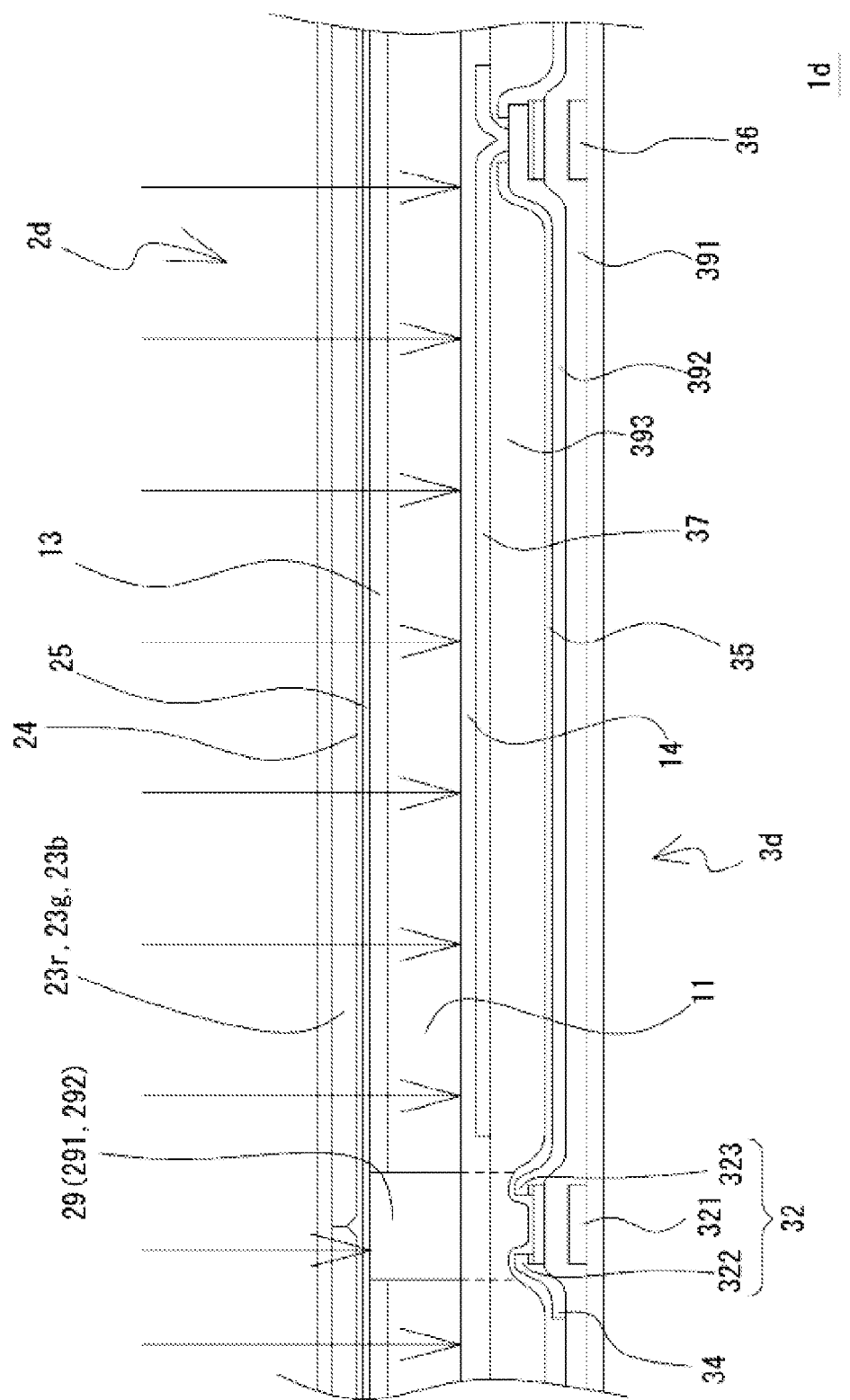
FIG. 24 is a cross-sectional view that schematically shows a manner in which light energy is radiated in a step of polymerizing monomers in a manufacturing process of the display panel of Embodiment 4 of the present invention.

FIG. 24 is a schematic cross-sectional view of a manner in which light energy is radiated in the step of polymerizing the monomers. The arrows in FIG. 24 schematically illustrate the radiated light energy. As shown in FIG. 24, in the step of polymerizing the monomers, light energy is radiated from the side of the first substrate 2d. The spacer 29 has the cover portions 293 formed therein. The cover portions 293 of the spacer 29 face the thin film transistors 32 in the second substrate 3d. In this configuration, the light energy is blocked by the cover portions 293 of the spacer 29. This prevents the light energy from reaching the thin film transistors 32 formed in the second substrate 3d. Therefore, in a manner similar to the display panel 1a of Embodiment 1 of the present invention, it is possible to prevent a change in characteristics of the thin film transistors 32, which is caused by the light energy radiation.

Through the above-mentioned processes, the display panel 1d of Embodiment 4 of the present invention is manufactured.

The same effects as those of the display panel 1a of Embodiment 1 of the present invention to the display panel 1c of Embodiment 3 of the present invention can be achieved by the display panel 1d of Embodiment 4 of the present invention.

Because it is not necessary to form a black matrix in the first substrate 2d of the display panel 1d of Embodiment 4 of the present invention (because the spacer 29 also serves as a black matrix), the process of forming a black matrix can be eliminated, and the material of the black matrix becomes no longer necessary. This allows for a manufacturing cost reduction and a product price reduction.

Next, the display panel 1e of Embodiment 5 of the present invention will be explained. Configurations that are common with the display panel 1a of Embodiment 1 of the present invention may be given the same reference characters, and the descriptions thereof may not be repeated.

The display panel 1e of Embodiment 5 of the present invention has the first substrate 2e and the second substrate 3e. In the first substrate 2e, a so-called "black matrix" is not formed, while the second substrate 3e is provided with an element that has a function that corresponds to a black matrix.

Figure 25:
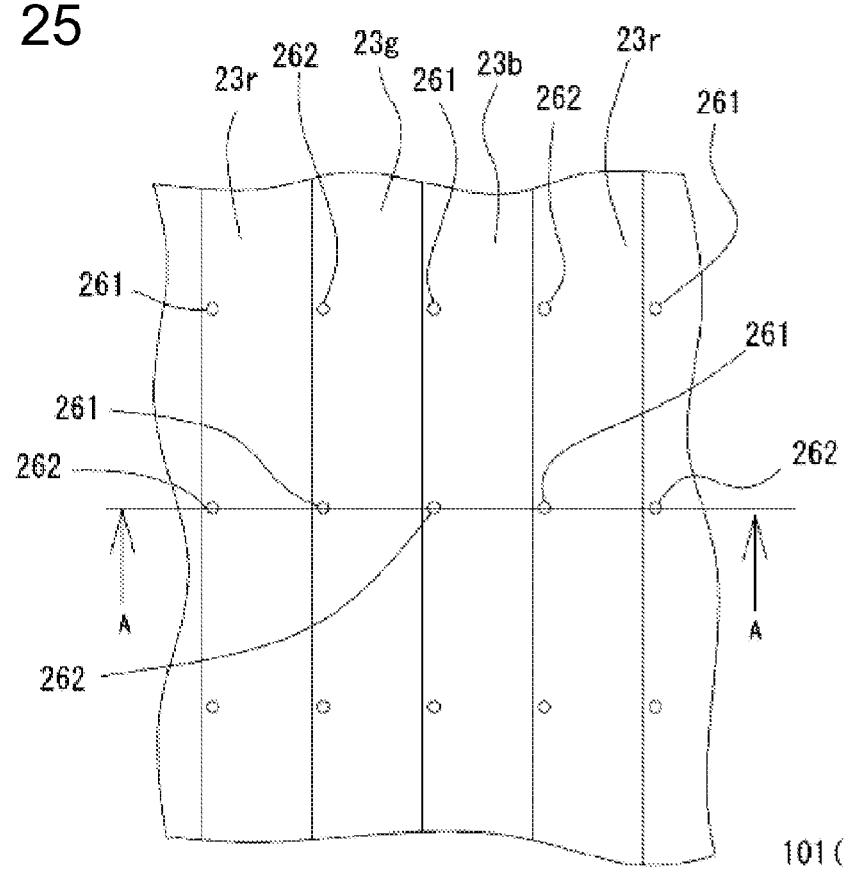
FIG. 25 is a schematic diagram showing a part of a first substrate in a display panel of Embodiment 5 of the present invention.
Figure 25:
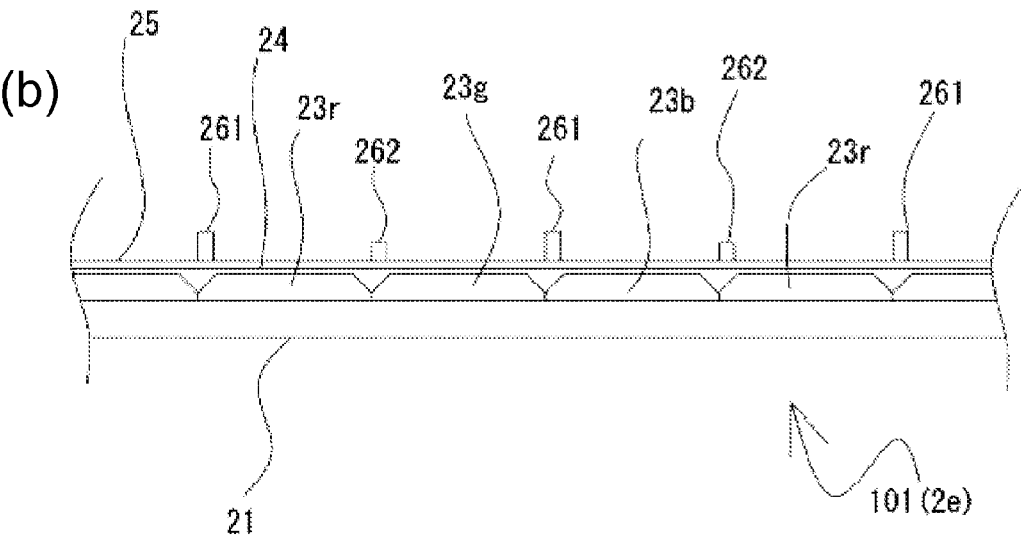
Figure 26:
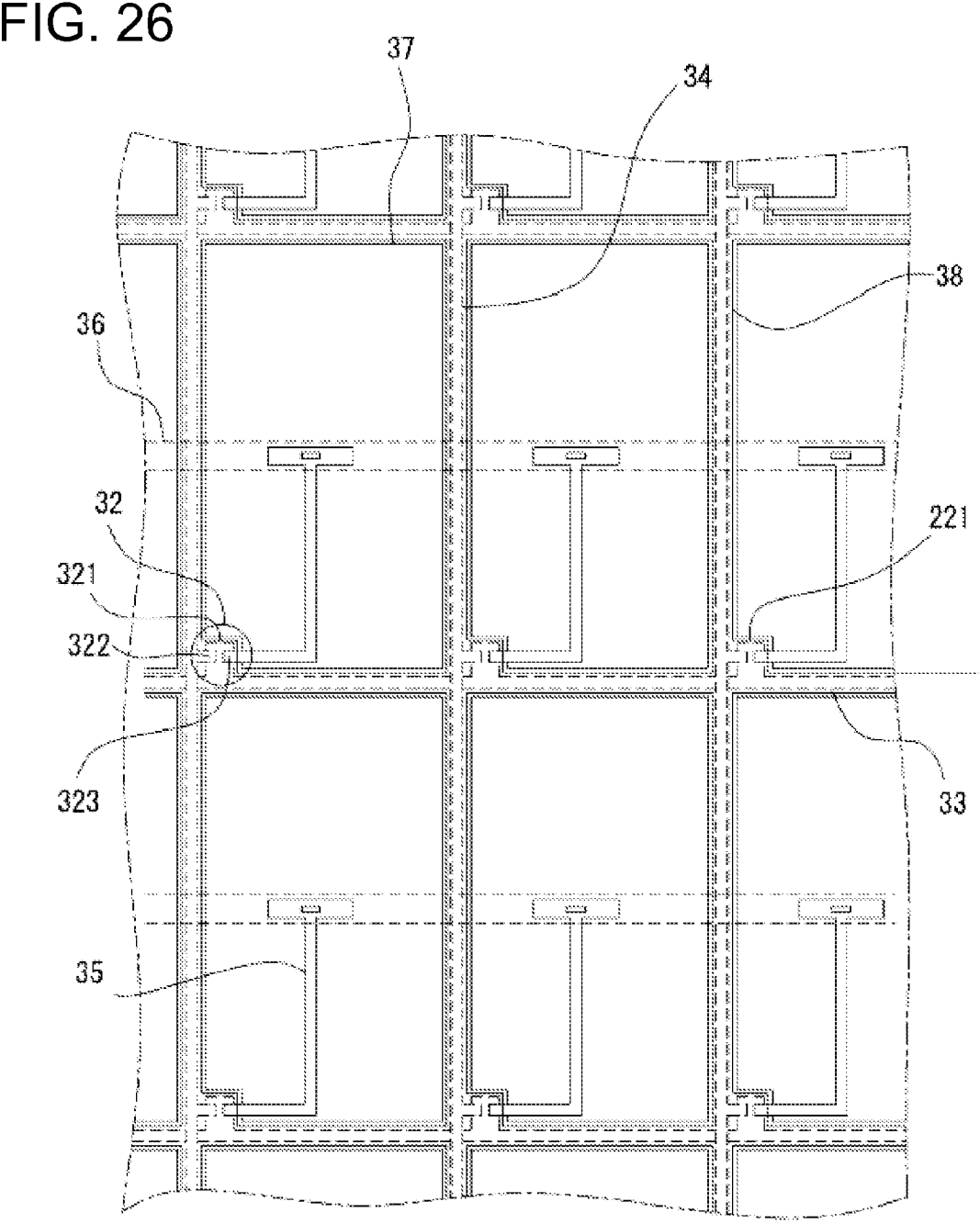
FIG. 26 is a schematic diagram of a part of a second substrate in the display panel of Embodiment 5 of the present invention, showing a structure of pixels in a plan view.
Figure 27:
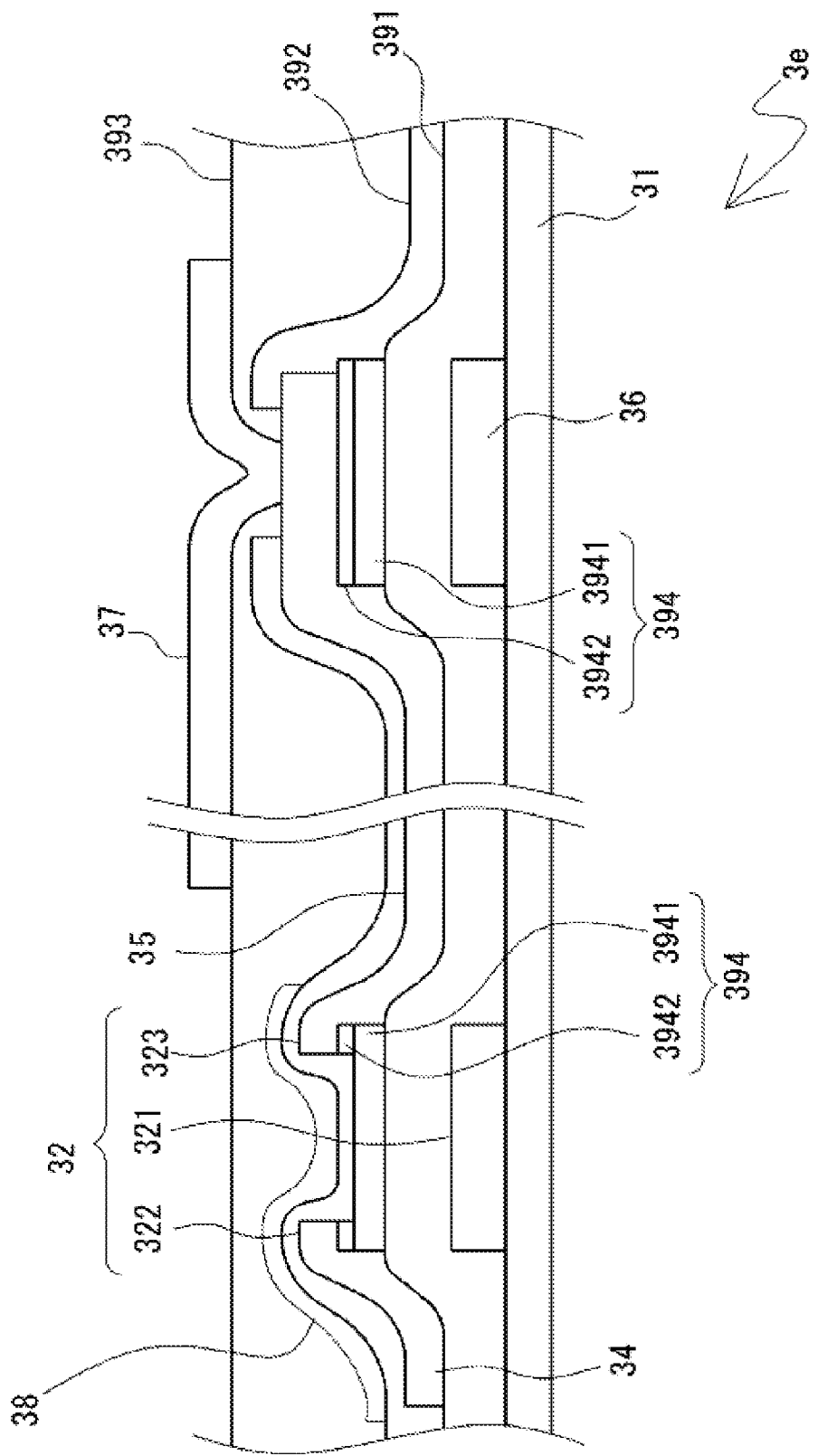
FIG. 27 is a schematic diagram of a part of the second substrate in the display panel of Embodiment 5 of the present invention, showing a structure of pixels in a cross-sectional view.

FIG. 25 is a schematic diagram showing a part of the first substrate 2e of the display panel 1e of Embodiment 5 of the present invention. FIG. 25(a) is a plan view showing a structure of pixels, and FIG. 25(b) is a cross-sectional view along the line A-A in FIG. 25(a). FIG. 26 is a schematic diagram of a part of the second substrate 3e of the display panel 1e of Embodiment 5 of the present invention, showing a structure of pixels in a plan view. FIG. 27 is a schematic diagram of a part of the second substrate 3e of the display panel 1e of Embodiment 5 of the present invention, showing a structure of pixels in a cross-sectional view. FIG. 27 is a schematic diagram for illustrating a cross-sectional structure of the pixels, and is not a cross-sectional view taken along an actual particular cut line.

As shown in FIG. 25, the first substrate 2e of the display panel 1e of Embodiment 5 of the present invention has a transparent substrate 21, and on the surface the substrate 21, colored patterns 23r, 23g, and 23b of prescribed colors (here, colored patterns of three colors: red colored pattern 23r; green colored pattern 23g; and blue colored pattern 23b), a protective film 24, a transparent electrode 25, and spacers (first spacers 261 and second spacers 262) are formed. The first substrate 2e of the display panel 1e of Embodiment 5 of the present invention has the same configuration as that of the first substrate 2a of the display panel 1a of Embodiment 1 of the present invention, except that the black matrix 22a is not formed.

That is, the total cross-sectional area of the first spacers 261 and an area of a region that is filled with the polymer network liquid crystal 11 (an area of the region enclosed by the sealing member 12) are set so as to satisfy the following equation (5):

(the total cross-sectional area of the first spacers 261)/
(an area of the region filled with the polymer
network liquid crystal 11)=0.001 to 0.017    Equation (5)

The second spacers 262 are shorter than the first spacers 261. The height difference between the first spacers 261 and the second spacers 262 is set to 0.1 to 1.0 μm.

Below, a configuration of the second substrate 3e of the display panel 1e of Embodiment 5 of the present invention will be explained. The second substrate 3e of the display panel 1e of Embodiment 5 of the present invention has the same configuration as that of the second substrate 3a of the display panel 1a of Embodiment 1 of the present invention, except that an element that has a function of a so-called "black matrix" is provided. Therefore, descriptions of configurations that are common with the second substrate 3a of the display panel 1a of Embodiment 1 of the present invention will not be repeated.

As shown in FIGS. 26 and 27, in the display region 101 of the second substrate 3e of the display panel 1e of Embodiment 5 of the present invention, pixel electrodes 37, thin film transistors 32 as switching elements, source wiring lines 34, gate wiring lines 33, drain wiring lines 35, auxiliary capacitance wiring lines 36, a first insulating film 391, a second insulating film 392, and a third insulating film 393 are formed. They can be configured in the same manner as those in the second substrate 3a of the display panel 1a of Embodiment 1 of the present invention. Therefore, descriptions thereof are omitted.

Further, in the display region 101 of the second substrate 3e of the display panel 1e of Embodiment 5 of the present invention, a light-shielding film 38 that has a light-shielding property and that has portions covering the thin film transistors is formed. The light-shielding film 38 serves as a so-called "black matrix," and also has a function of preventing light energy from reaching the thin film transistors 32 in the step of polymerizing monomers that are mixed in the liquid crystal material.

As shown in FIG. 26, the light-shielding film 38 is formed so as to respectively overlap the gate wiring lines 33, the source wiring lines 34, and the thin film transistors 32. That is, the light-shielding film 38 has openings of a prescribed shape that are formed and arranged in a prescribed manner as a whole. In other words, the light-shielding film 38 is formed in a substantially grid-shaped pattern. The respective openings (regions enclosed by the grids) formed in the light-shielding film 38 become transmissive regions (portions that transmit light) in the respective pixels. Portions of the light-shielding film 38 near the respective intersections of the grids are protruding toward the inside of the respective openings. These portions overlap the thin film transistors 32. As described above, the light-shielding film 38 has substantially the same planar configuration as that of the black matrix 22a formed in the first substrate 2a of the display panel 1a of Embodiment 1 of the present invention. The portions (portions that protrude toward the inside of the openings) of the light-shielding film cover the thin film transistors 32. The light-shielding film 38 does not need to be formed so as to cover the respective thin film transistors 32 entirely as long as the respective channels 324 of the thin film transistors 32 are covered.

The light-shielding film 38 is made of a material that has a light-shielding property such as a photosensitive resin composite containing a black colorant or various metals, for example. There is no limitation on a layer in which the light-shielding film 38 is formed. However, when the light-shielding film 38 is made of a conductive material, the light-shielding film 38 needs to be formed in a layer that is electrically insulated from other elements (such as the gate wiring lines 33, the source wiring lines 34, the drain wiring lines 35, the auxiliary capacitance wiring lines 36, the thin film transistors 32, and the pixel electrodes 37), and is formed between the second insulating film 392 and the third insulating film 393, for example.

Next, a method of manufacturing the display panel 1e of Embodiment 5 of the present invention will be explained. The method of manufacturing the display panel 1e of Embodiment 5 of the present invention includes a color filter manufacturing process (that is, a manufacturing process of the first substrate 2e), a TFT array substrate manufacturing process (that is, a manufacturing process of the second substrate 3e), and a panel manufacturing process. Descriptions of configurations that are common with the method of manufacturing the display panel 1a of Embodiment 1 of the present invention may be omitted.

The color filter manufacturing process (the manufacturing process of the first substrate 2e) is as follows. The color filter manufacturing process includes processes of (1) forming colored patterns, (2) forming a protective film, (3) forming a transparent electrode, and (4) forming spacers. These processes are the same as those in the method of manufacturing the first substrate 2a of the display panel of Embodiment 1 of the present invention. That is, the method of manufacturing the first substrate 2e of the display panel of Embodiment 5 of the present invention is the same as the method of manufacturing the first substrate 2a of the display panel of Embodiment 1 of the present invention, except that "the process (1) of forming a black matrix" is not performed.

The TFT array substrate manufacturing process (that is, the manufacturing process of the second substrate 3e) is as follows. The TFT array substrate manufacturing process is the same as that in the method of manufacturing the display panel 1a of Embodiment 1 of the present invention, except that a process of forming a light-shielding film is added thereto. Therefore, descriptions of the same configurations are omitted. In the method of manufacturing the display panel 1e of Embodiment 5 of the present invention, a configuration in which the light-shielding film 38 is formed between the second insulating film 392 and the third insulating film 393 will be explained.

As shown in FIGS. 26 and 27, on the surface of the transparent substrate 31 that has the second insulating film 392 formed thereabove, the light-shielding film 38 is formed. When the light-shielding film 38 is made of a metal, various known sputtering methods can be employed. That is, the light-shielding film 38 can be formed by a method of depositing a metal on the surface of the second insulating film 392. When the light-shielding film 38 is made of a photosensitive resin composite that has a light-shielding property, various known photolithography methods can be employed. After the light-shielding film 38 is formed, the third insulating film 393 is formed. The rest of the process is the same as those in the manufacturing method for the display panel 1a of Embodiment 1 of the present invention.

Figure 28:
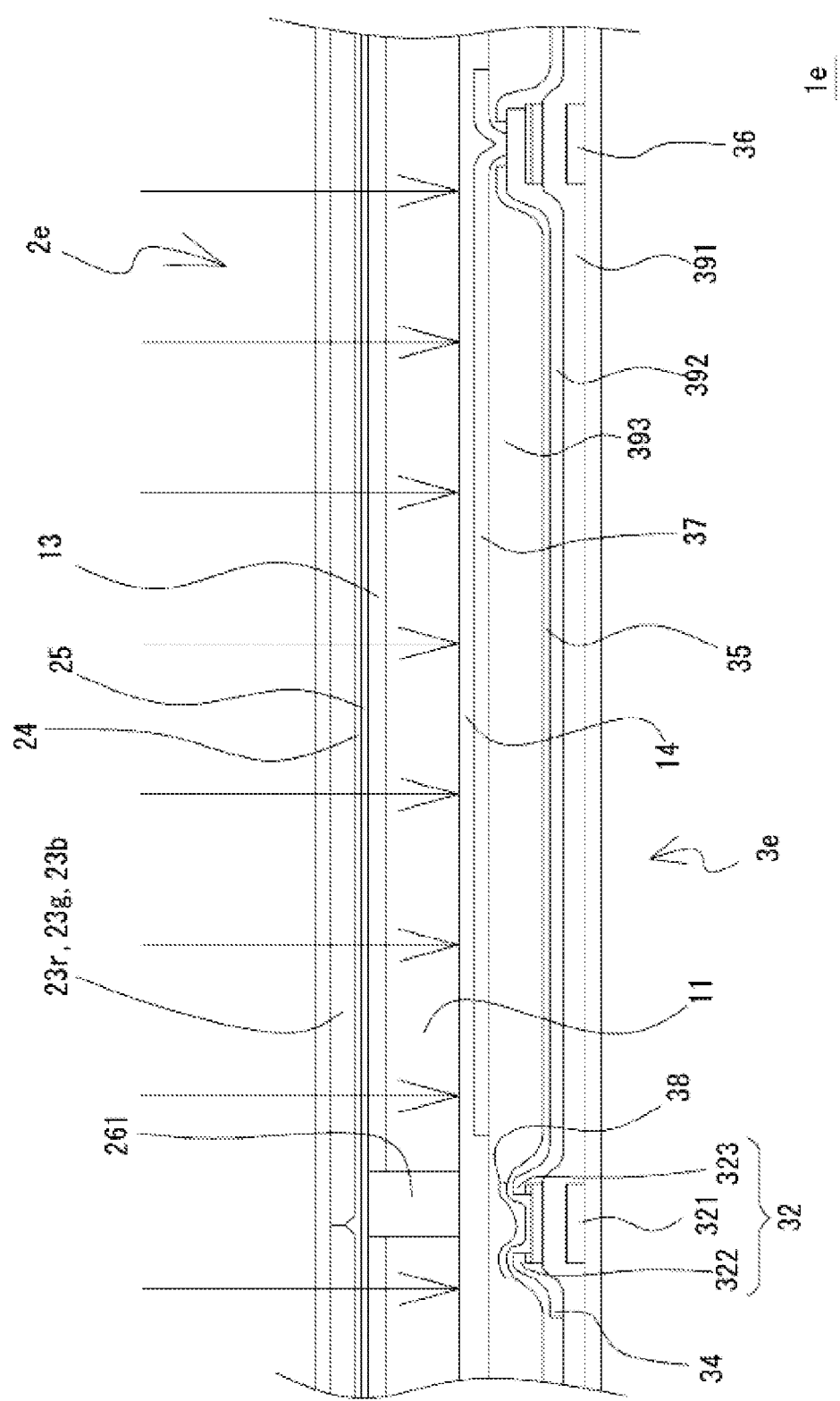
FIG. 28 is a cross-sectional view that schematically shows a manner in which light energy is radiated in a step of polymerizing monomers in a manufacturing process of the display panel of Embodiment 5 of the present invention.

In the panel manufacturing process, monomers are polymerized in the manner described below. FIG. 28 is a schematic cross-sectional view of a manner in which light energy is radiated in the step of polymerizing the monomers. As shown in FIG. 28, light energy is radiated from the side of the first substrate 2e. As shown in FIG. 25, in the display region 101 of the first substrate 2e, an element that has a light-shielding property such as a black matrix is not formed. Therefore, it is possible to radiate the light energy to the entire liquid crystal material that has monomers mixed therein. With this configuration, the monomer unreacted regions can be prevented from being formed. Therefore, it becomes possible to prevent an occurrence of the display non-uniformity, which is caused by the monomer unreacted region.

On the other hand, in the second substrate 3e, the light-shielding film 38 that has a light-shielding property is formed, and because the light-shielding film 38 blocks light energy, the channel regions 324 of the thin film transistors 32 are not irradiated with the light energy. This makes it possible to prevent a change in characteristics of the thin film transistors 32, which is caused by the light energy radiation.

Through the above-mentioned processes, the display panel 1e of Embodiment 5 of the present invention is manufactured.

The same effects as those of the display panel 1a of Embodiment 1 of the present invention to the display panel 1d of Embodiment 4 of the present invention can be achieved by the display panel 1e of Embodiment 5 of the present invention.

Because it is not necessary to form a black matrix in the first substrate 2e of the display panel 1e of Embodiment 5 of the present invention (because the light-shielding film 38 that also serves as a black matrix is formed in the second substrate), the process of forming a black matrix can be eliminated, and the material of the black matrix becomes no longer necessary. This results in a reduction in manufacturing cost and product price.

INDUSTRIAL APPLICABILITY

Embodiments of the present invention have been described above. However, the present invention is not limited to the above-mentioned embodiments, and it is apparent that various modifications can be made without departing from the spirit of the present invention.

Although a transmissive liquid crystal display panel has been described in the above-mentioned embodiments, the present invention can also be used in a reflective liquid crystal display panel or a transflective liquid crystal display panel, for example.

The invention claimed is:

1. A display panel, comprising:
a first substrate and a second substrate, the first substrate having a light-shielding element, the second substrate having a pixel electrode and a thin film transistor that drives the pixel electrode,
wherein the first substrate and the second substrate are disposed to face each other having a gap therebetween, and a polymer network liquid crystal is filled between the first substrate and the second substrate, and
wherein the light-shielding element is disposed in a location that faces the thin film transistor, and an outer periphery of the light-shielding element is located outside an outer periphery of a channel region of the thin film transistor at a distance of at least 10 μm greater than a sum of "a length of the channel region," "a height of a surface of an uppermost layer in the second substrate from a surface of the channel region," and "a thickness of the polymer network liquid crystal," when viewed from a direction that is perpendicular to a plane direction of the first substrate and the second substrate.

2. The display panel according to claim 1, wherein the first substrate is provided with first spacers that define a gap between the first substrate and the second substrate, and
wherein a total cross-sectional area of the first spacers and an area of a region filled with the polymer network liquid crystal are set so as to satisfy:

(the total cross-sectional area of the first spacers)/(the area of the region filled with the polymer network liquid crystal) =0.001 to 0.017.

3. The display panel according to claim 2, wherein the first substrate is provided with second spacers that are shorter than the first spacers.

4. The display panel according to claim 3, wherein a height difference between the first spacers and the second spacers is 0.1 to 1.0 μm.

5. The display panel according to claim 1, wherein the first substrate is provided with a spacer that defines a gap between the first substrate and the second substrate, and the spacer is formed so as to overlap substantially the entire light-shielding element in a portion that is located in a region filled with the polymer network liquid crystal.

6. The display panel according to claim 5, wherein the spacer has higher portions and lower portions.

7. The display panel according to claim 6, wherein a total cross-sectional area of the higher portions of the spacer and an area of the region filled with the polymer network liquid crystal are set so as to satisfy:

(the total cross-sectional area of the higher portions of the spacer)/(the area of the region filled with the polymer network liquid crystal) =0.001 to 0.017.

8. The display panel according to claim 7, wherein a height difference between the higher portions and the lower portions is 0.1 to 1.0 μm.

9. A display panel, comprising:
a first substrate and a second substrate disposed to face each other having a gap therebetween;
spacers formed in the first substrate, the spacers defining the gap between the first substrate and the second substrate;
a pixel electrode and a thin film transistor formed in the second substrate, the thin film transistor driving the pixel electrode; and
a polymer network liquid crystal filled between the first substrate and the second substrate,
wherein the spacers has a light-shielding property, and each disposed in a location that faces the thin film transistor, and an outer periphery of each of the spacers is located outside an outer periphery of a channel region of the thin film transistor at a distance of at least 10μm greater than a sum of "a length of the channel region," "a height of a surface of an uppermost layer in the second substrate from a surface of the channel region," and "a thickness of the polymer network liquid crystal," when viewed from a direction that is perpendicular to a plane direction of the first substrate and the second substrate.

10. The display panel according to claim 9, wherein the spacers include first spacers and second spacers that are shorter than the first spacers.

11. The display panel according to claim 10, wherein a total cross-sectional area of the first spacers and an area of the region filled with the polymer network liquid crystal are set so as to satisfy:

(the total cross-sectional area of the first spacers)/(the area of the region filled with the polymer network liquid crystal) =0.001 to 0.017.

12. The display panel according to claim 10, wherein a height difference between the first spacers and the second spacers is 0.1 to 1.0 µm.

13. A display panel, comprising:
a first substrate and a second substrate disposed to face each other having a gap therebetween;
a spacer that has a light-shielding property and that borders pixels in the first substrate, the spacer defining the gap between the first substrate and the second substrate;
a pixel electrode and a thin film transistor formed in the second substrate, the thin film transistor driving the pixel electrode; and
a polymer network liquid crystal filled between the first substrate and the second substrate,
wherein the spacer has a portion that faces the thin film transistor, and an outer periphery of the portion that faces the thin film transistor is located outside an outer periphery of a channel region of the thin film transistor at a distance of at least 10µm greater than a sum of "a length of the channel region," "a height of a surface of an uppermost layer in the second substrate from a surface of the channel region," and "a thickness of the polymer network liquid crystal," when viewed from a direction that is perpendicular to a plane direction of the first substrate and the second substrate.

14. The display panel according to claim 13, wherein the spacer has higher portions and lower portions.

15. The display panel according to claim 14, wherein a total cross-sectional area of the higher portions of the spacer and an area of the region filled with the polymer network liquid crystal are set so as to satisfy:

(the total cross-sectional area of the higher portions)/ (the area of the region filled with the polymer network liquid crystal) =0.001 to 0.017.

16. The display panel according to claim 14, wherein a height difference between the higher portions and the lower portions is 0.1 to 1.0 µm.

* * * * *